United States Patent [19]
Walker et al.

[11] Patent Number: 5,714,831
[45] Date of Patent: Feb. 3, 1998

[54] METHOD AND APPARATUS FOR IMPROVED CONTROL OF PIEZOELECTRIC POSITIONERS

[75] Inventors: Steven H. Walker, Camas, Wash.; Max G. Lagally; Robert D. Lorenz, both of Madison, Wis.

[73] Assignee: Wisconsin Alumni Research Foundation, Madison, Wis.

[21] Appl. No.: 556,665

[22] Filed: Nov. 13, 1995

[51] Int. Cl.$^6$ ............................................... H01L 41/09
[52] U.S. Cl. ............................................... 310/316
[58] Field of Search ................................... 310/316, 317

[56] References Cited

U.S. PATENT DOCUMENTS

| | | | |
|---|---|---|---|
| 3,911,298 | 10/1975 | Borsdorf et al. | 310/316 |
| 3,916,226 | 10/1975 | Knoll | 310/316 |
| 4,259,605 | 3/1981 | Rijckaert | 310/316 |
| 4,263,527 | 4/1981 | Comstock | 310/316 |
| 4,841,191 | 6/1989 | Takata et al. | 310/317 |
| 4,954,704 | 9/1990 | Elings et al. | 250/307 |
| 5,043,621 | 8/1991 | Culp | 310/316 |
| 5,172,002 | 12/1992 | Marshall | 250/561 |
| 5,196,713 | 3/1993 | Marshall | 250/561 |
| 5,296,793 | 3/1994 | Lang | 318/715 |
| 5,296,794 | 3/1994 | Lang et al. | 318/715 |
| 5,539,268 | 7/1996 | Kataoka | 310/316 |
| 5,557,656 | 9/1996 | Elings | 310/316 |

OTHER PUBLICATIONS

B. Gopinath, "On the Control of Linear Multiple Input-Output Systems", The Bell System Tech. J., vol. 50, No. 3, pp. 1063–1081, Mar. 1971.

David G. Luenberger, "An Introduction to Observers", IEEE Trans. on Auto. Control, vol. AC-16, No. 6, pp. 596–602, Dec. 1971.

G. Binning, et al., "Surface Studies by Scanning Tunneling Microscopy", Phys. Rev. Lett., vol. 49, No. 1, pp. 57–61, Jul. 1982.

Dieter W. Pohl, "Some design criteria in scanning tunneling microscopy", IBM J. Res. Develop., vol. 30, No. 4, pp. 417–427, 1986.

G. Binnig & D.P.E. Smith, "Single-tube three-dimensional scanner for scanning tunneling microscopy", Rev. Sci. Instrum., vol. 57, No. 8, pp. 1688–1689, Aug. 1986.

K. Besocke, "An Easily Operable Scanning Tunneling Microscope", Surf. Sci. 181, pp. 145–153, 1987.

(List continued on next page.)

Primary Examiner—Thomas M. Dougherty
Attorney, Agent, or Firm—Foley & Lardner

[57] ABSTRACT

A piezoelectric positioner is accurately controlled to reduce the settling time of the positioner in response to a commanded change in position using velocity state feedback control. The velocity state feedback control uses an estimated velocity of the piezoelectric positioner generated by a velocity observer to provide active damping. The velocity observer has as inputs the same control signal which is provided to the piezoelectric positioner itself and the actual measured position of the positioner, and produces as an output the estimated velocity of the positioner. The velocity observer includes a model of the piezoelectric positioner's response to the control signal. The model includes estimates of physical parameters of the positioner including the physical mass, physical damping, and physical stiffness of the positioner. Position and velocity state feedbacks are used within the observer model, in combination with the actual measured position of the positioner, to drive a modeled position of the positioner to equal the actual position, thereby also to increase the accuracy of the velocity estimate. The observer state feedbacks reduce errors in the modeled position due to inaccuracies in the parameter estimations, noise, and unmodeled physical disturbances. The positioner control with active damping may be implemented in any system using a piezoelectric positioner. Active mass feedback, using an acceleration observer, may be added to the active damping feedback in piezoelectric systems in which the handling of force disturbances is required.

43 Claims, 19 Drawing Sheets

OTHER PUBLICATIONS

U.E. Bapst, "Automated Scanning Tunneling Microscope", Surf. Sci. 181, pp. 157–164, 1987.

Paul K. Hansma & Jerry Tersoff, "Scanning tunneling microscopy", J. Appl. Phys., vol. 61, No. 2, pp. R1–R23, Jan. 1987.

Sang–il Park & C.F. Quate, "Theories of the feedback and vibration isolation systems for the scanning tunneling microscope", Rev. Sci. Instrum., vol. 58, No. 11, Nov. 1987.

Sang–il Park & C.F. Quate, "Scanning tunneling microscope", Rev. Sci. Instrum., vol. 58, No. 11, pp. 2010–2017, Nov., 1987.

M. Locatelli, et al., "Easy method to characterize a piezoelectric ceramic tube as a displacer", Rev. Sci. Instrum., vol. 59, No. 4, Apr. 1988.

R.G. Carr, "Finite element analysis of PZT tube scanner motion for scanning tunnelling microscopy", J. Microscopy, vol. 152, pt. 2, pp. 379–385, Nov. 1988.

R.S. Robinson, "Increasing the scanning speed of scanning tunnelling microscopes", J. Microscopy, vol. 152, pt. 2, pp. 387–397, Nov. 1988.

O. Albrektsen, et al., "A compact scanning tunnelling microscope with thermal compensation", J. Phys. E: Sci. Instrum., vol. 22, No. 1, pp. 39–42, 1989.

Y. Kuk & P.J. Silverman, "Scanning tunneling microscope instrumentation", Rev. Sci. Instrum., vol. 60, No. 2, pp. 165–180, Feb. 1989.

D.P. DiLella, et al., "Control systems for scanning tunneling microscopes with tube scanners", Rev. Sci. Instrum., vol. 60, No. 6, pp. 997–1002, Jun. 1989.

S. Grafström, et al., "A compact scanning tunneling microscopy control and data acquisition system based on a Macintosh II workstation", J. Vac. Sci. Technol. A, vol.8, No.1, pp. 357–362, 1990.

S. Grafström, et al., "Design and detailed analysis of a scanning tunnelling microscope", Meas. Sci. & Technol., vol. 1, No. 2, pp. 139–146, 1990.

T. Tiedje & A. Brown, "Performance limits for the scanning tunneling microscope", J. Appl. Phys., vol. 68, No. 2, pp. 649–654, Jul. 1990.

J.E. Griffith, et al., "A scanning tunneling microscope with a capacitance–based position monitor", J. Vac. Sci. Technol. B, vol. 8, No. 6, pp. 2023–2027, Nov./Dec. 1990.

R.C. Barrett & C.F. Quate, "Optical scan–correction system applied to atomic force microscopy", Rev. Sci. Instrum., vol. 62, No. 6, pp. 1393–1399, Jun. 1991.

D. Jeon & R.F. Willis, "Feedback system response in a scanning tunneling microscope", Rev. Sci. Instrum., vol. 62, No. 6, pp. 1650–1651, Jun. 1991.

R.S. Robinson, et al., "A digital integrator and scan generator coupled with dynamic scanning for scanning tunneling microscopy", Rev. Sci. Instrum., vol. 62, No. 7, pp. 1772–1775, Jul. 1991.

Robert D. Lorenz & Keith W. Van Patten, "High–Resolution Velocity Estimation for All–Digital, ac Servo Drives", IEEE Trans. on Indus. App., vol. 27, No. 4, pp. 701–705, Jul./Aug. 1991.

A. Hammiche, et al., "The Surrey STM: Construction, development, and evaluation of a scanning tunneling microscope", Rev. Sci. Instrum., vol. 62, No. 12, pp. 3010–3021, Dec. 1991.

C. Julian Chen, "Electromechanical deflections of piezoelectric tubes with quartered electrodes", Appl. Phys. Lett., vol. 60, No. 1, pp. 132–134, Jan. 1992.

D. Scholl, et al., "Improved scanning tunneling microscope feedback for investigation of surfaces with micron–scale roughness", Rev. Sci. Instsrum., vol. 63, No. 9, pp. 4046–4048, Sep. 1992.

S.M. Clark, et al., "Hardware for digitally controlled scanned probe microscopes", Rev. Sci. Instrum., vol. 63, No. 10, pp. 4296–4307, Oct. 1992.

M.E. Taylor, "Dynamics of piezoelectric tube scanners for scanning probe microscopy", Rev. Sci. Instrum., vol. 64, No. 1, pp. 154–158, Jan. 1993.

Joseph Su, et al., "Vibration Control of an Active Mirror Pointing System", SPIE, vol. 1917, pp. 37–48, 1993.

P. Heuell, et al., "An adaptive scan generator for a scanning tunneling microscope", Rev. Sci. Instrum., vol. 65, No. 1, pp. 89–92, Jan. 1994.

Peter B. Schmidt & Robert D. Lorenz, "Design Principles and Implementation of Acceleration Feedback to Improve Performance of DC Drives".

Guoliang Ping, et al., "Control System Analysis of a Scanning Tunnelling Microscope," Meas. Sci. Technol., vol. 4, 1993, pp. 677–681.

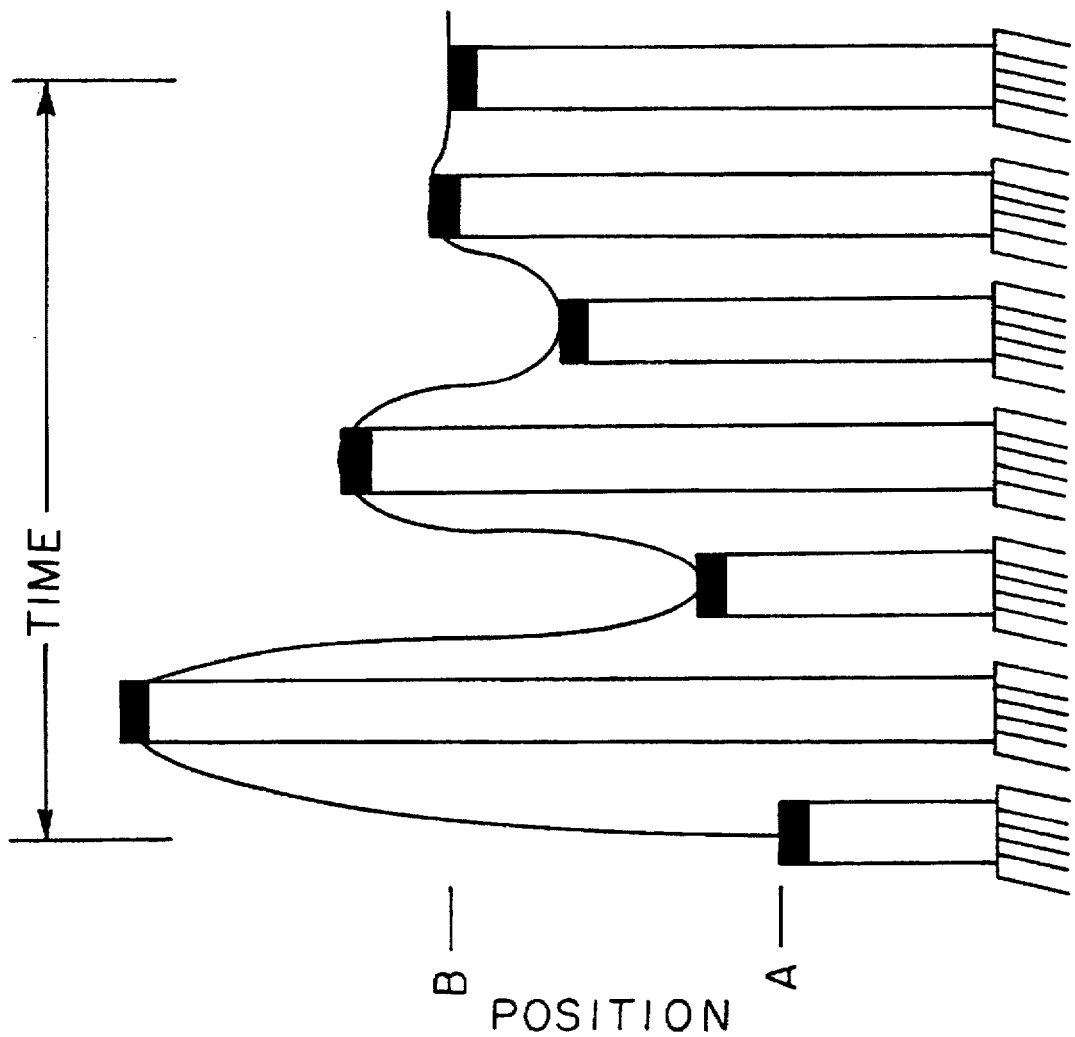
FIG. 5A  Closed Loop Position Control Only

METHOD AND APPARATUS FOR IMPROVED CONTROL OF PIEZOELECTRIC POSITIONERS

This invention was made with United States Government support awarded by NRL, Grant No. ONR 0014-93-1-0910 and NSF Grant Nos.: DMI9202885; DMR9121074; DMR9304912. The United States Government has certain rights in this invention.

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

FIELD OF THE INVENTION

This invention pertains generally to the field of piezoelectric positioners, used in devices such as scanned probe microscopes, position sensors, detectors, and scanned active elements in optical, electrical and mechanical systems, and particularly to the control of such positioners.

BACKGROUND OF THE INVENTION

Piezoelectric materials are materials which undergo dimensional changes when an electric field is applied. An electric field applied in the direction of polarization effects an expansion of the material in the same direction. Similarly, a voltage applied in the opposite direction to that of polarization will cause a contraction of the material in that same direction. The dimensions of piezoelectric materials can be controlled to a resolution on the order of angstroms. Moreover, piezoelectric devices can be operated over millions of cycles without wear or deterioration, are capable of response times under a millisecond, and have the potential to move weights in excess of several tons, depending on the size and configuration of the piezoelectric device. Single crystals of many compounds show piezoelectric properties, including quartz, Rochelle salt, ammonium dihydrogen phosphate (ADP), and Tourmaline. More recently, polycrystalline ceramic materials such as barium titanate and lead zirconate titanate (PZT) have been extensively developed for their piezoelectrical properties.

The piezoelectric expansion effect may be utilized for a variety of positioning and drive systems. Piezoelectrics have found particular utility as positioners for the scanning probes in scanned probe microscopes (SPMs) such as scanning tunneling microscopes (STMs) and atomic force microscopes (AFMs). The fine degree of control permitted by the use of a piezoelectric positioner enables the SPM to produce atomic scale images representing, for example, the topography of a sample's physical surface, or its electronic, magnetic, or other structure. This superior resolution capability makes SPMs potential candidates for use as process control tools in applications such as integrated circuit production. Piezoelectric materials are also employed as precision positioners for non-imaging applications. Instruments for measuring atmospheric absorption spectra utilize piezoelectric positioners to manipulate optical flats. Piezoelectrically actuated deformable mirrors comprise, for example, a peripherally clamped reflecting membrane having one or more regions coupled to respective piezoelectric actuators or positioners. Active roughness control for machine tools is also achieved with piezoelectric positioners. Piezoelectric positioners placed in machine tool fixtures actively move parts being machined in response to the torque required to turn the tool. The surface finish of the part is thus actively controlled in response to the sharpness of the tool. Active air journal bearings for precision engineering applications feature piezoelectric radial positioning of the bearing surfaces. Lithography researchers directly manipulate piezoelectric positioners to produce one micrometer spaced lines by precisely positioning the stage of an electron beam lithography apparatus. Micro-positioning work tables, and ultra sensitive force transducers, are other examples of applications employing piezoelectric positioners.

In all applications of piezoelectric positioners the accurate control of the positioner is both problematic and essential. A piezoelectric positioner used for the probe of an STM provides an example illustrating the problems associated with the control of piezoelectric positioners, and possible solutions to the problems. STMs are cross disciplinary instruments utilized in physics, chemistry, biomedical engineering and semiconductor manufacturing. Extremely high spatial resolution (<0.1 angstrom vertically, <4 angstroms laterally) enables the STM to produce atomic scale images representing the topography of a sample's physical surface, or its electronic, magnetic, or other structure. This high resolution is obtained by scanning a probe across, and very close to, the surface of a sample to be examined. A precision voltage source maintains a bias voltage between the tip of the probe and the conductive sample. A tunneling current is thereby induced in the sample which is exponentially proportional to the distance between the probe tip and the sample. The probe tip is moved in the Z (axial) direction, as it is scanned across the sample, in order to maintain the tunneling current at a constant level. The Z position of the tip throughout the scan is then used to derive a map of topology of the sample. The piezoelectric positioner is used to both scan the probe across the sample surface and adjust the Z position of the probe tip. Alternatively, the piezoelectric positioner may be used to move the sample in relation to a fixed scanning probe tip for scanning of the sample and Z position adjustment. A piezoelectric positioner may also apply torsional, or twisting motion to either the probe or the sample.

Each time that the Z position of the probe is adjusted to respond to a change in the sample's surface profile slope, a second order axial response (oscillation) is induced in the positioner. The scan of the surface cannot proceed until the oscillations decrease to the point where an accurate tunneling current, and an axial position of the probe, can be determined. Therefore, the scanning speed of the STM is highly dependent on the response of the positioner to a change in position. The more accurate and stable the response, the faster the scan can proceed. This scanning speed limitation particularly hinders the STM as a practical alternative to a Scanning Electron Microscope (SEM) for process control applications in areas such as integrated circuit production. The superior resolution of the STM can not be utilized unless its image acquisition (scanning) speed approaches the nearly instantaneous imaging of the SEM. (A common device size for integrated circuits is approximately one micrometer square, roughly twenty times the area of a typical STM image.)

The degree and duration of oscillations resulting from an induced axial change in the positioner is dependent upon the damping of the positioner. The optimum amount of damping results in the fastest system response. The optimally damped positioner will rapidly settle at the new Z position with a small degree of oscillation which will rapidly disappear. If the positioner is under-damped, the positioner will oscillate greatly, and for a significant period, before settling at its new Z position. This is the usual case for a piezoelectric positioner. It is also possible for a positioner to be over-damped, in which case oscillations will be minimized, but there will be a slow transition of the positioner to its new Z position.

Damping of a piezoelectric positioner is implemented in two ways, passive damping and active damping. Passive damping arises from the viscous forces that are generated as the positioner moves through the air or fluid in which it is immersed and/or from the structural damping caused by the inter-atomic viscous properties of the piezoelectric crystal structure. Thus, all piezoelectric positioners have a certain degree of natural physical passive damping. Passive damping sources typically produce force in proportion to the velocity of the positioner. The force always acts in opposition to the positioner's movement. Passive damping therefore consumes power whether or not the movement is in a desired direction. Nevertheless, supplemental passive damping, through modification of the positioner, has been used as a way of decreasing the number and amplitude of the secondary resonances in piezoelectric positioners. For example, to supplement damping of a tube-shaped piezoelectric positioner such as may be used in an STM, a polymeric liner, such as of nylon, may be bonded to the inside of the tube, or the entire inside of the tube may be filled with silicone rubber. Supplemental passive damping, however, has several drawbacks. Passive damping materials are limited in the amount of supplemental damping that they can provide. To achieve optimal damping would generally require more than the maximum obtainable from the supplemental passive method. Higher levels of passive damping would also begin to affect the positioner's sensitivity. Moreover, as already mentioned, passive damping consumes additional power for any motion. The damping is not selectively applied. Thus, heat dissipation can become a limiting factor, particularly if the positioner is operated within an ultra-high vacuum (UHV) chamber, as is the case for a STM. Also, the materials used for damping may not be vacuum compatible. Silicone rubber, in particular, has an especially high vapor pressure.

Active damping is supplied by a controller which adjusts the control signal applied to the positioner in order to alter its position. Importantly, in active damping power is consumed only when the active damping is employed to counter the positioner's motion in an undesirable direction. The desirable properties of active damping are obtained by applying state gain to the velocity state feedback from the piezoelectric positioner. The preferred method is to implement active damping within the positioner controller. The purpose of the positioner controller in an STM, for example, is to maintain the tunneling gap, the distance between the probe tip and the surface of the sample being examined, in the presence of a disturbance. For the STM the disturbance is induced by the scanning motion of the positioner and is, in actuality, representative of the topography of the sample surface. The position (gap distance) state is controlled using a measure of the position error and a position state gain. Thus the observed position of the probe tip, derived from the tunneling current, is compared to the commanded position and the difference multiplied by a position state gain to produce a signal which is then used to drive the positioner. An integration of the position state error, multiplied by an integrated position state gain, may also be included in the signal used to drive the positioner to improve its steady state response. In this way the position state is controlled. However, position state controllers, like those typically used to control the piezoelectric positions in an STM, lack the velocity state feedback signal necessary for the implementation of active damping.

FIG. 1 is a schematic of a typical prior art attempt at providing combined position and velocity (damping) control. In this type of control system a position sensor 20 is used to determine the measured position Z of a piezoelectric positioner 21 such as the tube positioner of an STM. The measured position Z is then combined with a commanded position Z* at a comparator 22 to determine the position state error. The position error signal is integrated by an integrator 23 and applied to an integral state gain 24 and is applied directly to a proportional state gain 25 to provide position state control as described above. A velocity state control component is needed to supply the active damping. Since velocity is the time rate of change, or derivative, of position, the velocity error can be obtained by differentiating the position error signal at a differentiator 26. The result of the differentiation is then multiplied by the velocity state gain 27 to provide an active damping component. The position and velocity components are combined at a summing junction 28 to form a control signal which is fed to the amplifier 29, which in turn drives the positioner 21.

The velocity state gain 27 is known as a differential gain and the combined controller is referred to as a PID, or proportional-integral-differential controller. Theoretically, active damping via differentiation should be able to provide any degree of supplementary damping desired. Practically, the damping supplied is usually far from optimal in piezoelectric positioner systems. The problem stems from the differentiator's propagation of noise which commonly becomes so great that resonances are excited and instability soon occurs. Little, if any, state gain is provided before the amplitude of the noise dominates. This is particularly a problem for an STM since the tunneling current signal (from which the position is determined) is inherently noisy. To counter the noise problem, low pass filters may be placed before the differentiator 26. Unfortunately, the filters add phase lag to the system, diminishing the phase margin. Therefore, while the noise is reduced, instability still occurs.

Since obtaining the velocity state through differentiation of the available measured state, position, is limited by the noise which is propagated, another approach is to provide a second measured state, the velocity, specifically for active damping. Such a system is shown in FIG. 2 with reference numerals from FIG. 1 carried over to refer to components having the same function in FIG. 2. Utilizing the feedback from a velocity sensor is a well understood practice for servomotor control. A velocity sensor 30, such as a tachometer attached to the shaft of the servomotor, is used to produce the velocity feedback signal. A position sensor 20 is used to provide the position feedback signal. The position feedback is used in the same way as in a normal position controller, being integrated by an integrator 23 and applied to an integral gain 24, with the result added at a summing junction 28 to the error signal passed through a proportional gain 25. The measured velocity is compared to the velocity command at a junction 31 and the difference taken. The difference is the velocity state error. The velocity state error is then multiplied by the velocity state gain 32 to produce an active damping signal which is also added at the summing junction 28. The combined velocity and position components form a positioner control signal which is then applied through the high voltage amplifier 29 which drives the positioner 21. No differentiation takes place, so only noise produced by the velocity sensor 30 is present. This noise is usually not a limiting factor in the degree of damping that can be produced.

As in the case of the differentiator, the velocity state gain 32 determines the amount of active damping. However, the implementation of a sensor to measure the velocity of a piezoelectric positioner poses many problems. This is especially true for the measurement of velocity in any small piezoelectric device, such as measurement of the Z direction velocity of a tube positioner in an STM. The primary problem is resolution. The velocity of the positioner can be on the order of nanometers per second. This is below the resolution of any commercially available velocity sensor. Development of a sensor for this purpose would be of the complexity, and potentially the cost, of the creation of the STM itself. Attachment of such a sensor to the positioner would also alter its response. (The mass of the sensor would also have to be accelerated by the positioner.) Since the mass of the scanning probe tip and tip holder are less than 1 gram, the mass of the velocity sensor 30 is likely to be as large or larger than the tip mass. Also, the sensor would have to be as small, or smaller than, the tube positioner. A large device would make vibration isolation and sample manipulation difficult.

Where measurements of a physical system's states cannot be obtained, estimates of the states may be obtained through the use of a model of the physical system. By applying the same inputs to the model as are applied to the physical system, estimates of the actual states are obtained. This type of model of a system is known as an open-loop observer. Since the open-loop observer is intended to be a model of a real system, the dynamics of the observer are ideally identical to that of the physical system. However, these open-loop dynamics may be undesirable. In addition, open-loop observers are sensitive to variations in the physical parameter estimates which go into them, as well as the effects of unmodeled disturbances. Such practical problems detract from the observer's use as a state estimator. However, since one or more of the physical system's states are usually measured, a measured state can be used to produce the difference between the measured state and the corresponding estimate of that state in the observer (i.e., an observer state error). In this fashion, the estimate can be forced to track the actual state. One type of observer using this method to improve estimation accuracy is known as a Luenberger observer. Such observers have been used for producing velocity estimates for rotary electric machines. In such observers, measured motor position is utilized for error correction of the velocity state estimate.

SUMMARY OF THE INVENTION

In accordance with the present invention, active damping is provided for piezoelectric positioners using velocity state feedback and employing a velocity state observer which estimates the velocity state based on a model of the physical positioner and a measured accessible parameter. The observer model of the present invention may be implemented as a fixed electrical circuit, in a programmed digital processor, or in software. The active damping provided by the present invention is particularly suited for application in scanning tunneling microscopes (STMs) using piezoelectric positioners for the positioning of scanning probes, but is also applicable to any other positioning device in which piezoelectric actuators are utilized.

The observer employed to generate the velocity state estimate requires a dynamic model of the piezoelectric positioner being controlled. Proper modeling requires estimates of the physical mass, physical damping, and physical stiffness parameters of the piezoelectric positioner being controlled. A force constant parameter of the piezoelectric positioner may also be derived for use in the observer. For long and thin piezoelectric actuators which are polarized perpendicular to the long axis, such as a tube positioner used in an STM, these are the only quantities needed. By including an estimate of cross coupling strain in the observer model, the response of any shaped piezoelectric actuator can be estimated.

A modified Luenberger observer is preferably employed for producing the velocity state estimate. A measured state is used to produce a difference between the measured state and the corresponding estimate of that state in the observer, and in this fashion the estimate can be forced to track the actual state. In accordance with the present invention the measured position state is used to generate an observer position state error signal. For the STM, the measured position state may be derived from the STM tunneling current. The observer uses the measured position state signal to produce the observer position state error signal by taking the difference between the measured position state and the observer's estimate of the position state. This observer position state error signal is multiplied by an observer position state gain. The integral of the observer position state error signal is multiplied by an integral state gain. An observer velocity state gain applied to the observer position state error is also used to generate the estimated velocity state signal. The use of the state feedback controls within the observer itself results in accurate velocity estimates despite deviations in the modeled parameters from the physical parameters, and the presence of unmodeled disturbances.

Improved control of a piezoelectric positioner is then achieved by use of the estimated velocity in a combined position and velocity feedback control of the positioner. The estimated velocity signal is compared to the commanded velocity of the physical system and the difference is multiplied by a velocity state gain. The result is added to position and integral position feedback signals for combined position and velocity control. This combined control results in accurate control of the positioner with rapid settling of any oscillations resulting from commanded changes in position. The degree of oscillation suppression is greater than can be achieved by position feedback control alone, or by position state feedback in combination with supplemental passive damping techniques. This active damping technique also uses less power than supplemental passive techniques. The use of the velocity observer in accordance with the invention obviates the need for direct measurement of a positioner's velocity and avoids the noise propagation problems associated with velocity estimation based on the differentiation of the position state.

In an alternative embodiment of the present invention, active mass may be provided in addition to active damping by use of an accelerator observer which provides an estimate of the acceleration of the positioner. The acceleration observer employs the same parameters as are used in the velocity observer.

The piezoelectric positioner control of the present invention may be used to provide active damping of piezoelectric positioner oscillations in applications as diverse as atomic force microscopes (AFMs) and disk braking systems for automobiles using piezoelectric pressure control. Other potential applications of this type of controller include: Fabry-Perot interferometers, shaker/vibration testing equipment, ultrasonic welding machines, ultrasonic cleaners, vibratory feeders, the applications listed in the previous section, and others.

Further objects, features and advantages of the invention will be apparent from the following detailed description when taken in conjunction with the accompanying drawings.

BRIEF DESCRIPTION OF THE DRAWINGS

In the drawings:

FIG. 5A is an exemplary graph of the response of a piezoelectric positioner to a commanded change in position where the positioner is under closed loop position control only.

DETAILED DESCRIPTION OF THE INVENTION

Piezoelectric actuators have found utility as positioners in many devices. One of the more demanding applications in which such positioners have been applied, and requiring some of the most highly accurate control of the positioner, is in scanned probe microscopes (SPMs), such as atomic force microscopes (AFMs) and scanning tunneling microscopes (STMs). As such, this disclosure will describe the present invention with reference to the specific example of an STM. It is understood, however, that the present invention may be applied in any system employing a piezoelectric positioner or actuator. Additionally, this description will concentrate on axial (Z-direction) control of the STM positioner. It should be noted that velocity control (active damping) could also be applied to the X and Y motion of the piezoelectric positioner in accordance with the present invention.

Figure 3:
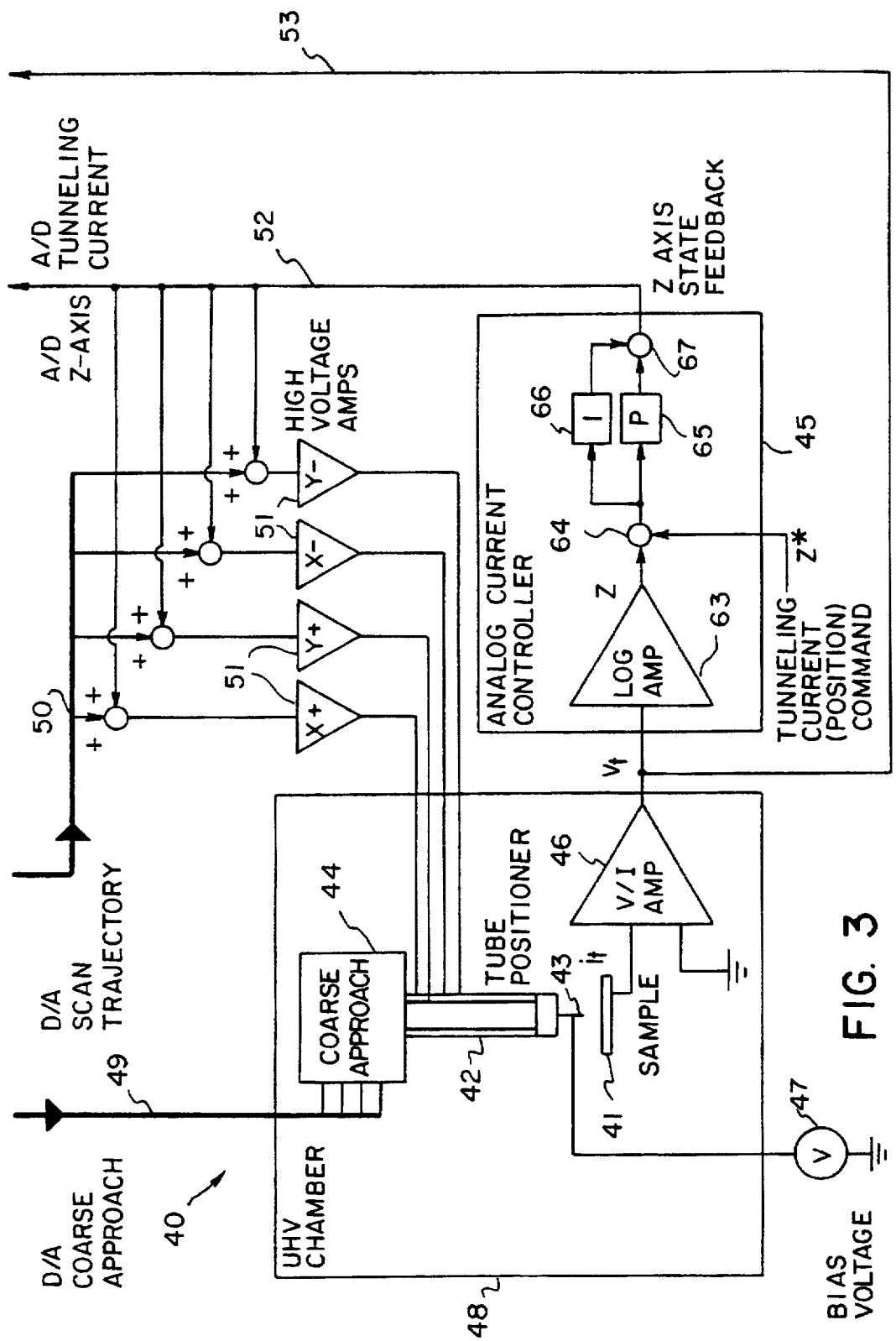
FIG. 3 is a schematic diagram of a scanning tunneling microscope having a piezoelectric positioner which may be controlled using active damping in accordance with the present invention.

An exemplary STM is shown generally at 40 in FIG. 3. The STM 40 has extremely high spatial resolution and is, therefore, able to produce atomic scale images representing the topography of the surface structure of a sample 41. The fundamental components of the STM are a tube shaped piezoelectric positioner 42 with a probe tip 43, the conductive sample 41, (which may be supported on a sample stage), a coarse-approach mechanism 44, a positioner controller 45, and a transimpedance amplifier 46. (Tube positioners are also used in other SPMs such as AFMs.) The tube positioner 42 with its tip 43 is mounted to the coarse approach mechanism 44. The mechanism 44 can move the positioner 42 forward or back from the sample surface 41 several millimeters. When the coarse approach mechanism 42 is moved back from the sample 41 there is sufficient space between the probe tip 43 and the sample 41 for manipulation of the sample 41. When the coarse approach mechanism 44 is moved forward, the probe tip 43 approaches the sample 41 to within the tunneling range (5 to 10 angstroms from the sample surface). The expansion or contraction of the tube positioner 42, regulated by the current controller 45, maintains the gap distance between the scanner tip 43 and the sample 41 once within tunneling range, as described in more detail below. A precision voltage source 47 maintains a bias voltage between the probe tip 43 and the conductive sample 41. As the tip 43 is scanned across the sample surface 41 a tunneling current flows from the sample 41 to the transimpedance amplifier 46 where the current is converted to a proportional voltage. With the exception of the controller 45, all of the fundamental components of the STM are frequently contained within an ultra-high vacuum (UHV) chamber 48.

Figure 1:
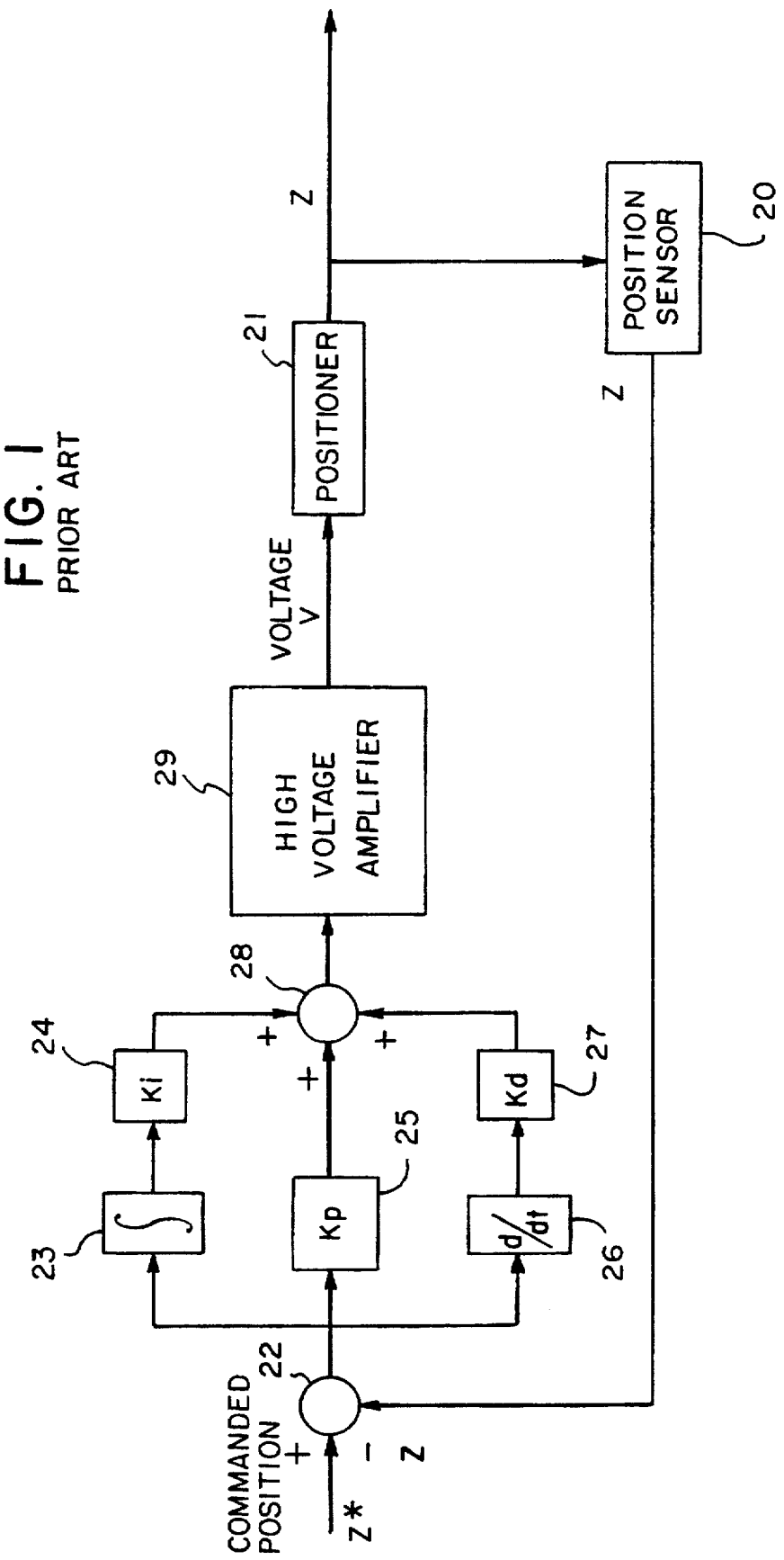
FIG. 1 is a block diagram of a prior art controller for a piezoelectric positioner wherein damping is provided by differentiation of the position state.
Figure 2:
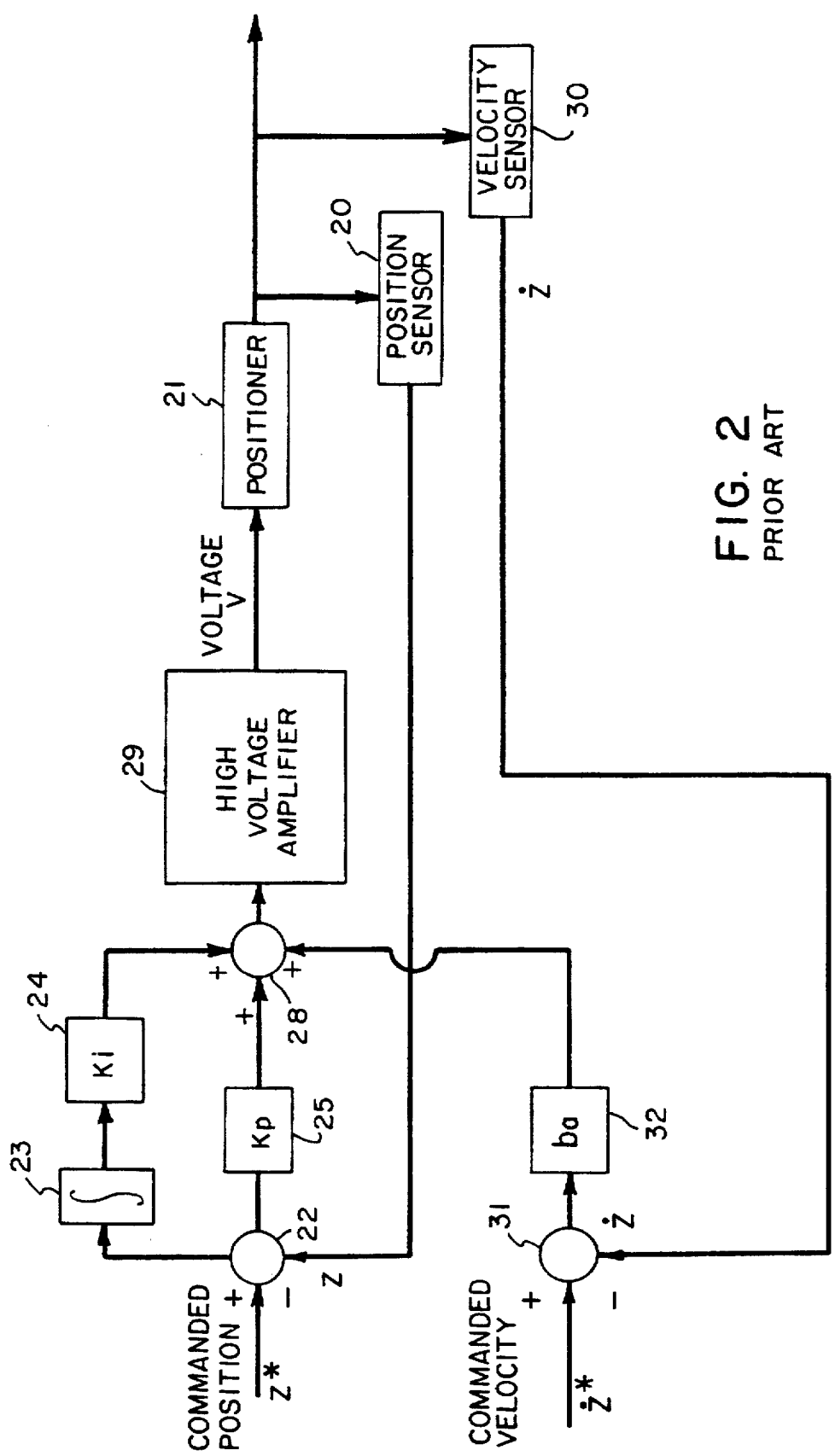
FIG. 2 is a block diagram of a prior art controller for a positioner wherein damping is provided through the use of a velocity state sensor.

Secondary conventional components of the STM (not shown in FIG. 1) include a drive circuit and digital to analog (D/A) converter for providing a signal on a line 49 to the coarse approach mechanism 44 for coarse positioning of the scanner 42, data acquisition and storage devices, and imaging control and display devices. These secondary components of the STM are typically coordinated under control from a central processing unit such as that of a personal computer.

During operation of the STM, D/A converters (not shown) provide coordinated X and Y scanning commands from the central processing unit on a line 50 to high voltage amplifiers 51 which drive the tube positioner 42 to scan laterally across the sample 41. The controller 45 simultaneously regulates the tunneling gap, as described below, by the use of a Z position control signal on a line 52 fed back to the high voltage amplifiers 51. Voltages representative of the Z position and the tunneling current are also fed back on lines 52 and 53, through analog to digital (A/D) converters, to the system computer. These data are stored in random access memory and may be transferred to storage on a hard disk.

Data analysis is performed, and a pixel map of Z axis voltage (position) versus X and Y axis voltage (position) is displayed. Since the data content is often higher than the resolution of the computer's video display, a graphics controller may be employed to display and/or record the scanned image in video format. Image enhancement, line scans, remote current and bias voltage setpoint selection, and off-line data analysis are also commonly incorporated into the system software. Z axis state feedback hold circuitry (utilized for spectroscopic study), log-linear selection, and variable integrator gain are enhancements commonly and conventionally incorporated into the controller 45.

The STM just described is typical of SPM systems. Details of the construction and operation of SPM's are well known to those skilled in the SPM art. It is understood that the active damping method of the present invention could be applied to any SPM system using a piezoelectric actuator for positioning of the probe tip, including SPM systems wherein the controller 45 is implemented digitally. Moreover, the present invention is not limited to SPM applications, but may be applied in various applications employing piezoelectric positioners, such as those listed previously in the Summary and Background of the Invention sections.

A precise driver for the tunneling tip 43 in three orthogonal directions is an essential component of an STM. Obviously, no purely mechanical apparatus can provide atomic precision in motion, and therefore, STMs conventionally use piezoelectric positioners to position the tip. A piezoelectric tube positioner 42, as used in the STM described above, is described in more detail with reference to FIG. 4. The tube positioner 42 includes a hollow cylindrically tubular shaped piezoelectric tube 54 with a tip holder 55 fastened to one end of the tube 54. The opposite end of the tube 54 is mounted on the coarse approach mechanism base 44 (not shown in FIG. 4). The probe tip 43 is mounted in the center of the tip holder 55. The tip 43, for example, made of tungsten for STM applications, is held in the tip holder 55 by a holding mechanism such as a small screw 56. The screw 56 also serves as the electrical connection to the tip. Other ways of connecting the tip to the tube 54, and of making the electrical connection, include use of a conductive epoxy, hypodermic tubing, soldering, press fitting, etc. The tube positioner 54 is typically constructed of a hard PZT (lead zirconate-titanate) piezoelectric material which is radially—i.e., from the inside of the tube to the outside of the tube, or vice versa—polarized. The inner diameter 57 of the tube 54 is coated with electroless nickel to form an inner electrode. The outer diameter is similarly coated, but separated into four symmetric electrodes, i.e., quadrants 58, 59, 60, and 61 (hidden in FIG. 4) separated by 0.5 mm wide longitudinal strips 62 that are not coated. Note that the tube 54 may also be formed of serially or concentrically connected piezoelectric tubes. The present invention is, of course, applicable to such other similar configurations.

To drive the tip 43 laterally across the sample 41, voltage signals with the same amplitudes but opposite signs are applied for example to one pair of oppositely positioned quadrants 58, 60, or 59, 61. Due to the piezoelectric effect, one of the quadrants expands and the other contracts in the axial Z direction. The tube thus becomes slightly bent and the tip moves laterally. The bending angle is on the order of $10^{-4}$ radians even for the broadest scanning range. Axial strain due to the lateral motion is, therefore, negligible. By applying the proper voltages to the outer electrodes 56–61 with respect to the inner electrode 57 the overall length of the positioner tube 54 may be adjusted simultaneously with the lateral movement. It is in this way that the axial position of the tip 43 is adjusted to maintain the tunneling gap between the tip 43 and the sample surface 41.

As the tip 43 is scanned across the sample surface 41 the varying topography of the surface will cause the distance between the tip 43 and surface of the sample 41 to either increase or decrease. As this occurs, the tunneling current will vary at an inversely exponential rate with respect to the gap distance. In other words, the tunneling current will decrease exponentially as the gap increases and increase exponentially as the gap closes. The STM converts the tunneling current to a proportional voltage level by use of the transimpedance amplifier 46. In the controller 45 this voltage level is converted to a value representing the Z position state of the tip 43 by the use of a logarithmic amplifier 63. Inside the controller 45 the actual measured Z position is compared to a commanded position Z* by a comparator circuit 64. For the case of the STM, the commanded position Z* is a fixed distance from the sample surface since the tunneling gap is to remain constant. This comparison produces a position error signal. This error signal is multiplied by position state gains which are proportional to the error signal itself 65 and proportional to the integral of the error signal 66. The results are combined at a summing junction 67 and used to form the Z axis position state control signal on the line 52 which is, in turn, used to feed the high voltage amplifiers 51 which drive the electrodes 58–61 which will position the tip 43 to maintain the tunneling gap.

As the positioner 42 moves the scanning tip 43 into a new position, in response to a change in the topography of the surface being scanned 41, the positioner will tend to overshoot the position it is moving toward. The positioner will then oscillate about the new position before finally stabilizing at the new position. FIG. 5A shows an example of this behavior, such as might be experienced by an STM using the position controller as shown in FIG. 3. Initially the tunneling tip 43 is located at position A (in the Z direction). As the tip is scanned across the surface of the sample 41 a change in topography of the sample requires that the tip be moved to position B to maintain the tunneling gap. However, the positioner initially overshoots position B, oscillating about the new position momentarily until settling at the steady-state level at position B. The time required to reach the steady-state level limits the speed with which an STM may be operated. The tip 43 must be allowed to settle at the new position to allow an accurate position reading to be taken before the tip can be scanned to another point along the surface of the sample 41. This same effect, and corresponding control problem, is encountered whenever piezoelectric actuators are used as positioners, and is not limited to the STM positioner.

Figure 5B:
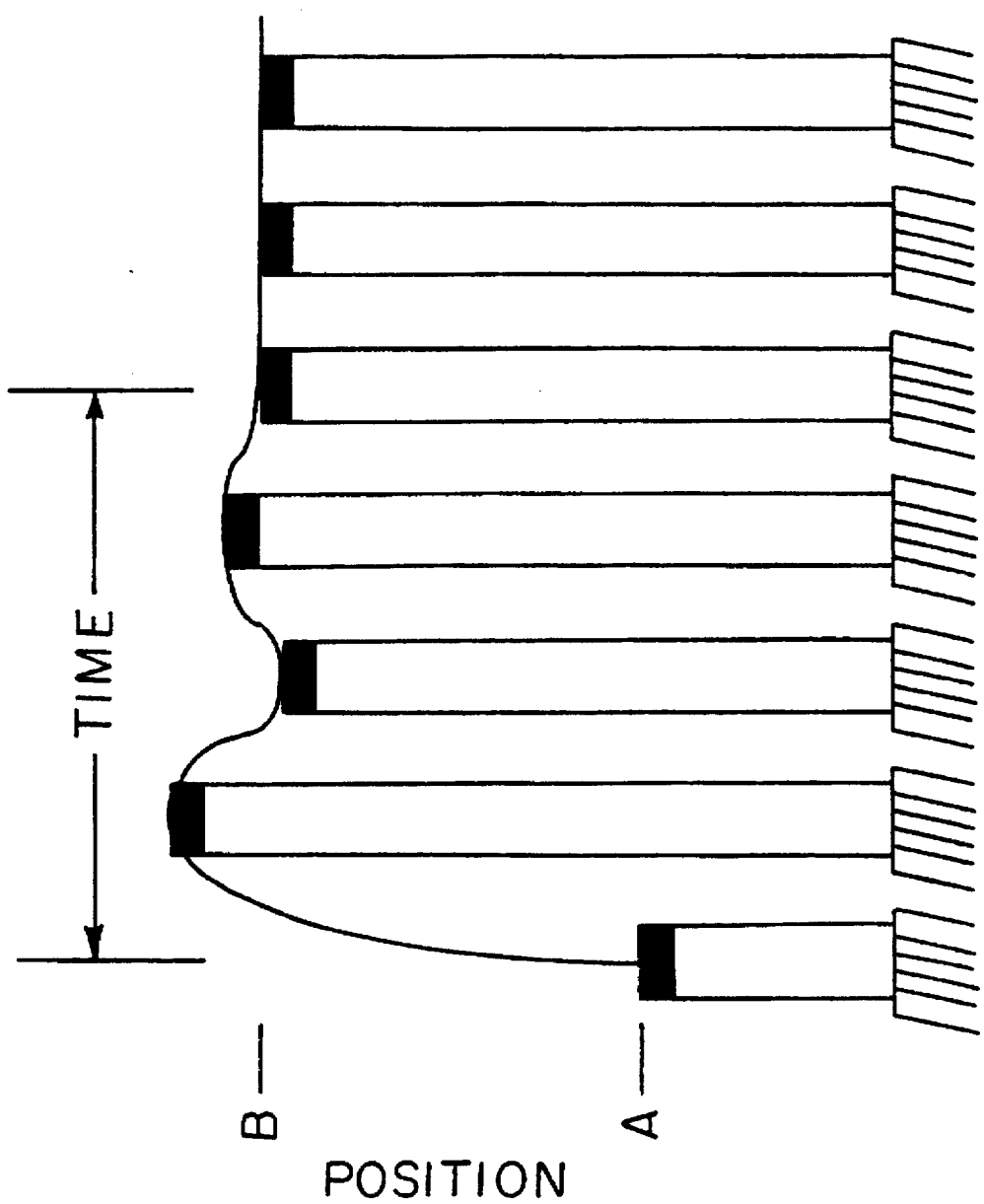
FIG. 5B is a similar graph with closed loop position and velocity control (damping).

A common measure of the speed of response to a step input is the settling time, which may be defined as the time required, following the initiation of the step input, for the output to enter and remain within a specified band about the stead-state value (e.g., within +/−2% or +/−5%). As is shown in FIG. 5B the settling time can be reduced, and the scanning speed of the STM increased, by the addition of a velocity control feedback component, known as active damping, to the basic position based controller. In this case, in the transition of the scanning tip 43 from position A to position B, the overshoot of the new position is much less, and the tip will settle at the new position B much more rapidly.

The force which is applied to the positioner to reduce the settling time and which is a function of the velocity of the positioner is known as the damping force. As discussed above, damping may be passive or active. All piezoelectric positioners will have some degree of natural passive damping. However, supplemental passive damping sources typically produce force in proportion to the velocity of the positioner, and consume power whether or not the movement is in a desired direction, and incur other limitations and disadvantages as previously noted.

Active damping, however, is applied to the positioner from the controller so that energy is consumed only when the active damping is used to counter the positioner's motion in an undesirable direction. However, active damping requires some knowledge of the velocity state of the positioner 42. As previously noted, determination of the velocity state through direct measurement or differentiation of the position state is of limited practicality or effectiveness.

Figure 6:
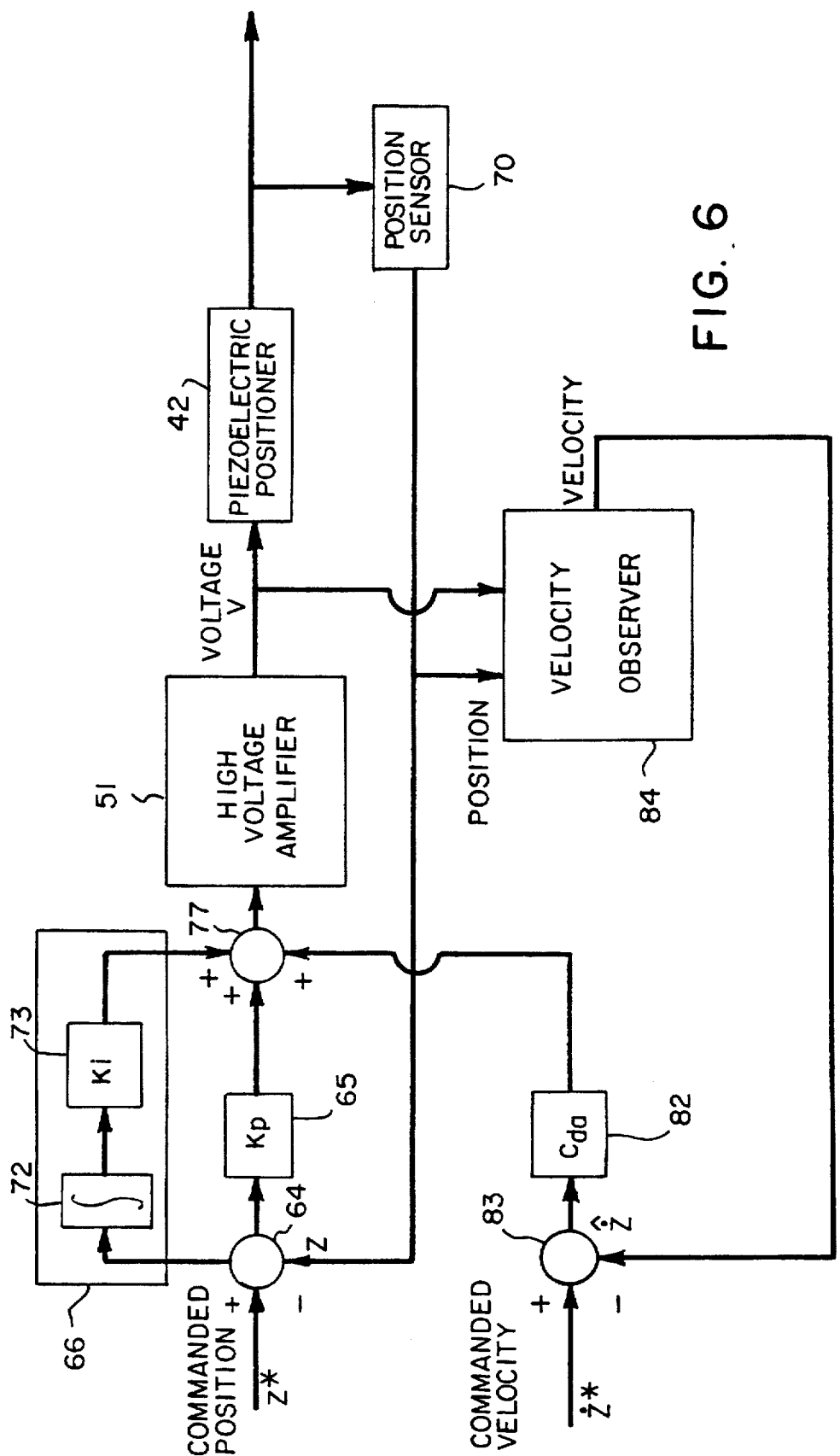
FIG. 6 is a simplified block diagram of the piezoelectric positioner controller of the present invention wherein active damping is provided by the use of a velocity observer.

In accordance with the present invention velocity control feedback (damping) is provided by obtaining the velocity state without differentiation or the need for a velocity sensor. The velocity state is obtained by estimation through the use of a velocity observer. The combined position and velocity based control system of the present invention is shown in FIG. 6. Note that the control system shown in FIG. 6 may be incorporated into the controller 45 of the STM 40 shown in FIG. 3. Therefore, components of the controller system shown in FIG. 6 which correspond to components of the STM 40 are labeled with the same reference numerals. This does not imply that application of the control system of the present invention is limited to SPMs. Position control feedback is provided by comparing the measured position signal provided by a position sensor 70 with a commanded position signal at the comparator 64 to generate a position error signal. The position error signal is then integrated by an integrator 72 and an integral state gain 73 is applied. A proportional gain 65 is applied directly to the position error signal. A velocity state error signal is also generated and a velocity state gain 82 applied to the error signal and combined with the position control state components at a summing junction 77 to form a positioner control signal which is fed through the high voltage amplifier 51, to drive the piezoelectric positioner 42, such as the tube positioner of the STM 40. The components just described form the control signal generating portion of the positioner control system. Various modifications to this basic structure are possible. For example, either one of the proportional or integral position feedback loops may be eliminated.

The velocity state error signal for the piezoelectric positioner 42 is determined at the output of a summing junction 83 based on the commanded velocity and an estimated velocity which is generated by a velocity observer 84. The velocity observer 84 is a model of the piezoelectric positioner 42 and its response to the control signals which are applied to it. Therefore, if the same drive signal from the high voltage amplifier 51 which is applied to the physical piezoelectric positioner 42 is applied to the estimated velocity state observer 84 the estimated velocity state signal produced by the observer 84 should match the actual velocity of the positioner 42. To compensate for variations between the modeled parameters in the observer 84 and the physical parameters of the positioner 42, as well as the effects of unmodeled disturbances, the measured position state is used by the observer 84 to force the estimated position state of the observer to track the actual position state.

It should be noted that the observer and the control signal generation components are preferably implemented in an electrical hardware circuit. Such a circuit may be digital or analog in nature, or a hybrid digital/analog circuit. The observer/controller may also be implemented in software in a digital circuit, but sufficient processor speed must be assured. Exemplary embodiments of the present invention as implemented in analog circuits and a software controlled digital circuit are described in more detail below.

Figure 7A:
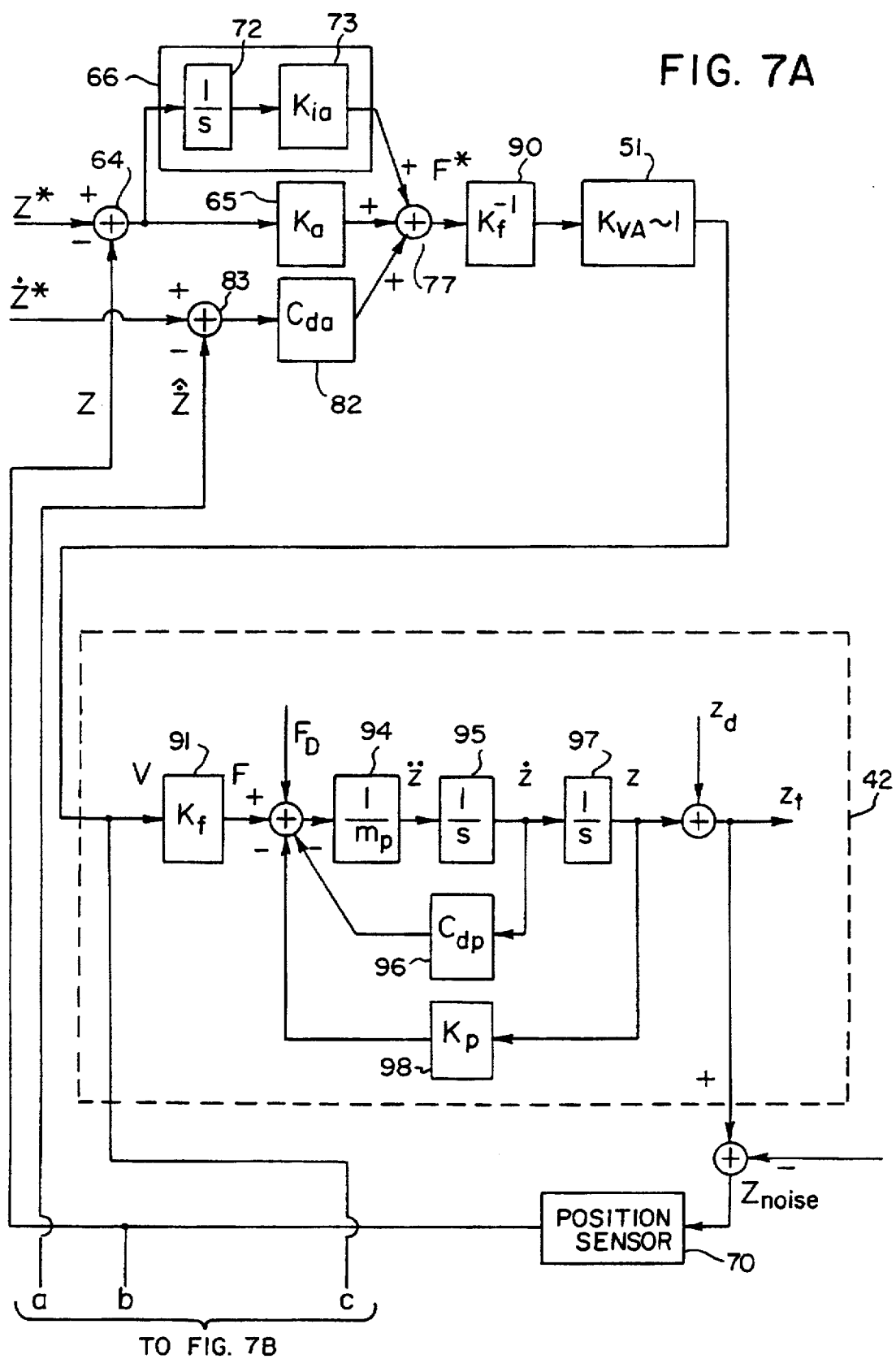
FIG. 7 is a more detailed block diagram of the piezoelectric positioner control system of the present invention showing the parameters of the physical positioner which are modeled in the observer and the interaction of those parameters.
Figure 7B:
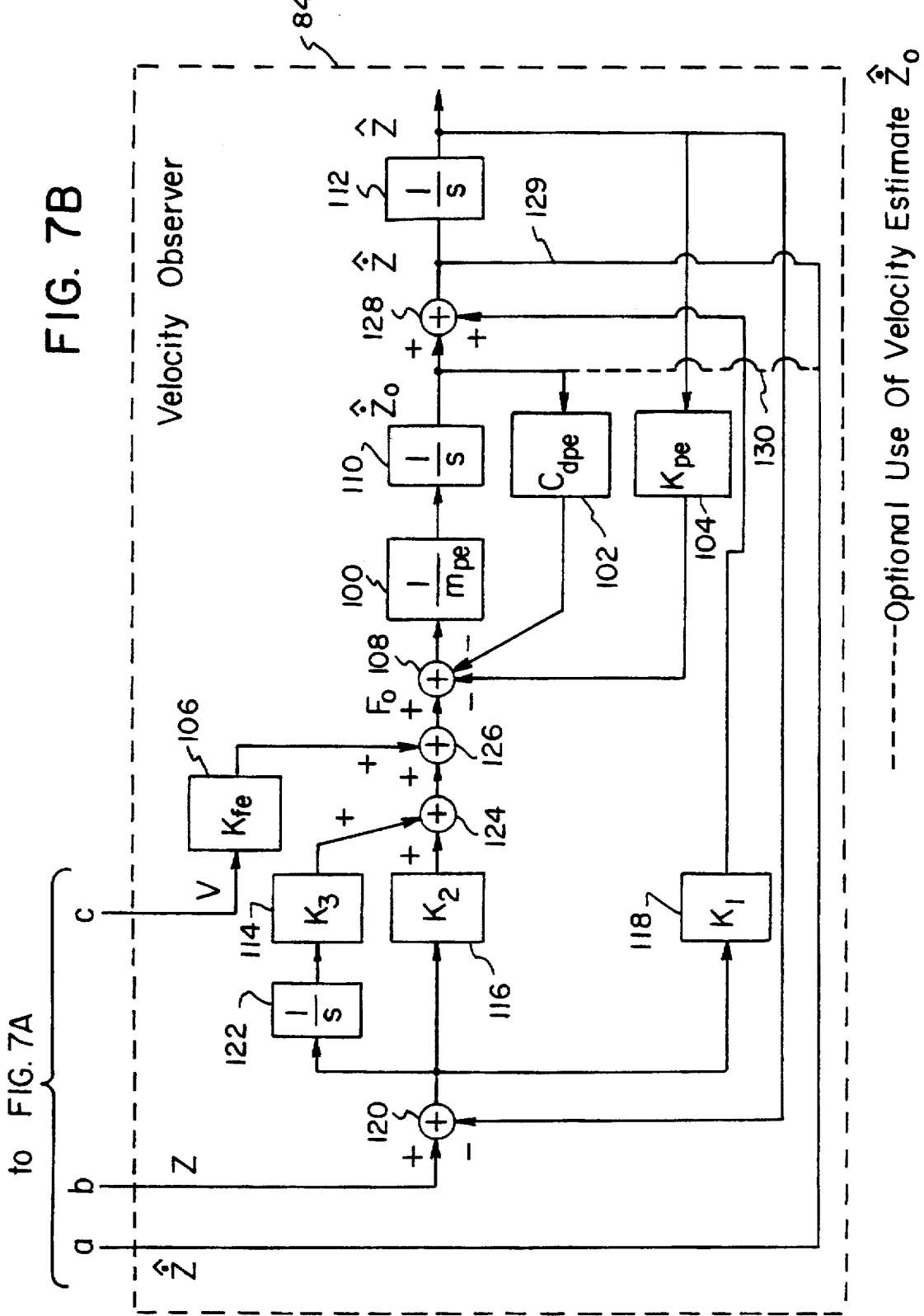

The operation of the present invention to provide a piezoelectric positioning system controlled with active damping through the use of a velocity observer may be provided with reference to the detailed block diagram of FIG. 7. In FIG. 7, quantities with a "^" are estimates of the actual physical quantities. Control of the piezoelectric positioner is accomplished through a combination of position and velocity state feedback. The position state of the piezoelectric positioner 42 is determined by measurement through a position sensor 70 which generates a position state signal as described above. This measurement may be made in any manner convenient for the positioner being controlled, such as by use of an optical detector attached to the positioner 42, or by use of a strain gauge to obtain the position feedback. Other position sensing devices including encoders, variable resistances, or electromagnetic position sensors may also be used. In the case of a piezoelectric probe positioner for a STM 40 the measured position Z is determinable from the tunneling current using, e.g., a transimpedance and a logarithmic amplifier. As described above, the measured position Z is compared with the commanded position at a junction 64 to form a position state error signal.

The position state error signal is then integrated by an integrator 72 and multiplied by an integration gain $K_{ia}$ at a gain circuit 73. (The 'a' in the subscript indicates an active feedback parameter as opposed to passive feedback resulting from the physical characteristics of the positioner 42.) The position state error signal is also multiplied by a proportional gain $K_a$ at a gain circuit 65. This provides the position component of the control signal in the manner described earlier.

Simultaneously, a commanded velocity is compared to an estimated velocity at a node 83 to produce the velocity state error. The velocity state error is multiplied by a velocity state gain $C_{da}$ at a gain circuit 82. This provides the velocity state component (active damping) of the control signal. The velocity and position control components are added together at the junction 77 to form the force state feedback control signal which is applied to a high voltage driver 51 which drives the physical piezoelectric positioner 42. The combined effect of the position and velocity control feedback loop is to cause the physical positioner 42 to quickly settle at the commanded position.

In the exemplary controller shown in FIG. 7, before being fed to the high voltage amplifier 51, the force state feedback is first multiplied by the inverse of the force constant $K_f$ of the physical positioner at a gain circuit 90. The force constant is the ratio (or transfer function) of the force generated in the physical positioner to the voltage applied to the positioner. The force constant $K_f$ is a parameter 91 specific to the physical piezoelectric positioner 42. It is typically used to determine the gain of the high voltage amplifier 51; however, it can be seen that if the force state feedback is the amount of force that needs to be applied to the physical system to achieve the desired position, then, if the force state feedback is divided by the force constant $K_f$, the result is the voltage level required to generate the desired amount of force in the physical system 42. In this case, the gain of the high voltage amplifier 51 may be set approximately equal to 1.

The degree of integrated and proportional position state gain, and velocity state gain, which can be applied to the physical positioner 42 is limited by the amount of power which the gain amplifiers can provide, and the amount of power which the physical positioner 42 can be provided. The amount of power that an amplifier can supply is, of course, limited, in part by the rate at which it can dissipate its power loss in the form of heat. Likewise, the amount of power that a positioner can handle is dictated by the rate which it can dissipate its power losses. Within these physical limitations, the active state gains $K_{ia}$, $K_a$, $C_{da}$, are tuned, preferably so as to minimize the amount of settling time required by a change in position of the positioner 42. If minimum settling time without any overshoot is desired, the gains may be adjusted to provide critical damping. Tuning may be accomplished in the normal manner for a system having position and velocity state gains. The methods used to tune the gain values are known to those with skill in the art of feedback control.

To determine the velocity state error, which is required by the controller, the commanded velocity signal is compared at the junction 83 to an estimate of the actual velocity of the physical system which is generated by the velocity observer 84. The velocity observer 84 is used to accurately estimate the actual velocity to avoid the difficulties posed by velocity estimates determined through the differentiation of the position state error signal or direct measurement of the velocity, as de The velocity observer 84 estimates the actual velocity of the physical positioner 42 by the use of a model of the physical system and its response to a given control signal. To create this model the parameters of the physical positioner 42 which affect the positioner's response to a commanded change in position need to be identified and then quantitatively determined. Any dynamic model of a piezoelectric positioner must start from an understanding of the physics governing the positioner response. From the physical principles, the relevant physical parameters, and expressions for their interrelationships, can be determined. Thereby, through various modeling techniques known in the art, linear expressions suitable for control purposes may be generated. Generic modeled physical parameters and their interactions are described below.

There are three main physical parameters which determine the physical positioner's response to a commanded change in position. The mass of the physical positioner, $m_p$, tends to oppose any acceleration of the positioner. The physical damping, $c_{dp}$, of the physical positioner, arising from the viscous forces that are generated as the scanner is moved through the air/fluid in which it is immersed and/or from the structural damping caused by the inter-atomic viscous properties of the piezoelectric positioner's structure, opposes any movement (velocity) of the physical positioner 42. The physical stiffness $K_p$ of a physical positioner, is the natural physical force which opposes a given position of the physical positioner 42. These physical parameters act as acceleration 94, velocity 96, and position 98 feedbacks in the physical positioner 42 itself and may be modeled as a second order linear system. (The integrators 95 and 97 in the physical positioner 42 indicate the relationship between the acceleration, velocity, and position of the positioner 42.) The effect of the physical parameters is implemented in the observer 84, using estimates of the physical mass, $m_{pe}$, the physical damping, $c_{dpe}$, and the physical stiffness, $K_{pe}$. The dynamics of the observer 84 are determined by these system parameters.

The estimated parameters of physical mass, $m_{pe}$, damping, $c_{dpe}$, and stiffness, $K_{pe}$, represent the basic set of modeled parameters which are necessary to implement an observer for a piezoelectric positioner of any shape or composition. For a tube shaped positioner 42 these are the only parameters required. This is because the tube scanner represents the simplest form of an observer model. The simple model is based on the assumption that the strain in the material is purely uniaxial. This is valid for long thin shapes polarized perpendicular to the long axis, such as the tube positioner 42. The basic model may be applied to similar shapes, made of various piezoelectric materials, by simply altering the magnitude of the basic parameters. Similarly, the parameter magnitudes may be made adjustable to conform to differences in response of the piezoelectric positioner 42 to various operating temperatures. For some materials, such as single crystal, amorphorus, or polycrystalline piezoelectrics, this simple model may only be valid over certain motion and temperature ranges. For situations where the simple model would not be appropriate, such as for short squat piezoelectric actuators, like a polarized piezoelectric plate, the simple model may have to be expanded to account for cross-coupled strain. By including cross-coupled strain, the response of any shaped piezoelectric actuator may be approximated. Even when cross-coupled strain is included in the model, the three basic parameters remain essentially the same. Multiple values of stiffness, damping, and mass must be used, however, to represent each cross-coupled axis.

The properties of piezoelectrics are also strongly dependent on the way they were processed, and show systematic and statistical fluctuations within a given batch. The fluctuations are caused, for example, by inhomogeneous chemical composition, mechanical differences in forming, chemical modification during sintering, and the method of polarization. The variance of the properties can be as much as plus or minus 20%. For this reason, it is important to uniquely identify each parameter for each piezoelectric positioner 42 which is used. Whenever possible, multiple methods should be employed in the identification of the physical parameters. In this way, erroneous parameter values are quickly identified and discarded or remeasured. Comparison to a manufacturer's specifications for the piezoelectric material parameters can also serve as a test for erroneous values. An exemplary calculation of the physical parameters for a tube shaped positioner used, for example, in an SPM, is presented below.

The observer 84 operates to generate an accurate estimate of the velocity of the physical positioner 42 in the following manner. The velocity observer 84 receives the same control signal from the amplifier 51 as the physical system (the force state feedback). In the observer 84, this voltage is multiplied by an estimated value of the physical positioner's force constant, $K_{fe}$, at a gain 106. As is described above, the force constant is the ratio (or transfer function) of the generated force applied to a system to the voltage applied to the system. The estimated force constant, $K_{fe}$, is used, therefore, to convert the voltage level applied to the observer to a force level. This modeled force level is the equivalent of the physical force level being applied to the physical positioner 42. Feedback loops are provided in the observer that will respond to the modeled force in the same way that the physical system will respond to the physical force. Therefore, the modeled acceleration response in the observer is determined by dividing the applied force by the estimated physical mass, $m_{pe}$, at 100. The modeled velocity is multiplied by the estimated physical damping factor, $c_{dpe}$, at 102 and subtracted from the modeled force at a junction 108. The modeled position is multiplied by the estimated physical stiffness, $K_{pe}$, at a gain 104 and subtracted from the estimated force at the junction 108. Note that the estimated velocity is derived from integration of the estimated acceleration by an integrator 110, and the estimated position is derived from the integration of the estimated velocity by an integrator 112.

Observer state feedback gains are employed by the observer to form a more accurate estimate of velocity. These include an integral gain 114, K3, a proportional gain 116, K2, and a velocity state gain 118, K1. These are analogous to the active gains described earlier, $K_{ia}$, $K_a$, and $C_{da}$, respectively. However, whereas the active gains were used to drive the physical system so as to reduce the error between the commanded and actual position of the physical system, the observer state gains are used to drive the velocity observer to reduce the error between the estimated position generated by the observer and the actual position of the physical system. These errors can be the result of inaccuracies in the determination of the physical parameters or of unmodeled disturbances, such as a disturbance force $F_D$ acting on the physical system 42 but not modeled in the observer 84. Since the modeled parameters may not take into account hysteresis of the piezoelectric material used in the positioner, parameter errors are inevitable. Hard PZT piezoelectrics, however, characteristically have relatively low hysteresis. In any case, the observer of the present invention may also be used with soft piezoelectric positioners. Materials which exhibit greater hysteresis can be modeled; however, their parameter values are accurate over a more limited range. The error correction capability of the observer of the present invention is thus of greater importance. By reducing the observer position error, the observer state feedback also reduces the velocity state error between the estimated velocity and the actual velocity of the physical positioner 42, resulting in a more accurate velocity estimate.

The measured physical position (the position state reference) and the observer's estimated position are compared at a summing junction 120 to generate an observer position error. The observer position error is integrated by an integrator 122 and multiplied by an integration gain, K3, at 114. This result is added to the position error multiplied by the proportional gain, K2, at a junction 124 to form an observer feedback force signal at the summing junction 126. Additionally, an observer velocity state gain K1 is multiplied by the position error signal at a gain unit 118 and added to the modeled observer velocity at the summing junction 128. The estimated velocity of the physical positioner 42 is preferably taken to be the velocity signal generated by the observer 84 on line 129 at the output of the junction 128. Alternatively, the estimated velocity may be taken on the line 130 (shown dashed in FIG. 7 to indicate an alternative configuration) before the junction 128. By taking the estimate of the velocity after the junction 128, however, the influence of the dynamic damping provided by the velocity gain, K1, is included in the velocity estimate. This has the effect of forcing the velocity and position estimates to have the desired integral relationship. Better rejection of errors between the estimated parameters and physical parameters, and other unmodeled disturbances, also results from taking the estimated velocity after the junction 128.

By utilizing the integral gain, K3, and taking the velocity estimate after the junction 128, the observer of the invention provides improved steady state performance and error rejection by implementing a modified Luenberger observer structure for piezoelectric positioner control. Application of a more basic Luenberger type structure to piezoelectric positioner control, such as by eliminating the integral feedback, would also be within the scope of the present invention.

The accuracy of the observer's velocity estimate, and its ability to track the actual physical velocity, is dependent on the accuracy of the physical system model. Since models are imperfect, the observer state feedback gains are utilized for correction of the velocity estimate. The observer state gains also determine the ability of the observer to reject unmodeled disturbances on the physical system. The velocity estimate is influenced by any disturbance acting on the physical system through the observer state gains, as applied to the observer position error between the measured physical position and the observer's estimated position. In the same fashion as the active feedback gains used in the control signal generating system, the observer gains shape the dynamic response of the observer to the disturbance. The observer state gains also dictate the noise suppression capability of the observer. By treating the observer as an ordinary physical system using state feedback control, any method known in the art for selecting the state gains of such a system may be used to tune the observer. Generally it will be preferable to make the observer gains as high as possible. However, higher gain may also result in undesired amplification of noise in the observer. An exemplary method for tuning an observer is described below. In any case, observer state gains will be limited by the power capacity of the components which make up the observer.

While the piezoelectric positioner control system of the present invention may be employed in any system employing a piezoelectric positioner, the particular embodiment of the invention for control of the positioner of an STM merits some additional comments. In an STM system the commanded position will be a fixed value, representing a desired constant distance of the probe tip 43 from the surface of the sample 41. Similarly, since the desire is to maintain this position constant, the commanded velocity will be zero. The physical position of the positioner 42 is represented by the tunneling gap $Z_r$. The physical position is derived by the position sensor 70 from the tunneling current across $Z_r$. The measured position is thus a position relative to the sample. Tunneling gap noise $Z_{noise}$, which will be amplified along with the tunneling current in the position sensor 70, will affect the positioning ability of the control system and thus limit the bandwidth. As the probe tip is scanned across a sample, the tunneling gap will change. This change is represented as a surface height disturbance $Z_d$ which changes the tunneling gap $Z_r$ and the measured position output of the position sensor 70. Thus, even though the positioner has not moved, a position error will result from the difference between the measured position and the fixed commanded position. The control system of the present invention therefore acts, in this case, to drive the resulting error to zero by moving the positioner so as to restore the desired gap distance $Z_r$. Thus, the controller of the present invention, as implemented in an STM, may be known as a null regulating controller which acts to maintain a constant gap distance and a zero velocity.

An additional point is also made concerning the inputs to the observer 84. The preferred observer has two inputs, the measured position signal, and the control signal which is also applied to the physical system. The control signal, however, is not required in all cases, and a piezoelectric positioner control system may be implemented in accordance with the present invention using only a measured position state input to the observer. If the observer 84 has a sufficiently high band width, the feed forward control signal may be eliminated without significantly degrading the observer velocity estimate. However, use of the feed forward control signal is preferred. Use of the control signal results in improved accuracy and improved dynamic performance. Use of the control signal improves the accuracy of the velocity estimate and reduces the lag in correction of errors in the estimate.

The exemplary piezoelectric positioner controller just described is well suited to applications such as SPMs wherein the piezoelectric positioner 42 is subject to position disturbances. Thus, as the positioner 42 is scanned across a sample surface, variations in the surface topology will induce disturbances in the relative position between the positioner 42 and the sample surface. These disturbances are position disturbances. The controller of the present invention, employing active damping and a velocity observer, acts to rapidly counter these disturbances, by driving the positioner 42 so as to retain its desired position from the sample surface. Many other positioning systems which employ piezoelectric positioners will be subject to force disturbances as well as position disturbances acting on the positioner. The performance of such force-disturbed systems can be greatly enhanced by the addition of active mass into the positioner controller feedback loop. Active mass is a gain which is applied to the acceleration state of the piezoelectric positioner. This acceleration state feedback is manifested physically as additional apparent mass of the positioner. Thus, the active mass counters the force disturbance by opposing the acceleration response of the positioner to the disturbance force. A similar effect can be achieved by simply making the positioner more massive. However, active mass is significantly preferable, as active mass is present only when the positioner is subject to the force disturbance. Thus, active mass only consumes energy when needed.

Active mass enhances the performance of the positioner controller when the frequency of the force disturbance is greater than the closed-loop resonance frequency of the positioning system. Thus, the frequency range over which the active mass becomes effective begins as the range over which the addition of active damping is of benefit drops off. For disturbances of frequency significantly beyond the resonant frequency, the addition of active mass provides the system with essentially infinite resistance to force disturbances (i.e., infinite stiffness).

The implementation of a piezoelectric positioner controller providing active mass in accordance with the present invention is described with reference to FIG. 8. This alternative embodiment of the piezoelectric positioner employs proportional and integral position state gains $K_a$ and $K_{ia}$, and active damping $C_{da}$ as described above. The proportional and integral gains are applied to the position state error determined at node 64 by comparing the commanded position and the measured position provided by the position sensor 70. Active damping is provided to the velocity state error determined at node 83 by comparing the commanded velocity with the estimated velocity produced by the velocity observer 84. Additionally, however, an active mass gain 130 of magnitude $m_a$ is applied to an acceleration state error signal determined at node 131 by comparison of a commanded acceleration with an estimated acceleration of the physical system 42 as generated by an acceleration observer 132. The output of the acceleration state gain 130 is summed with the other state gains to form the complete state feedback signal which drives the physical piezoelectric positioner 42.

The combined position, velocity, and acceleration state feedback controller may preferably be implemented utilizing a cascaded observer topology. As with the velocity observer 84, the acceleration observer 132 employs a model of the response of the physical system 42 to a control signal, and employs a measured state to correct for noise and unmodeled disturbances by driving the modeled state generated by the observer 132 to match the measured state. The acceleration observer 132 operates to generate an accurate estimate of the acceleration of the physical positioner 42 in response to the control signal provided to the physical system 42 by the amplifier 51. Thus, the output of the amplifier 51 is also applied to the acceleration observer 132. In the acceleration observer 132, this force state feedback signal is multiplied by an estimated value of the physical positioner's force constant, $K_{fe}$, at a gain 133 which corresponds to the gain 106 of the velocity observer. As in the velocity observer 84, feedback loops are provided in the acceleration observer 132 such that the modeled system will respond to the control signal in the same way that the physical system will respond to a physical force. Therefore, the modeled acceleration response in the observer 132 is determined by dividing the applied force by the estimated physical mass, $m_{pe}$, at 134. The modeled acceleration response is the estimated acceleration of the physical system 42 which is fed back to the control signal generating portion of the system to be compared to the commanded acceleration at node 131. The modeled velocity is multiplied by the estimated physical damping factor, $c_{dpe}$, at a gain 135 and subtracted from the modeled force at a junction 136. The modeled position is multiplied by the estimated physical stiffness, $K_{pe}$, at a gain 137 and subtracted from the estimated force at the junction 136. The estimated velocity is derived 35 from integration of the estimated acceleration by an integrator 138, and the estimated position is derived from the integration of the estimated velocity by an integrator 139. Note that the estimated physical parameters, $m_{pe}$, $c_{dpe}$, and $K_{pe}$ are the same as those used in the velocity observer 84.

Whereas the velocity observer uses the measured position state to provide an accurate estimate of velocity, the acceleration observer 132 employs a known velocity state to produce a more accurate estimate of acceleration. Preferably, a velocity state applied to the acceleration observer may be the accurate velocity estimate which is produced by the velocity observer 84. Alternatively, in cases where implementation of a velocity sensor is possible, the known velocity state may be applied to the acceleration observer 132 from the velocity sensor. Acceleration observer state feedback gains are employed in combination with the known velocity state to drive the velocity estimate produced by the acceleration observer 132 to correspond to the known velocity, and therefore to produce a more accurate estimated acceleration. The acceleration observer 132 affects this error correction using a closed loop about the velocity state, as opposed to the position state employed by the velocity observer 84. Error correction in the acceleration observer 132 is provided by the velocity observer state gains $K_4$, $K_5$, and $K_6$. The acceleration observer velocity state error is produced at node 140 by comparing the velocity state provided from the velocity observer 84 with the acceleration observer estimated velocity produced at the output of the integrator 138. The acceleration observer velocity state error is multiplied by an acceleration observer velocity state gain $K_4$ at a gain circuit 141. The output of the velocity state gain 141, unlike its counterpart gain $K_1$ in the velocity observer 84, is not summed-in past the integrator 138. This is not necessary in the acceleration observer 132, since the acceleration observer velocity state gain $K_4$ is not differentiating its error input. The acceleration observer velocity state error is also integrated by an integrator 142 and multiplied at a gain circuit 143 by a proportional position state gain $K_5$, which corresponds to the gain $K_2$ of the velocity observer 84. Finally, the acceleration observer velocity state error is twice integrated by integrators 144 and 145 with the result multiplied at gain circuit 146 by an integral position state gain $K_6$ which corresponds to the gain $K_3$ of the velocity observer 84. The acceleration observer gains $K_4$, $K_5$ and $K_6$ may be selected to tune the acceleration observer 132 in the same fashion as the velocity observer 84 is tuned by selecting the gain values $K_1$, $K_2$ and $K_3$. The output of the gain circuits 141, 143, and 146 are combined at node 147 with the result combined with the force state signal at node 148.

EXEMPLARY EMBODIMENTS OF THE INVENTION

Figure 9A:
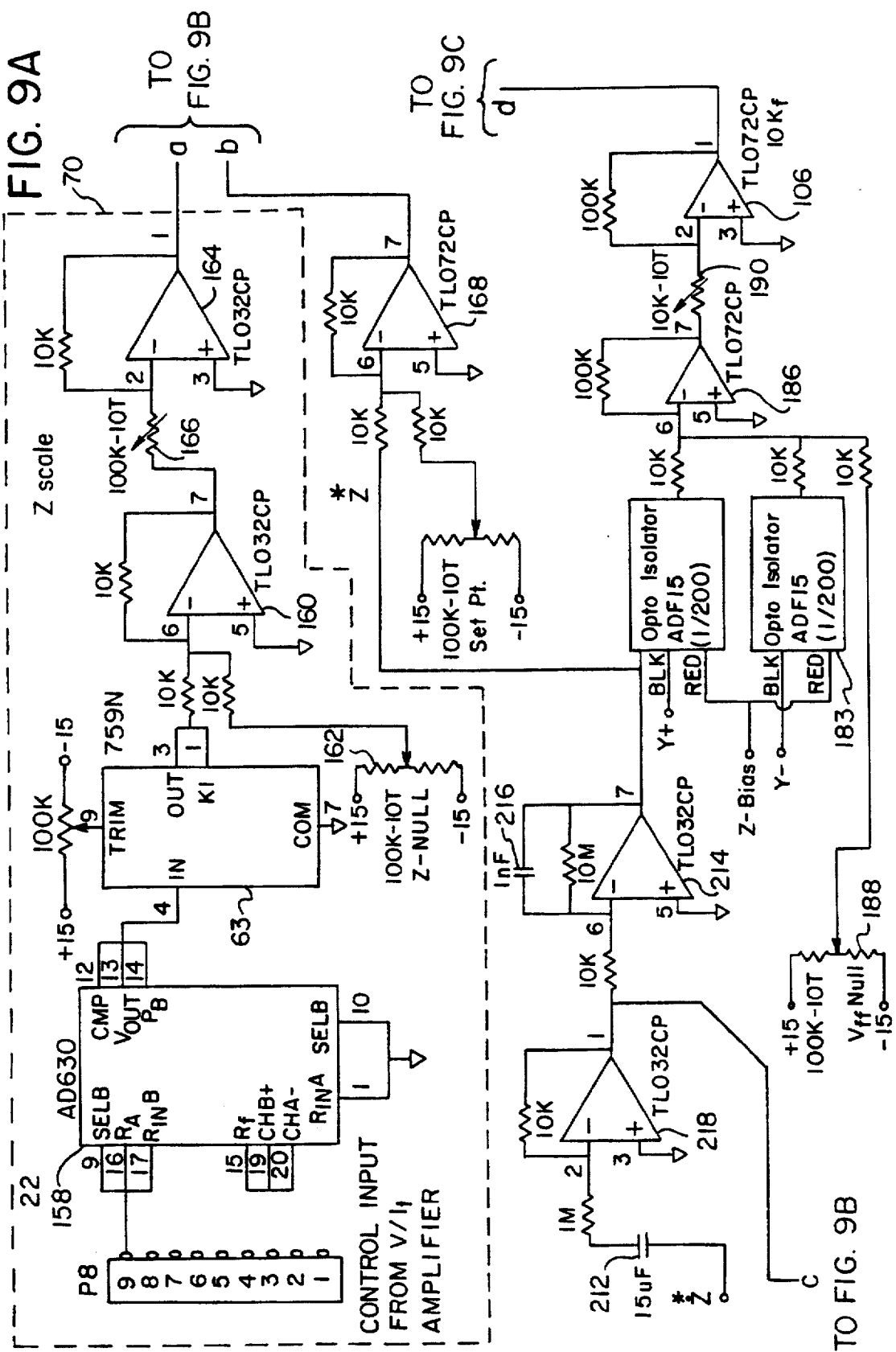
FIG. 9 is a schematic circuit diagram of a piezoelectric positioner control system in accordance with the present invention as implemented in a fixed electrical circuit.
Figure 9B:
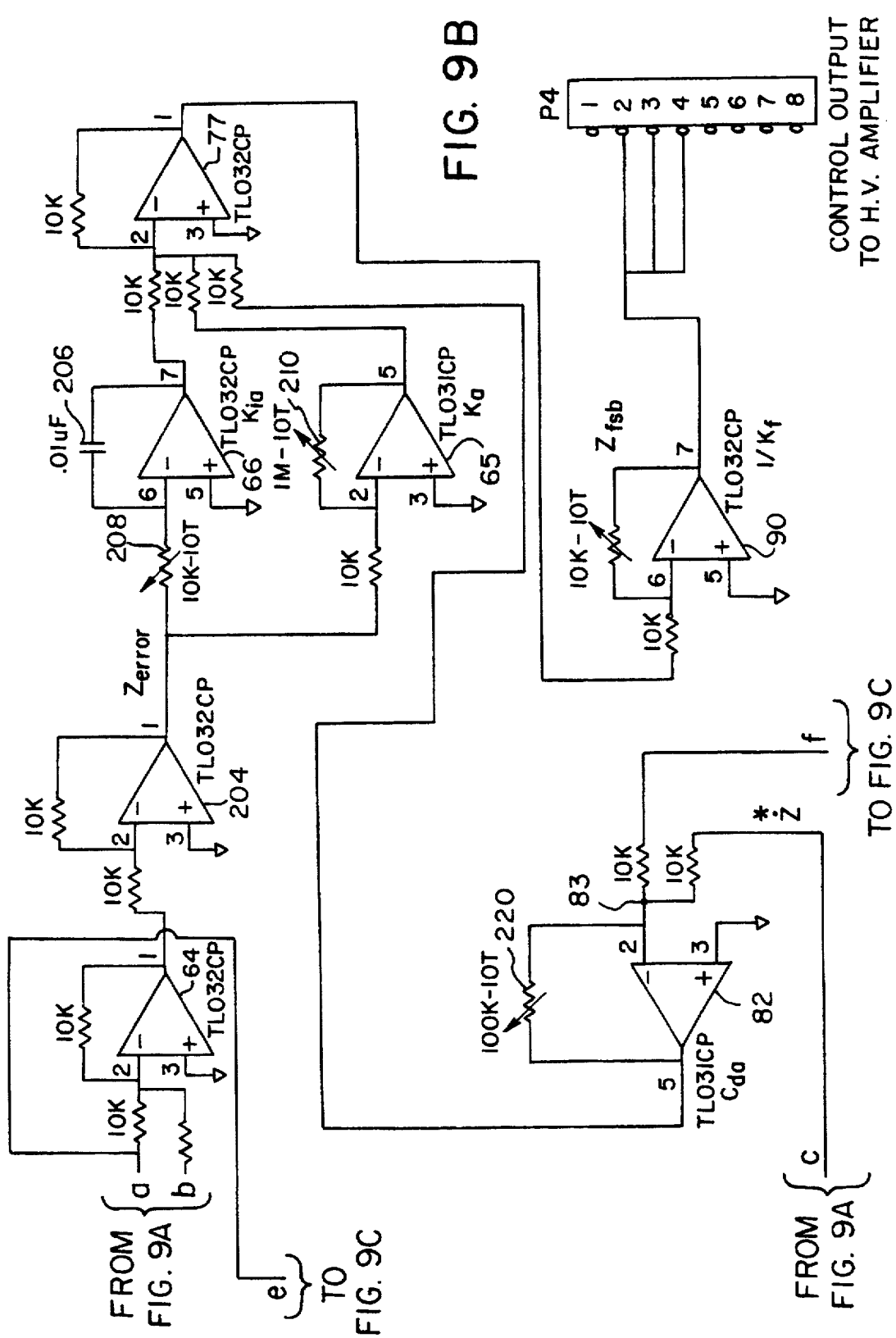
Figure 9C:
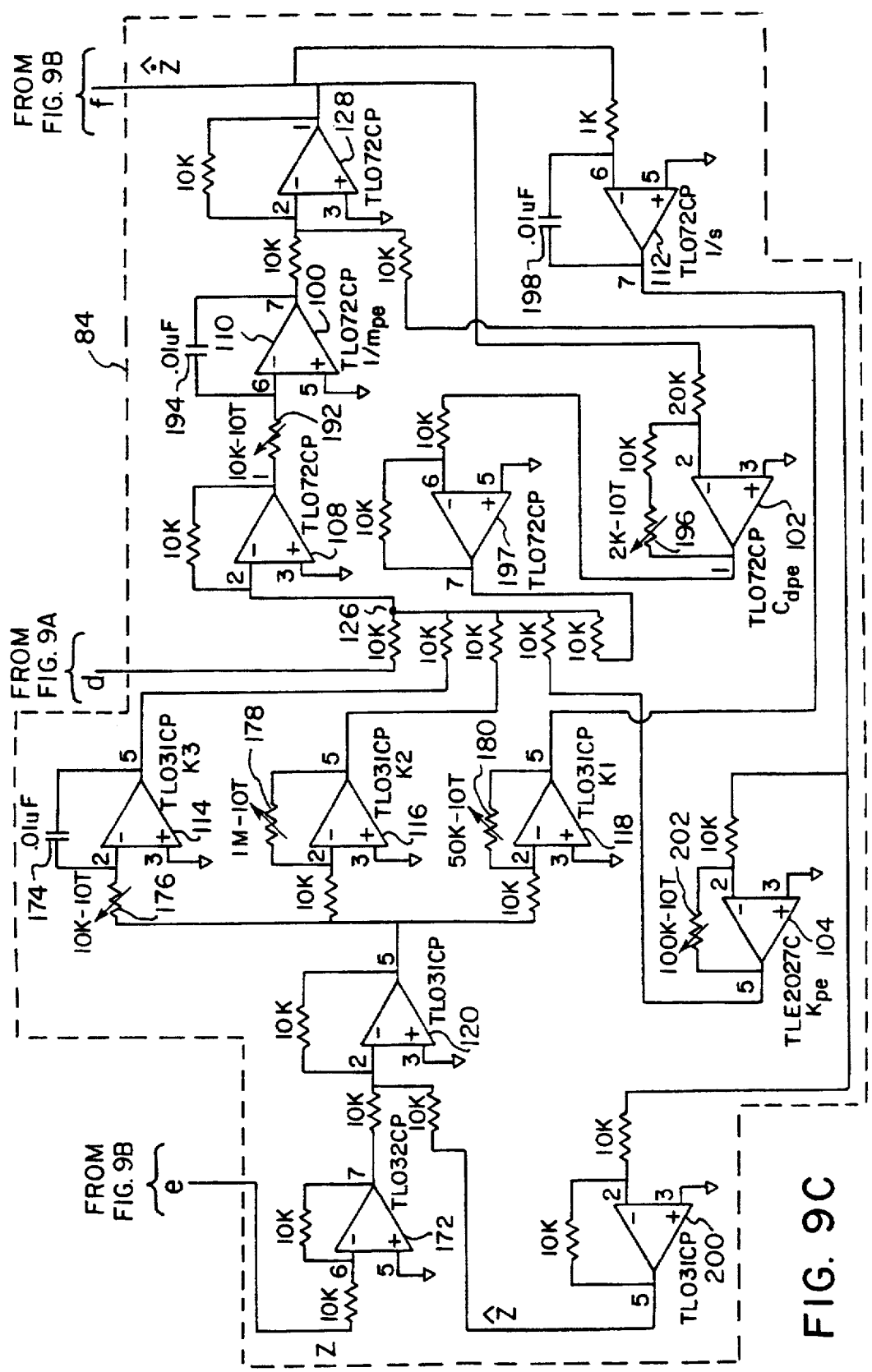

An exemplary analog circuit implementing the piezoelectric positioner controller of FIG. 7 is shown in the schematic circuit diagram of FIG. 9. In this figure, individual circuit elements are referred to by the same reference numerals as the functions which they implement as shown in FIG. 7. This exemplary circuit may be applied with minor modification, to any SPM system, and is particularly designed for use in an STM. The circuit may also be modified for application to any piezoelectric positioner system that is scanned or expanded and contracted.

The position sensor circuit 70 converts the voltage output $V_t$ of a transimpedance amplifier (46 in FIG. 3) to a voltage level representative of the actual Z position of the probe tip 43 of the positioner 42 of an STM 40. An integrated circuit precision rectifier 158 maintains the sense of $V_t$ with respect to its use in position feedback. The bias voltage of the SPM tip will therefore not influence the position reference of the controller. An integrated circuit logarithmic amplifier 63 converts the resulting voltage, which varies at an inversely exponential rate with respect to the gap distance, to a voltage level which varies linearly with the gap distance. This voltage is then set relative to the Z=0 position by the amplifier 160 and associated voltage divider 162 which is used to establish the Z=0 voltage level at 0 volts. This result is then scaled by amplifier 164 and variable resistor 166 to a voltage level consistent with the commanded position voltage levels. The result is a voltage level representing the Z position of the probe tip 43. The Z position signal is then subtracted from the commanded Z position, which is set with respect to the same Z=0 voltage level by the amplifier 168 and voltage divider 170, at inverting amplifier 64. The output of amplifier 64 is, therefore, the Z position error signal.

The Z position signal is also fed to the velocity observer circuit 84. This signal is inverted at amplifier 172 and combined with the observer's estimated position signal at the amplifier 120 to form the observer position state error signal. The observer position state error signal is integrated and multiplied by an observer integration gain at the amplifier 114. Integration is provided by the capacitor 174 in the amplifier 114 feedback loop and the integration gain is adjustable by variable resistor 176. The observer position state error is multiplied by a proportional gain by amplifier 116, with variable resistor 178 providing for an adjustable gain level. Finally, the observer position state error is multiplied by a velocity state gain at amplifier 118, with variable resistor 180 in the feedback loop of the amplifier 118 allowing for an adjustable gain level. At node 126, the output signals of the integral 114 and proportional 116 amplifiers are combined with a signal representative of the control signal which is being provided to the physical positioner 42.

Since the control signal provided to the physical positioner 42 is a high voltage drive signal, the drive signal is coupled to the velocity observer 84 through parallel optical isolators 182 and 183. The output of the optical isolators 182 and 183 is set with respect to the Z=0 reference voltage at amplifier 186 through effect of the voltage divider 188 and multiplied by an adjustable force constant gain at amplifier 106 through the effect of variable resistor 190. At node 126, the observer position state error multiplied by the integration and proportional gains and the Z position control signal at the output of amplifier 106 are combined with signals from the amplifiers representing the estimated physical damping 102 and estimated physical stiffness 104 of the positioner 42. The result is the estimated force response signal at the output of amplifier 108.

At amplifier 100, this signal is divided by a value representative of the estimated physical mass, $m_{pe}$. This value is made variable by adjustable resistor 192. This amplifier also acts as an integrator 110 by the effect of the capacitor 194 in the amplifier feedback loop. The output of amplifier 110, therefore, represents an integration of the estimated acceleration of the positioner, or, in other words, an estimated velocity of the positioner 42. This velocity estimate signal is combined at amplifier 128 with the signal derived from the observer position state error and velocity state gain from amplifier 118. The output of amplifier 128 is, in turn, the estimated velocity state output of the observer which is used by the control signal generating circuit elements described below. As discussed above, taking the estimated velocity signal from the output of amplifier 128, as opposed to the output of amplifier 110, results in better rejection of errors between the estimated and physical parameters of the velocity observer 84, and other unmodeled disturbances. The estimated velocity signal is fed back into the circuit through amplifier 102 with a gain representative of the estimated physical damping, $c_{dpe}$, of the positioner 42, which is made adjustable by variable resistor 196. The resulting signal is inverted by amplifier 197. The estimated velocity signal is also fed through a second integrating amplifier 112, with capacitor 198, to produce the estimated position state signal. The estimated position state signal is then provided through inverting amplifier 200 back to the amplifier 120 where it is subtracted from the measured position state signal. The estimated position state signal is also provided through amplifier 104, with adjustable gain defined by variable resistor 202, to form the feedback signal which is representative of the estimated physical stiffness, $K_{pe}$, of the physical positioner 42.

In the control signal generating portion of the circuit, the Z position state error signal provided by amplifier 64 is inverted at amplifier 204 and provided to an amplifier 66 where the signal is integrated through the effect of capacitor 206 in the amplifier 66 feedback loop. This same amplifier 66 acts as a gain amplifier, multiplying the position state error signal by an integration gain defined by variable resistor 208. The position state error signal is also multiplied by a proportional gain defined by the setting of variable resistor 210 in the feedback loop of amplifier 65.

At node 83 at the input to amplifier 82, the estimated velocity state signal provided by the observer 84 is combined with a commanded velocity signal. For an SPM controller, the commanded position and velocity signals received may effectively consist of one signal. The command signal may consist of a series of voltage step pulses. This signal is first filtered by a capacitor 212 in order to eliminate noise from the signal source. The accumulated magnitude of the voltage at the end of each step defines the commanded Z position. The commanded Z position signal is derived by a rapid integration of this command signal at amplifier 214 having a small feedback capacitor 216. The commanded velocity is, therefore, essentially the derivative of the commanded position signal, having a voltage spike whose magnitude is defined by amplifier 218 at each step change of the command signal. At almost all times, therefore, the commanded velocity signal is 0. The command generator circuit shown is just one manifestation of command generators for SPMs specifically and piezoelectric positioners in general. The command generator may also be implemented as a differential generator, digitally, or by any other method known in the art, depending upon the particular application.

The combined commanded velocity signal and estimated velocity state signal form a velocity state error which is multiplied by a velocity state gain, $c_{da}$, at amplifier 82, whose gain value is defined by the setting of variable resistor 220. The integrated position, proportional position, and velocity components are combined at amplifier 77 to form the positioner force state feedback control signal. This control signal is multiplied by a gain representative of the inverse of the force constant of the physical positioner at amplifier 90. The output of amplifier 90 is the control signal which is fed to a high voltage amplifier which, in turn, provides the drive signal to the physical positioner 42.

Figure 8A:
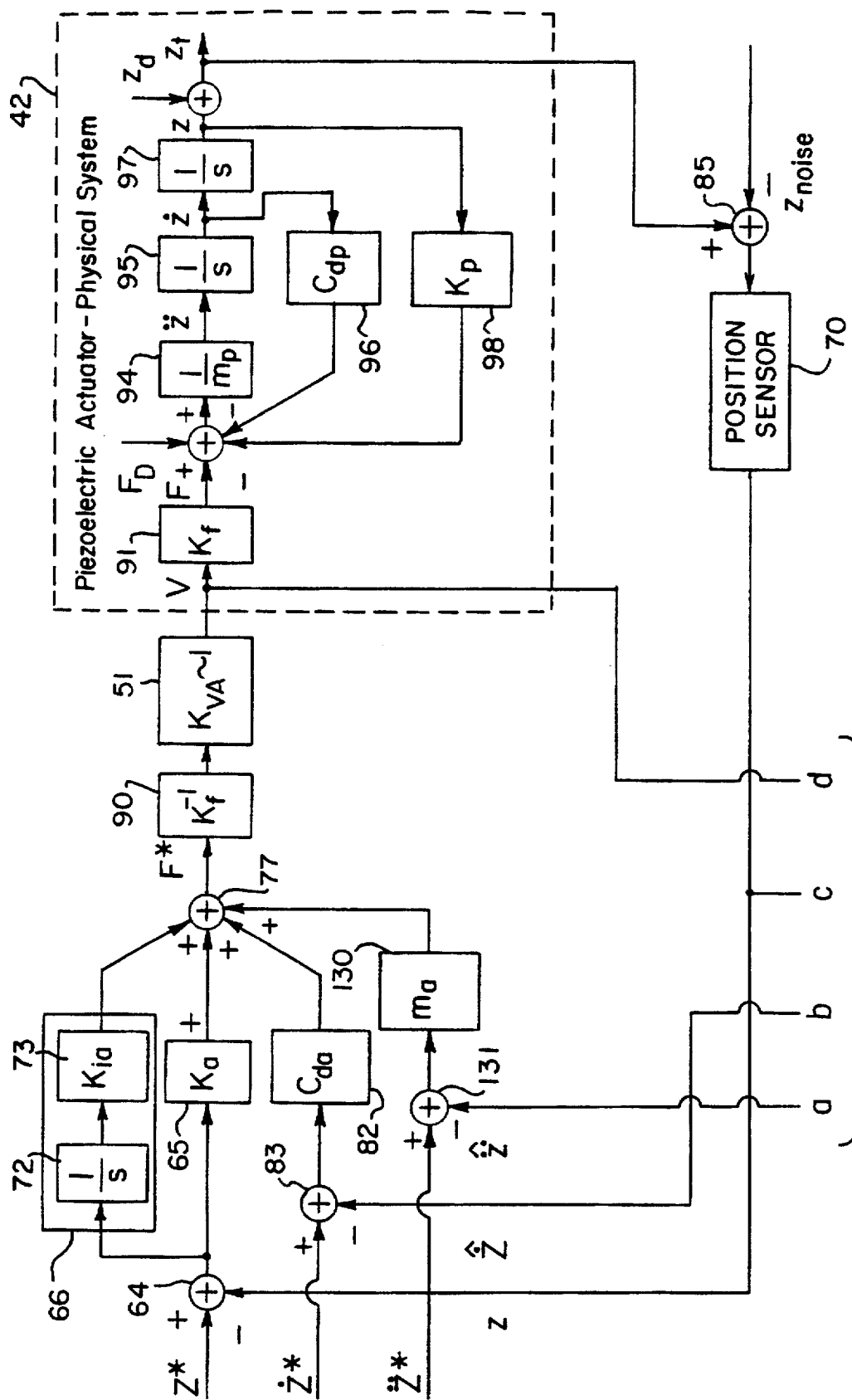
FIG. 8 is a detailed block diagram of an alternative embodiment of the piezoelectric positioner control system of the present invention wherein active mass is provided by use of an acceleration observer.
Figure 8B:
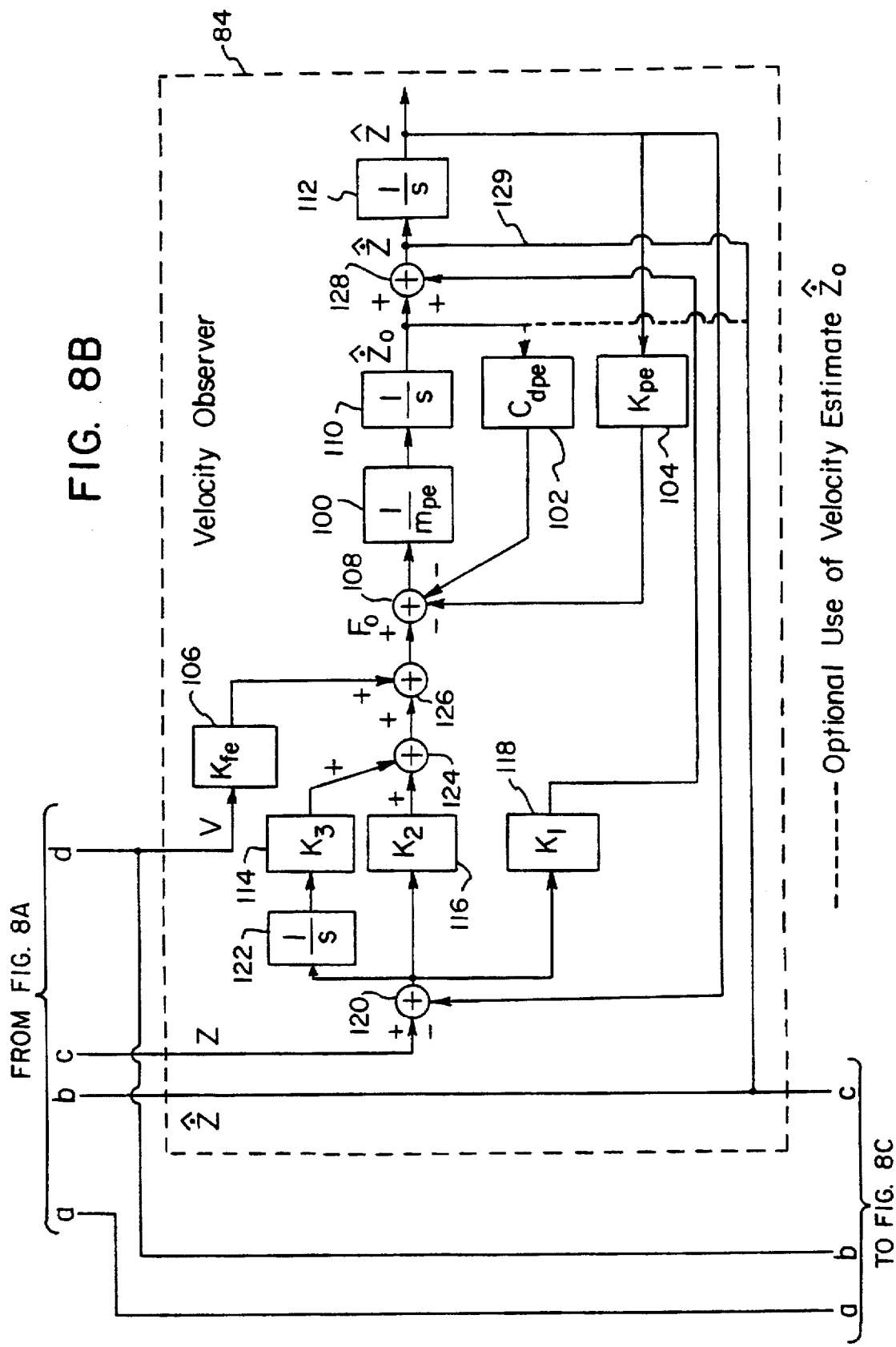
Figure 8C:
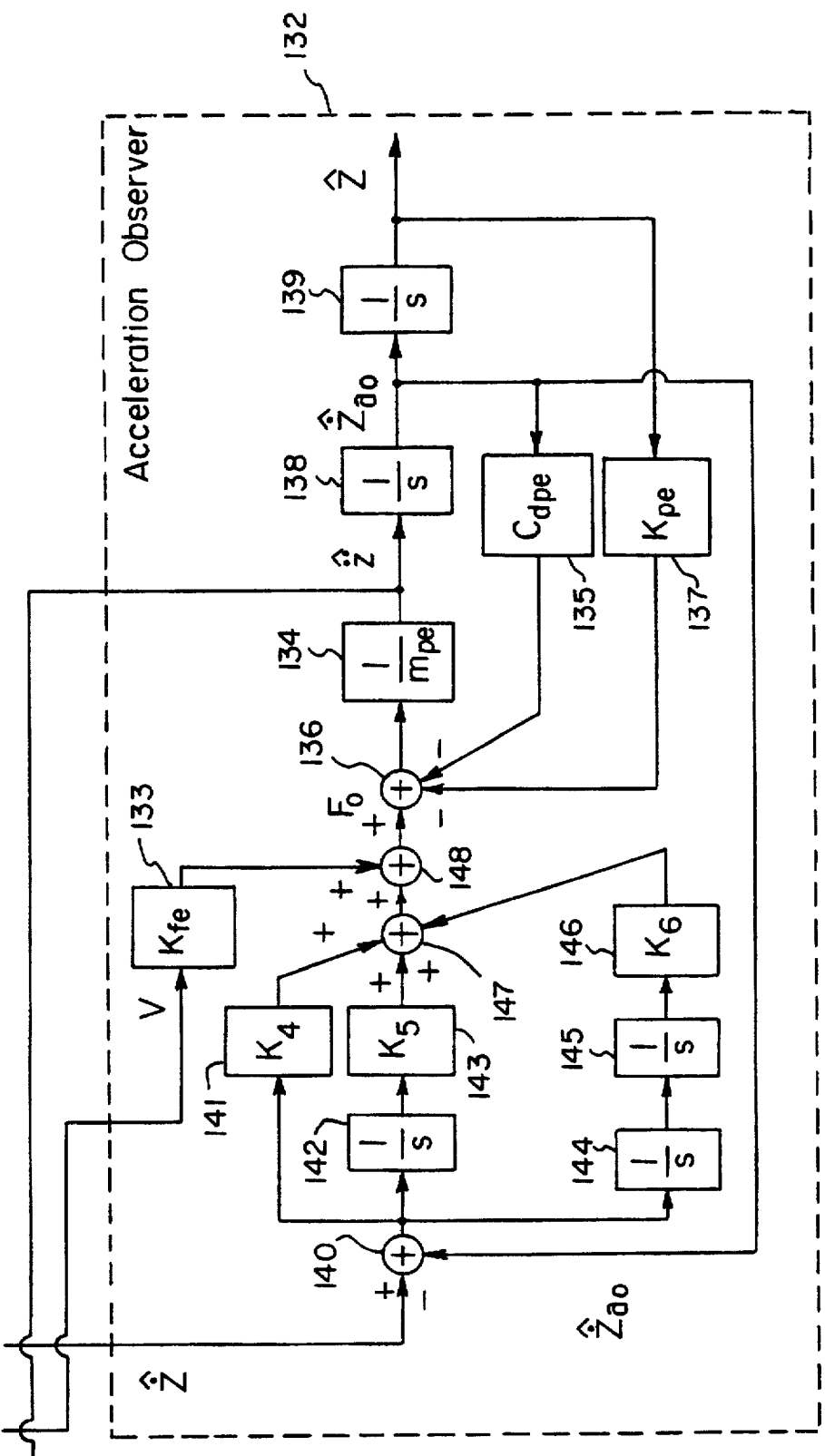
Figure 10:
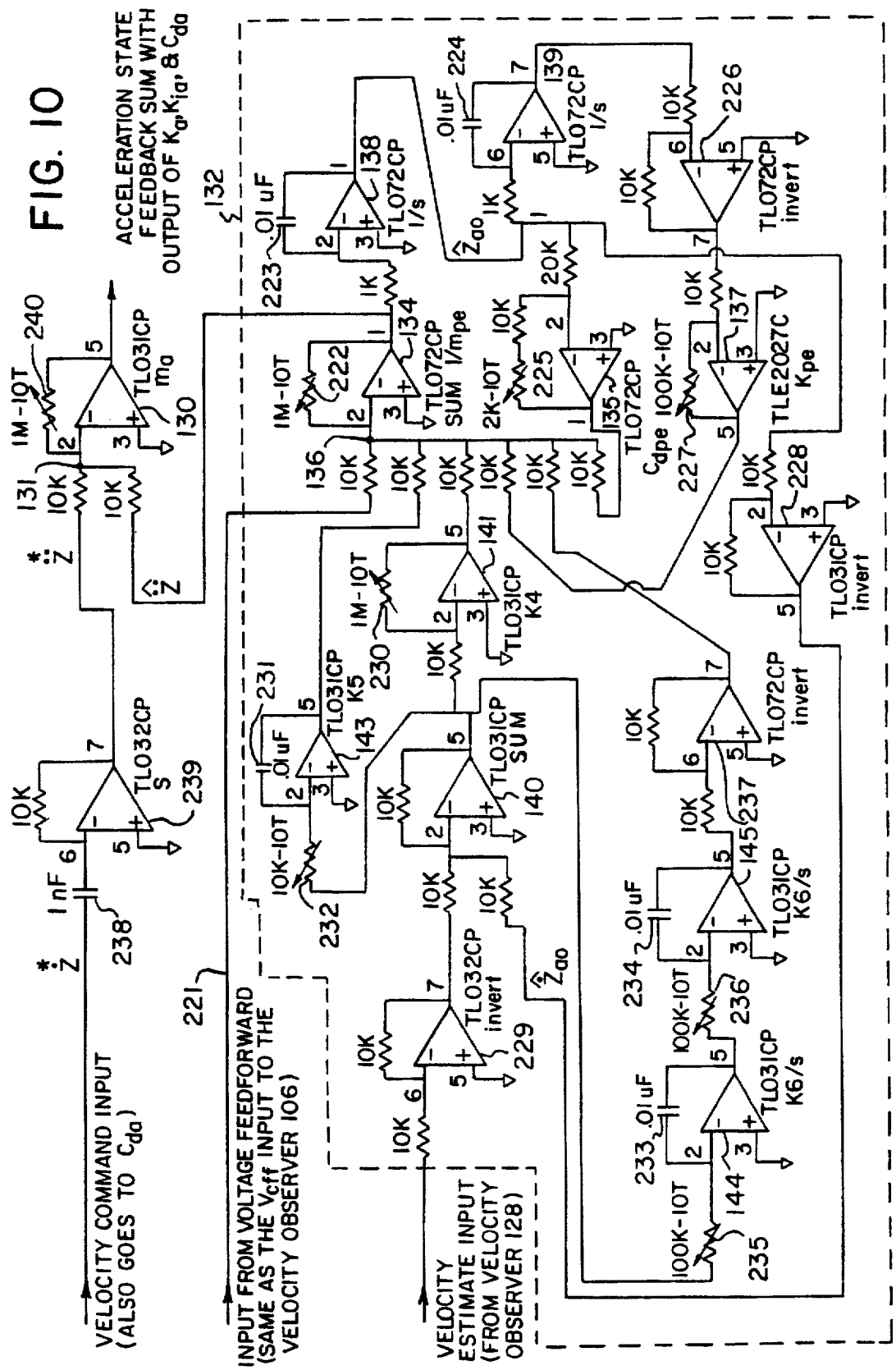
FIG. 10 is a schematic circuit diagram of an acceleration observer.

For a piezoelectric positioner control system in accordance with the present invention which also employs active mass, such as the system shown in FIG. 8, an acceleration observer implemented as an analog circuit may be used. An exemplary circuit configuration implementing an acceleration observer 132 is described with reference to FIG. 10. The control signal (force state feedback signal) which drives the physical positioner 42 is applied on a line 221 to the acceleration observer 132. The force signal is divided by the estimated physical mass $m_{pe}$ at the amplifier 134 where the magnitude of the estimated physical mass $m_{pe}$ is set by variable resistor 222. The output of the amplifier 134 is the estimated acceleration state of the physical positioner 42. The estimated acceleration state is fed out of the acceleration observer 132 to the input node 131 of amplifier 130. The estimated acceleration state signal is also integrated at amplifier 138 through the action of capacitor 223 to produce an estimated velocity signal which, in turn, is integrated at amplifier 139 through the action of capacitor 224 to produce an estimated position state signal. The estimated velocity signal is fed to an amplifier 135 which multiplies the estimated velocity by the estimated physical damping $c_{dpe}$ whose magnitude is set by variable resistor 225 in the feedback loop of the amplifier 135. The estimated position state signal is inverted by an amplifier 226 and multiplied by the estimated physical stiffness $K_{pe}$ at amplifier 137, with the magnitude of the estimated physical stiffness $K_{pe}$ set by variable resistor 227. The outputs of the amplifiers 135 and 137 are fed back to the input node 136 of the amplifier 134. The estimated velocity signal at the output of amplifier 138 is also fed through an inverting amplifier 228 to the input of an amplifier 140. At amplifier 140, the inverted estimated velocity signal is subtracted from the signal indicative of the velocity of the physical positioner 42 which is provided either from the velocity observer 84 or a velocity sensor (if available) to an inverter 229. The outputs of the inverters 228 and 229 are thus summed at amplifier 140 to produce the acceleration observer estimated velocity error at the output of amplifier 140. The acceleration observer velocity error is multiplied by a velocity gain $K_4$ at amplifier 141, with the magnitude of the gain $K_4$ set by the variable resistor 230 in the feedback loop of the amplifier 141. The acceleration observer velocity error is also integrated, through the action of capacitor 231, and multiplied by a position state gain $K_5$, whose magnitude is set by variable resistor 232, at an amplifier 143. The acceleration observer velocity error is also twice integrated at amplifiers 144 and 145 through action of the capacitors 233 and 234, and multiplied by the integral position state gain $K_6$ whose magnitude is set by adjustment of the variable resistors 235 and 236. The output of the amplifier 145 is inverted by the amplifier 237 whose output is combined with the output of amplifiers 141 and 143 at the input node 136 of the amplifier 134 to complete the error correction feedback loop of the acceleration observer 132.

At the input node 131 to amplifier 130, the estimated acceleration output of the acceleration observer 132 is subtracted from a commanded acceleration signal to produce the acceleration state error. The acceleration state command may be derived by taking the derivative of the velocity command input applied to a series connected capacitor 238 and amplifier 239. At the amplifier 130, the acceleration state error is multiplied by the acceleration state gain $m_a$ whose magnitude is determined by variable resistor 240. The output of the amplifier 130 may thus be added as an additional input to the amplifier 77 of FIG. 9 to provide an acceleration state feedback component, active mass, to the control signal which is used to drive the physical positioner 42.

Figure 11:
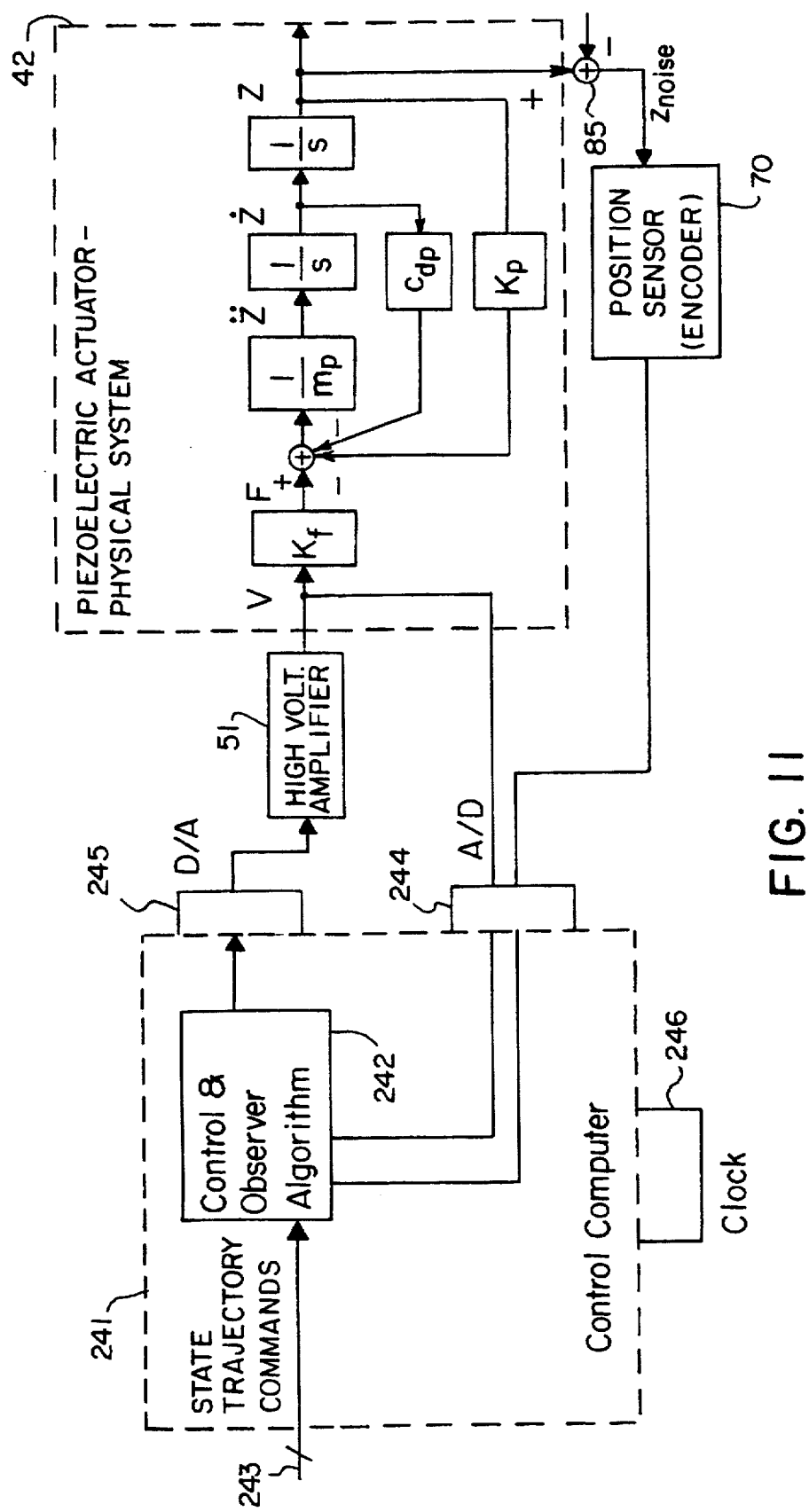
FIG. 11 is a block diagram of a digital implementation of the piezoelectric positioner control system of the present invention.

The piezoelectric positioner control system of the present invention is not limited to embodiment in analog circuits. For example, as shown in FIG. 11, the present invention may be implemented using a programmable digital computer 241. The computer 241 incorporates the velocity observer and control signal generating functions of the present invention in computer program algorithms which are executed by the computer's central processing unit 242. The computer 241 precalculates the position and velocity (and, if appropriate, acceleration) commands and stores them in a memory. During execution of the program algorithm, the commands are accessed from memory and utilized as inputs at lines 243. The measured position signal provided by the position sensor 70 and the control signal to the physical piezoelectric positioner 42 provided by the high voltage amplifier 51 are provided as analog signals to the digital computer 241. The computer 241, therefore, requires conversion of these analog signals to digital signals using an analog to digital converter 244. The analog to digital converter 244 may be an integral part of the computer 241 or of the CPU 242, or may be a separate and independent electric device. The digitized signals are applied to the CPU 242 along with the state commands. The CPU 242 then produces a digital control signal, which is converted to an analog signal by a digital to analog converter 245, and provided to the high voltage amplifier 51 which, in turn, drives the physical positioner 42. The computer 241 also includes a system clock 246 which controls the timing of the CPU 242 and the sampling rate of the converters 244 and 245. The processing speed of the CPU, and the sampling rate of the converters 245 and 245, must be sufficiently fast to rapidly model the physical system response and provide the system control signal. Note that the basic structure shown in FIG. 11 would apply, not only to a system controlled by a computer 241, but to other digital systems, such as digital systems employing digital signal processors (DSP), or any other embedded processor system.

A program listing of an exemplary program illustrative of an algorithm utilized to implement the positioner controller of the present invention using a digital controller may be found at the end of this specification.

EXAMPLE OF MODELING PHYSICAL PARAMETERS

Figure 4:
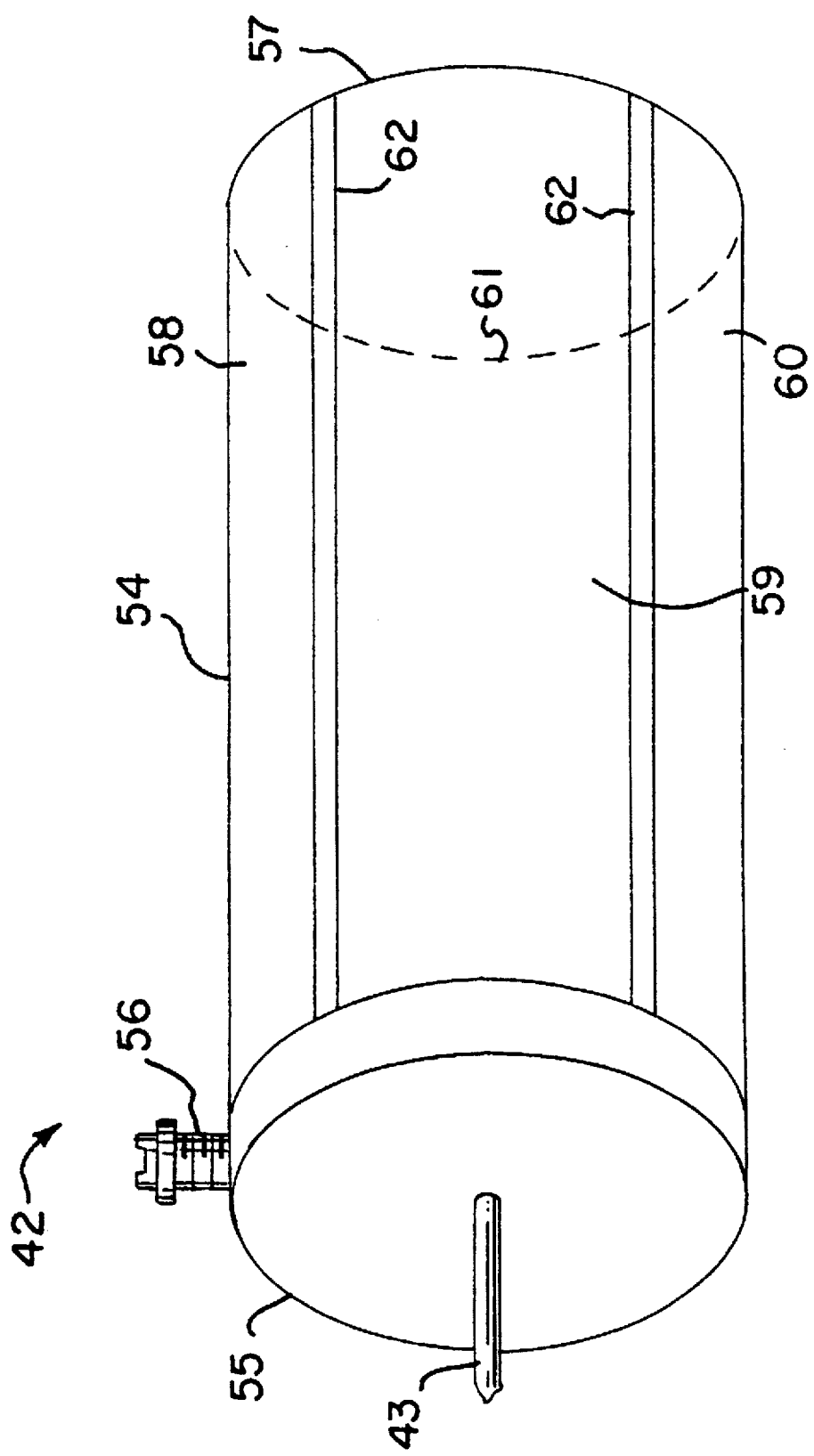
FIG. 4 is a perspective view of a piezoelectric tube positioner for a scanning tunneling microscope as in FIG. 3.

An exemplary calculation of the necessary parameter values required for the observer model is presented below for the piezoelectric tube positioner 42 illustrated in FIG. 4. The dynamic modeling of the piezoelectric tube positioner is constituted from the physics of wave theory. In determining the modeled parameter values, the interaction of the positioner's motion with the electrical power being supplied is included via the use of an impedance model. A lumped parameter linear model may be used which exhibits similar dynamics to the non-linear physical system it emulates. A lumped parameter model is produced by replicating the linear portions of the emulated function and linearizing the nonlinear portions. In this case, for example, the tip mass is a lumped parameter (effective value) which also accounts for the mass of the tube itself.

An exemplary tube configuration typical of positioners used in SPM's designed for operation within ± 200° C. of room temperature, is constructed of APC 880 (American Piezo Ceramic), a hard PZT material (lead(Pb)-zirconate-titanate). The wall thickness is 0.55 mm. Outer diameter is a standard 6.35 mm (0.25 inch). The overall tube length 54 is the same as the length of the electrodes 57, and 58–61, at 31.75 mm. The inner bore surface of the tube 54 is coated with electroless nickel to form the inner electrode. The outer surface is also coated, but separated into the four symmetric electrodes 58–61 separated by 0.5 mm wide uncoated longitudinal strips 62. The tip holder 55 is constructed of Macor® and is fastened to the end of the tube with Torr Seal® epoxy. The tungsten tip 43 is held in the holder by a small screw 56. The screw 56 also serves as the electrical connection to the tip.

Actual measurements of the tube positioner's structure are preferably made with a digital or equivalent dial caliper or micrometer. The instrument should be capable of measurement to with ±0.01 mm. Measurement of the tube positioner's wall thickness is best made with a digital caliper. The thin anvil of the caliper is not affected by the curvature of the tube. The measurements should be made from one end of the tube, with the caliper closed across a section of the tube in the regions 62 between segments of the outer electrode. In this fashion only the thickness of the inner electrode 57 is included in the wall-thickness measurement.

The outer diameter can be measured with either the caliper or the micrometer. Measurement with the caliper should be across diametrically opposed uncoated segments of the outer surface of the tube. However, since the separations between electrodes are not precisely quartered, the true diameter measurement may be across the coated section of the tube. The diameter should therefore also be measured with the micrometer (across the electrodes). If the measurement made by the micrometer exceeds the measurement made by the calipers by more than 0.05 mm then the micrometer measurement should be accepted as the correct measurement. The diameter in that case is taken as being equal to the measured value minus the 0.05 mm thickness of the electrodes.

The electrode length should be the same as the overall length of the piezoelectric tube 54. If this is not the case, the electrode length is the axial distance over which the electrode coats the tube. The mass of the uncoated portion of the tube then has to be added to the tip mass.

For the standard case, the ends of the tube may not be cut parallel to each other. The length should then be taken as the shortest perpendicular distance between the ends. The measurement can be made with either instrument.

The cross-sectional area of the tube is calculated from the measurement of the wall thickness ($\partial a$) and the outer diameter (OD). The area is found by calculating the cross-sectional area of the tube as if it were a solid rod minus the cross-sectional area of a solid rod with an outer diameter equal to the inner diameter of the tube. The cross-sectional area A of the tube positioner is expressed as:

$$A = \pi \left( \frac{OD^2}{4} \right) - \pi \left( \frac{(OD - 2\partial a)^2}{4} \right) \quad (1)$$

The accuracy of the cross-sectional area parameter is limited only by the assumption of uniformity in wall thickness and the precision with which the diameter and wall thickness can be measured. The maximum taper of the inner diameter can be quantified as being less than 0.006 degrees. This would represent an inaccuracy of less than 0.14%. The accuracy is therefore dictated primarily by the precision of the wall thickness and diameter measurements. With a measurement precision of $\pm 12.7 \times 10^{-6}$ meters, the uncertainty of the cross-sectional area is ±2.4% of the nominal value. The actual value of the area would fall within this range.

The determination of the density of the piezoelectric material requires that the mass of the tube 54 be known. A scale is thus required. The scale should have a maximum capacity of at least 5 grams with a precision of at least 0.01 gram. A moderate quality lab balance usually meets this specification.

The mass of the positioner tube without the tip and tip holder is determined using the scale. The density is calculated by dividing the tube mass by the tube's volume. The volume is the product of the tube length, L, and the cross-sectional area. The density is, therefore:

$$\rho = \frac{m_{tube}}{AL} \quad (2)$$

As in the case of the area calculation, the volume used to calculate the density assumes that the tube 54 is of a uniform shape. A water displacement method of determining density does not have this drawback, but it is more cumbersome to employ. Both methods include the mass and volume of the plated electrodes 57 and 58–61 in the calculations, but with a thickness of less than 0.025 mm, the averaging is negligible.

Density determination inherent to this method is within an inaccuracy of less than 5%. As in the case of the cross-sectional area, the precision of the wall, diameter, and length measurements dictate the accuracy. With a measurement precision of $\pm 12.7 \times 10^{-6}$ meters, the uncertainty of the density is ±2.4%. The actual value of the density would be within the range of uncertainty. This can be confirmed by comparing the calculated value of the density to the manufacturer's value for the density.

The components of the tip 43, the tip holder 55, and the screw 56, are easily measured before they are assembled to the piezoelectric tube. The tip mass, m, includes the mass of the tip holder 55, the tunneling-current terminal fastener 56, and the tip itself 43. The components of the tip mass are measured as an assembly on a scale.

The dimensions of the piezoelectric positioner are preferably measured before assembly of the tip 43 and tip holder 55. For the case of an existing SPM 40 with a fully assembled tube positioner 42, the tip 43 and fastener 56 are weighed separately. The mass of the holder 55 is then estimated from a calculation of its volume and the known density of the holder 55. The tip mass, m, is then the sum of the measured and estimated masses of the components.

Table 1 lists the specifications for the piezoelectric material typically utilized in the tube positioner. The specification for the elastic constant has a statistical variation of ±5%. The piezoelectric constants vary ±10%. The greatest variation is in the specification for the dielectric constant where the value is ±20% of the nominal. Since many of the piezoelectric positioner's parameters are determined by only one method, comparison to the manufacturer's specifications can serve as a test for erroneous values.

TABLE 1

Manufacturer's Specifications for Piezoelectric Material

| Manufacturer | American Piezo Ceramics, Inc. |
|---|---|
| Material Type | APC 880 |
| Curie Temperature $T_C$ | 325° C. |
| Density ρ | 7650 Kg/m$^3$ |
| Mechanical Quality Q | 1000 |
| Elastic Constant (short circuit)$S^E11$ | 12.8 × 10$^{-12}$ m$^2$/N |
| Dissipation Factor tanδ | .0035 |
| Piezoelectric Charge Constant $d_{31}$ | −95 × 10$^{-12}$ m/V |
| Piezoelectric Voltage Constant $g_{31}$ | −11 × 10$^{-3}$ V − m/N |
| Coupling Coefficient $K_{31}$ | .30 |
| Dielectric Constant @ 1 KHz | 1000 |

Figure 12:
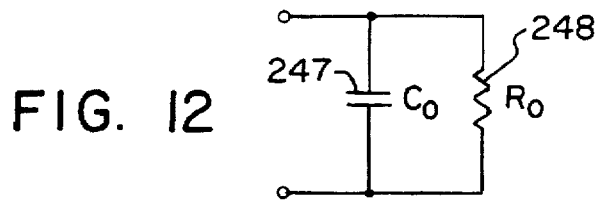
FIG. 12 is a schematic circuit diagram of a parallel equivalent circuit representation of a piezoelectric tube positioner used in deriving estimated physical parameters for use in the observer model of the present invention.

Static capacitance, the dielectric constant and the dielectric loss of the positioner are all determined with the same experimental apparatus and at the same frequency of 1 KHz. At this low frequency the tube positioner behaves as a parallel circuit of a capacitor 247 and a resistor 248 as shown in FIG. 12. The capacitance $C_0$ is measured directly and the resistance $R_0$ is inferred from the dielectric loss (dissipation factor tan δ).

Figure 13:
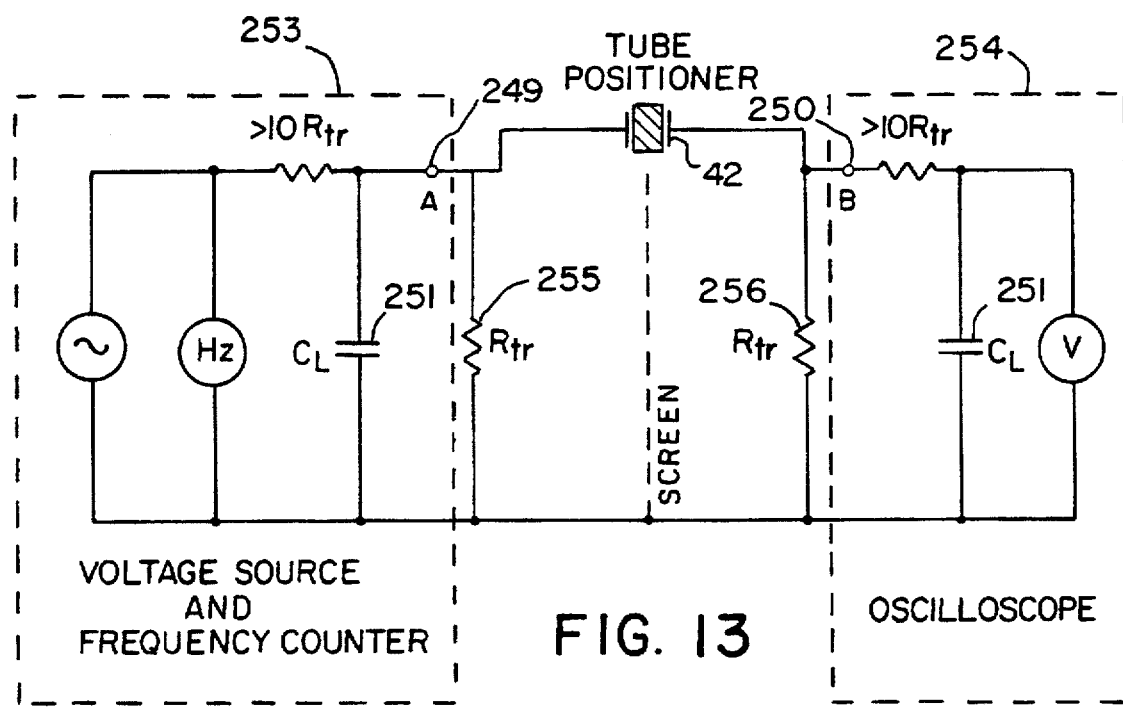
FIG. 13 is a schematic circuit diagram of an impedance bridge which may be used in the derivation of the modeled physical parameters of a piezoelectric tube positioner.

An impedance bridge which can be utilized to measure the static capacitance $C_0$ and the loss angle (tan δ) is shown in FIG. 13. The positioner 42 is connected into the bridge between points 249 and 250, with the outer electrodes 58–61 connected to one point and the inner electrode 57 connected to the other point.

The bridge is configured to minimize the effect of stray capacitances 251 represented by capacitance value $C_L$. These are the leakage capacitances of the voltage source 253 and the oscilloscope 254. Excess charge accumulated on $C_L$ drains off quickly through the transmission resistances 255 and 266, represented by resistance value $R_{tr}$, with a time constant approximately equal to $C_L R_{tr}$. Since it is desirable to have as small a time constant as possible, $R_{tr}$ should be made as small as possible. The limit on the size of $R_{tr}$ is usually dictated by the current capacity of the voltage source 253. If not restrained by the current capacity, $R_{tr}$ is conventionally set to a value of 10 Ω.

To determine the static capacitance and dissipation factor, the voltage source is set at a low frequency, significantly below the resonant frequency of the tube positioner. As a matter of convention this is usually taken as being a 1 KHz sine wave. Frequencies other than 1 kHz may be used so long as $C_0$ is the dominant capacitance at the frequency selected. This will be the case for frequencies significantly below the resonant frequency. For example, 60 Hz may be used if that frequency is easier and more readily available than 1 kHz. The magnitude of the applied voltage, $V_A$ (measured at point 249), is set to approximately 40 volts peak-to-peak (0 Volts offset). The resulting voltage measured at 250 ($V_B$) must be clearly distinguishable above any background noise. If noise is a problem, the applied voltage, $V_A$, can be increased from the 40 volt nominal value. Separating the two resistors 255 and 256 and shielding the tube positioner 42 with grounded foil further reduces noise.

The peak value of $V_A$ is measured directly with an oscilloscope 254. The peak value of $V_B$ is measured on the second channel of the oscilloscope 254. Using $V_A$ as the reference, the two channels are then overlaid and the phase shift of $V_B$ with respect to $V_A$ ascertained.

The equivalent parallel circuit of FIG. 12 is based on the assumption that the capacitance due to the expansion of the tube, the series equivalent capacitance $C_1$, is much less than the static capacitance $C_0$. The parallel equivalent circuit represents the low-frequency or fundamental electrical properties of the tube positioner.

The dielectric loss factor (tan δ) is defined as the ratio of resistance to reactance of the equivalent parallel circuit. δ is therefore the inverse tangent of the ratio which is equivalent to the difference between 90° (no resistance) and the measured phase shift between $V_A$ and $V_B$ (in degrees). The dielectric loss factor is therefore computed from:

$$\tan\delta = \tan(90 - \angle V_A V_B) \quad (3)$$

From the definition of the dielectric loss factor, an expression for the dielectric loss resistance (parallel resistance) can be formed:

$$R_0 = \frac{1}{2\pi f C_0 \tan\delta} \quad (4)$$

where f is the 1 KHz testing frequency.

The static capacitance $C_0$ is determined from the calculation of the impedance of the equivalent parallel circuit expressed in terms of the test parameters from the bridge circuit. In order to solve the expression for $C_0$, equation 4 is substituted for the dielectric loss resistance $R_0$. The expression is:

$$C_0 = \frac{V_B}{2\pi f V_A R_{tr}[(\tan\delta)^2 + 1]\sin(\angle V_A V_B)} \quad (5)$$

The dielectric constant (relative permittivity) is defined as the ratio of the permittivity of the material to the permittivity of free space. The permittivity of the material is defined as the ratio of the charge density to the applied electric field. The dielectric constant can thus be expressed in terms of the measured values as:

$$K_3^T = \frac{\epsilon}{\epsilon_0} = \frac{\frac{q}{\pi ODL}}{\epsilon_0 \frac{V}{\partial a}} = \frac{C_0 \partial a}{\epsilon_0 \pi ODL} \quad ; \quad (6)$$

where ∂a, OD, and L are measured values equaling the positioner tube wall thickness, outer diameter and length respectively and where $\epsilon_0$ is equal to 8.854×10$^{-12}$ F/m. The superscript T designates the dielectric constant measured at a constant temperature and the subscript references the direction with respect to the 3 (polarized) axis.

The accuracy of the impedance bridge measurements for dielectric properties is dependent on the assumption that the series equivalent circuit of the piezoelectric positioner has a much greater impedance than the parallel equivalent circuit. This proves to be a fair assumption for the tube positioner. The series impedance at 1 KHz is on the order of 3 MΩ with the magnitude primarily dictated by the series capacitance.

In contrast, the impedance of the parallel equivalent circuit is approximately 30 KΩ. Since the impedance of the series equivalent circuit is 100 times that of the parallel equivalent circuit, the assumption that the tube positioner is best approximated at low frequency by the parallel equivalent circuit is thus valid.

Since the assumption of the equivalent circuit is correct, the accuracy is dependent on the precision of the data measurement. The accuracy may be expressed in terms of a range, known as the uncertainty, within which the actual value should exist. The uncertainty for the key parameters of static capacitance $C_0$ and dielectric constant $K^T_3$ are most sensitive to the precision with which the angle of $V_B$ is measured. Measurement of the angle with a precision of 0.0018° would reduce the uncertainty to less than 2% of the nominal. However, this degree of precision is not easily obtained via standard lab instruments.

Since these measurements are preferably made while the tube positioner 42 is installed in an SPM such as the STM 40, the measured loss factor will likely be much higher than the published value. This is as expected. As installed in the microscope 40, the tube positioner 42 is connected with 5 hair-width wires. The microscope 40 is then shrouded in a conductive enclosure. The measurement source 254 and driving source 253 are many meters from the microscope. The real component of the low-frequency impedance is therefore much greater due to the significant resistance of the connecting cables. When the material is tested at the manufacturer, the scope 247 and amplifier 246 are directly connected to an optimally shaped sample. The calculated value of tan δ therefore should be understood as the installed loss factor.

The implementation of the material in the tube positioner also alters the calculated value of the dielectric constant. The calculated value makes the assumption that the electrodes are continuous around the outer diameter of the tube scanner and that they extend to the end of the tube with no fringing effects present. It is impractical to make any other assumption, but the effect is to diminish the calculated value of the dielectric constant. It should be kept in mind that published values of the dielectric constant, which may be used for reference purposes, are derived from samples with continuously coated electrodes.

Figure 14:
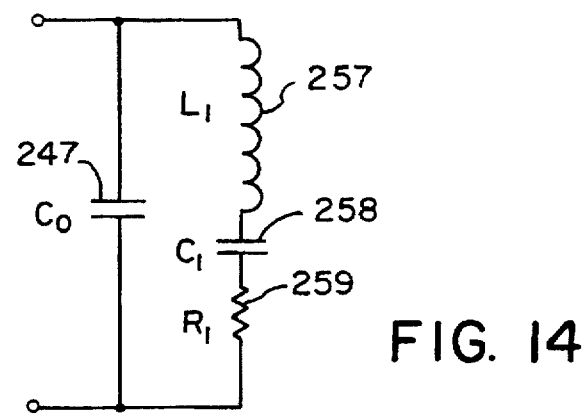
FIG. 14 is a schematic circuit diagram of an equivalent circuit representation of a piezoelectric tube positioner operating near its resonant frequency.

The equivalent circuit of the piezoelectric tube positioner 42 operating near its resonant (axial) frequency is shown in FIG. 14. The equivalent resonant circuit is derived from the complete equivalent circuit by omitting the dielectric loss resistance $R_0$. The assumption is made that the loss resistance is much greater than the impedance of the static capacitor $C_0$ or of the series equivalent circuit comprising the inductance 257 of value $L_1$, the capacitance 258 of value $C_1$ and the resistance 259 of value $R_1$.

The circuit of FIG. 14 has two resonant frequencies. The first resonant frequency is of the series equivalent circuit and is characterized by the interaction of $L_1$ and $C_1$. The second resonant frequency is of the parallel equivalent circuit and is characterized by the interaction of $L_1$ and the parallel combination of $C_0$ and $C_1$. The first resonant frequency is represented by $F_r$ and the second resonant frequency by $F_a$.

The impedance bridge of FIG. 13 is utilized for the determination of the series capacitance, $C_1$, and series inductance, $L_1$. A peak-to-peak sinusoidal waveform of 3 volts (zero offset) is applied to the tube positioner at point 249. The oscilloscope 254 is set in the x-y mode with $V_A$ displayed on the x axis and $V_B$ displayed on the y axis. Maintaining the magnitude of $V_A$, the frequency is slowly increased. Increasing the frequency increases the admittance causing the magnitude of $V_B$ (y axis) to increase. At the resonant frequency of the series equivalent circuit $V_B$ reaches a local maximum value. The resonant frequency, $F_r$, is recorded when $V_B$ is at its maximum. Further increasing the frequency of the applied voltage will cause the admittance to sharply drop ($V_B$ suddenly decreases). Beyond the drop, the admittance will again steadily increase.

The resonant frequency can also be identified from the phase angle between $V_A$ and $V_B$. At resonance the angle begins to shift with $V_B$ moving more in phase with $V_A$. The frequency at which this phase shift begins marks the resonant frequency. The phase shift is detected by observing the slope of the major axis of the elliptical waveform displayed on the oscilloscope. The frequency at which the admittance is again seen to increase after reaching a local maximum is known as the anti-resonant frequency, $F_a$. The anti-resonant frequency can also be identified as the frequency at which the phase angle between $V_A$ and $V_B$ reaches a minimum before again increasing. The phase shift is also detected from the slope of the elliptical waveform.

The resonant frequency of an LC circuit (in radians/s) is expressed as the inverse of the square root of the product of L and C. The resonant and anti-resonant frequencies can thus be expressed (with $F_r$ and $F_a$ in Hertz) as:

$$F_r = \frac{1}{2\pi} \sqrt{\frac{1}{L_1 C_1}} \quad \text{(Series Resonance)} \tag{7}$$

$$F_a = \frac{1}{2\pi} \sqrt{\frac{C_0 + C_1}{L_1 C_0 C_1}} \quad \text{(Parallel Resonance)} \tag{8}$$

Since $C_0$ is known, equations 7 and 8 contain two unknowns, $C_1$ and $L_1$. The two equations are therefore solved simultaneously to determine $C_1$ and $L_1$.

It should be noted that the magnitude of the series impedance is about 20% of the dielectric loss resistance. The true equivalent circuit of the tube scanner must, therefore, include $R_0$. FIG. 14 is still appropriate for the determination of resonant frequencies, but it must be modified with the addition of $R_0$ when utilized for the calculation of impedance.

The impedance bridge of FIG. 13 is again utilized for the determination of the mechanical quality factor of the series resistance, $R_1$. The resonant and anti-resonant frequencies are first measured as described above. The series resistance is measured by setting the signal generator 253 at the resonant frequency $F_r$. The applied voltage, $V_A$, remains at 3 volts (peak-to-peak). The peak voltage, $V_B$, at the resonant frequency $F_r$ is recorded. The tube positioner is then removed from the circuit and a 10 turn 1000 Ω potentiometer inserted in place of the tube scanner. The potentiometer is adjusted until $V_B$ is of the same peak value as it was when the tube scanner was in place (frequency remains at $F_r$). The potentiometer is then removed and its resistance setting measured with a multi-meter. The measured resistance is $R_1$.

The mechanical quality $Q_m$ is the ratio of the inductive reactance to resistance ($R_1$). It is also the ratio of the energy stored to the energy dissipated per cycle.

For a simple parallel or series R-L-C circuit, the energy stored can be characterized by the maximum energy stored on the circuit's inductor. The energy is dissipated by the resistor. However, the resonant equivalent circuit (FIG. 14) is neither a purely parallel nor series circuit with respect to energy storage. The energy is never entirely stored on the inductance 257. A certain percentage of the energy is retained in the capacitance 247. The ratio of the size of $C_1$ to the size of $C_0$ determines the extent to which the energy can be characterized as being entirely stored on the inductance 257.

An expression for the quality factor based on the measured parameters begins with the derivation of the expression for the impedance of the equivalent resonant circuit. Making the assumption that the equivalent capacitance of the circuit can be characterized by placing $C_0$ in series with $C_1$, an expression for the natural frequency of the positioner in radians is formed:

$$\omega_0 = \sqrt{\frac{1}{L_1 C_{eq}}} \qquad (9)$$

where:

$$C_{eq} = \frac{C_0 C_1 (C_0 + C_1)}{(C_0 + C_1)^2 - C_0 C_1} \approx \frac{C_0 C_1}{C_0 + C_1} \qquad (10)$$

Substituting equation 9 for the frequency squared in the impedance relation, an expression for the inductive reactance is formed:

$$\text{Inductive Reactance} = \omega_0 L_1 (1 + C_1/C_0) \qquad (11)$$

Dividing equation 11 by the series resistance, $R_1$, produces an expression for the quality factor. A more convenient form expresses the reactance in terms of the measured resonant and antiresonant frequencies. This expression for the mechanical quality factor is:

$$Q_m = \frac{1}{2\pi F_r R_1 C_0} \left[ \frac{F_a^2}{F_a^2 - F_r^2} \right] \qquad (12)$$

Given the measured value of $R_1$ and the previously determined values of $F_r$, $F_a$, and $C_0$ the mechanical quality factor can be calculated. The accuracy of the calculated mechanical quality is insensitive to the assumptions made in the derivation of equation 10. The ratio of $C_1$ to $C_0$ is generally less than 5%.

The calculated value of the mechanical quality will likely be much less than the published value. This is predictable. As in the case of the loss factor and dielectric constant, the significant resistance of the connecting cables to the tube scanner is omitted in the published case. The published value is also referenced to operation in a vacuum. The effect of air resistance is to increase the series resistance $R_1$. Thinking in purely electrical terms, the effect of increasing series resistance is to diminish the resonant peak or quality of the resonating circuit.

Modeling of the piezoelectric positioner is complicated by the fact that the distributed mass of the tube is as great as the tip mass. Therefore, the accelerated tube mass can not be discounted as a trivial component of the applied force. In addition, the stiffness of the tube scanner is nonlinear with respect to the frequency of the applied force (voltage). The solution is to use a simple model incorporating lumped parameters. The lumped parameters are selected to achieve the same dynamics for the simple model as those that occur in the actual tube scanner. The steady state solution, derived from wave mechanics, defines the actual dynamics of the tube scanner about an operating point.

The lumped parameters used in the observer 84 are the stiffness $K_p$, the tip mass $m_p$, and the damping coefficient $C_{dp}$. An intermediate lumped parameter $Q_{mp}$ is used in the calculation of the damping coefficient. The elastic compliance along the tube's axis $s_{11}^E$ is calculated from a wave equation. $s_{11}^E$ is not a lumped parameter but is directly utilized in the calculation of the lumped parameters.

The elastic compliance $s_{11}^E$ is the inverse of the elastic modulus Y. The 11 subscript denotes the strain in the 1 axis (along the length of the tube) corresponding to the applied stress on the 1 axis. The superscript E denotes the compliance as being applicable under conditions of a constant electric field.

The derivation of the elastic compliance stems from the wave equation for the tube positioner. The wave equation is:

$$\frac{z}{F} = \frac{1}{\frac{kAY}{\tan kL} - \omega^2 m + j \frac{\omega \omega_0 m}{Q_m}} \qquad (13)$$

where z is the position of the positioner, F is the force function, and k is the wave number, or piezoelectric coupling coefficient.

This wave equation is a nonlinear second order system. It can be seen that the denominator reaches a minimum value when:

$$\omega^2 m = \frac{kAY}{\tan kL} . \qquad (14)$$

This corresponds to the response of the tube scanner at the resonant frequency $F_r$ where:

$$\omega = \omega_0 = 2\pi F_r. \qquad (15)$$

Equation 14 can be expressed in terms of known parameters and the sole unknown parameter $s_{11}$. However, determination of the unknown requires an iterative solution. The expression is most advantageously arranged as $$\frac{A \sqrt{\rho}}{2\pi F_r m \sqrt{s_{11}}} - \tan(2\pi F_r L \sqrt{\rho \, s_{11}}) = 0 \qquad (16)$$

As a starting value, the manufacturer's specification of the elastic compliance is used. Reasonable accuracy can be achieved by hand calculation, however, a simple computer program for calculating the compliance is recommended. The details of such a program would be well known to those having skill in that art. A sample of such a program is included at the end of this specification.

This method of calculating the compliance has no inherent assumptions that limit the accuracy. The method is derived from the dynamic response predicted by the wave equation. Accuracy is a function of the measurement precision. With the precision employed, the uncertainty is less than 2% of the nominal value. Confidence in the accuracy may be gained by comparison of the calculated compliance to the manufacturer's published value for the compliance.

The transfer function for the lumped parameter model is expressed as:

$$\frac{z(\omega)}{F(\omega)} = \frac{1}{\omega_0^2 m_p - \omega^2 m_p + j\omega c_d} \qquad (17)$$

$$\frac{z(\omega)}{F(\omega)} = \frac{1}{\omega_0^2 m_p - \omega^2 m_p + j \frac{\omega \omega_0 m_p}{Q_{mp}}} \qquad (18)$$

At resonance, as with the wave equation, the real component of the denominator of the lumped transfer function goes to zero. The magnitude of the transfer function at resonance is therefore dictated by the imaginary component. In mapping the response, the magnitude at resonance should be equal. The imaginary components of the denominator must therefore be equal. An expression of the relationship of the lumped parameters, $m_p$ and $Q_{mp}$, with respect to the actual values of m and $Q_m$ can thus be formed:

$$Q_{mp} = \frac{m_p}{m} Q_m \quad (19)$$

Equation 19 has two unknowns. A second expression for $m_p$ can be found by equating the real components of equations 13 and 18. Solving for the lumped mass, the expression becomes $$m_p = \frac{A 2\pi f \sqrt{\rho} \, s_{11}}{((2\pi F_r)^2 - (2\pi f)^2) s_{11} \tan(2\pi f L \sqrt{\rho \, s_{11}})} - \frac{m(2\pi f)^2}{(2\pi F_r)^2 - (2\pi f)^2} \quad (20)$$

Equation 20 incorporates several subtleties. It is derived from the equating of the magnitudes of each of the transfer functions. By equating the imaginary components as represented by equation 19, the real components must be equal if the magnitude is to be equal. The second subtlety is in regards to the stiffness. The real term containing the tangent expression is the nonlinear (frequency dependent) representation of the stiffness of the tube. Selecting a frequency (f) at which equation 20 is evaluated corresponds to selection of an operating point at which to evaluate the stiffness. The lumped value of the tip mass is a consequence of the lumped model dependence of $m_p$ on $K_p$ given the resonant frequency $F_r$.

The rate of change of the nonlinear stiffness is characterized by the derivative of the arc tangent. The derivative is a one over one plus the argument squared expression. Thus the greatest change in the stiffness occurs at low frequency. As is the practice, the stiffness is therefore evaluated at 1 KHz. However, the selection of 1 KHz is not strictly arbitrary. The frequency response function plots of each of the equations match well when the stiffness is evaluated at the 1 KHz operating point.

Fortunately, the design of the tube positioner lends itself well to the method of parameter mapping. The inaccuracy incurred by the simple model results in a mismatch in the theoretical frequency response of less than 1% (Amplitude in dB).

For the lumped model, the square root of the ratio of the stiffness to the mass is equal to the resonant frequency. Since the resonant frequency is known, the stiffness can be directly calculated as:

$$K_p = m_p (2\pi F_r)^2 \quad (21)$$

The accuracy of the lumped stiffness is dependent on the extent of the match of the dynamic response of the lumped model to the actual tube scanner. The theoretical match is within 1% of actual over the operating range.

The mechanical quality factor is defined in terms of the stiffness, mass, and damping coefficient. Since the lumped quality factor, stiffness, and mass are all known, the lumped damping coefficient can be calculated. The expression is:

$$c_{dp} = \frac{\sqrt{K_p m_p}}{Q_{mp}} \quad (22)$$

The accuracy of the lumped damping coefficient is also dependent on the quality of the mapping of the dynamic response of the lumped model to the actual tube scanner's response. The theoretical match is within 1% of actual over the operating range. The accuracy of the damping coefficient parameter is therefore not fundamentally compromised by the method of derivation. However, the accuracy is compromised by the three tiers of accumulated uncertainty in the calculation.

The piezoelectric coupling coefficient (sometimes referred to as the electromechanical coupling coefficient) is defined as the ratio of the mechanical energy accumulated in response to an electrical input. It can also be defined as the ratio of the electrical energy accumulated in response to a mechanical input. The piezoelectric coupling coefficient can be expressed as:

$$k = \sqrt{\frac{\text{Mechanical Energy Stored}}{\text{Electrical Energy Applied}}}$$

OR $$k = \sqrt{\frac{\text{Electrical Energy Stored}}{\text{Mechanical Energy Applied}}}$$

For the piezoelectric tube positioner, the electrical energy storage/application is represented by the energy contained in the parallel equivalent circuit. The mechanical energy storage/application is represented by the energy contained in the series equivalent circuit. The energy flow between the two circuits is characterized by the sharpness of the response between the resonant and anti-resonant frequencies of the impedance measurement.

All coupling coefficients can be calculated for the various modes of vibration through application of first-kind zero-order and first-kind first-order Bessel functions to the resonant response. Assuming that the Poisson's ratio for piezoelectric materials is typically 0.31 (lead-zirconate titanate), the coupling coefficient can be expressed as:

$$\frac{k_{31}^2}{1 - k_{31}^2} = \frac{\pi}{2} \left( 1 + \frac{F_a - F_r}{F_r} \right) \tan\left( \frac{\pi}{2} \, \frac{F_a - F_r}{F_r} \right) \quad (24)$$

where $F_r$ and $F_a$ are in Hertz. The coupling coefficient is found iteratively.

The accuracy of the coupling coefficient calculation depends on the extent that the energy of the tube scanner can be characterized by the resonant response. Precise measurement of the response is therefore essential for high accuracy. Fortunately precise measurement is feasible.

Further confidence in the calculated coupling coefficient is gained by comparison of the value to the manufacturer's published value. The calculated value will often be lower than the published value. This is to be expected since the calculated value is derived from the actual microscope with the associated electrical (long small wires) and mechanical (air resistance) losses not accounted for in the published value.

The piezoelectric charge coefficient $d_{31}$ is the ratio of the electric charge generated per unit area of the charge surface (outer surface of the tube) to an applied axial force. It can also be expressed as the strain developed along the tube due to an applied electric field.

The coupling coefficient represents the energy relation between the stored and applied energy. Both the electrical and mechanical energies can be expressed in terms of a force or voltage times a displacement. The piezoelectric charge coefficient is analogous to the electric displacement corresponding to an applied force. An expression can thus be formed for the charge coefficient from the coupling coefficient if the ratio of mechanical displacement to applied voltage can be found. The product of the piezoelectric permittivity and the elastic compliance contains the desired ratio. Taking the square root of the product enables an expression for the charge coefficient to be formed. The charge coefficient is determined from:

$$d_{31} = k_{31} \sqrt{\epsilon_0 K_3^T s_{11}^E} \quad (25)$$

The formation of equation 25 does not depend on any assumptions regarding the piezoelectric application. The accuracy of the charge coefficient is a factor only of the associated uncertainty of the parameters contained in the calculation.

The calculated value of the piezoelectric charge coefficient will likely differ from the published value of the charge coefficient. This is a direct consequence of the calculated value of the dielectric constant. The charge coefficient therefore varies from the published value for the exact same reasons that the dielectric constant varies. The difference is expected and the calculated charge coefficient may be taken as being reasonable in value when compared to the published value.

The force constant $K_f$ is a fabricated parameter specific to the application of a piezoelectric tube positioner. The constant $K_f$ is used to scale the electromechanical interaction between the applied voltage and the force acting on the tube positioner. The force constant enables the lumped parameter mechanical model to be substituted for the series equivalent circuit of the impedance model. ($K_f$ is analogous to the torque constant of a DC motor model.) Unlike the piezoelectric charge coefficient, the force constant cannot be generally applied.

The force constant is derived from the elastic compliance and from the piezoelectric charge coefficient. The elastic compliance is the ratio of the strain to the stress. From the compliance, the transfer function for the change in force with respect to change in length can be formed:

$$\frac{\Delta F}{\Delta L} = \frac{A}{s_{11}L} \quad (26)$$

Equation 26 should be seen as equivalent to the lumped stiffness expressed in terms of fundamental parameters. The transfer function only applies at steady state (zero frequency). This can be realized by examining the physical system model.

The piezoelectric charge coefficient is the ratio of the change in length $\Delta L$ to the applied voltage $\Delta V$ at steady state. The force constant can be found because at steady state the force state feedback must equal the applied force. The force state feedback is known from equation 26 and the applied force is known (implied) from the charge coefficient. Solving the charge coefficient relation for $\Delta L$ and substituting into equation 26, an expression for the force constant is found.

$$K_f = \frac{\Delta F}{\Delta V} = \frac{d_{31}}{s_{11}L} \quad (27)$$

The formation of equation 27 does not contain any assumptions which inherently compromise the accuracy of the force constant. The accuracy is only a factor of the associated uncertainties of the charge coefficient, the length, and the elastic compliance.

The parameter values derived using the method described above for the tube positioner of FIG. 4 made of the piezoelectric material of Table 1 are listed in Table 2. Specifically, the values in Table 2 were derived from a 6.35 mm outer diameter by 31.75 mm long quartered tube having a 0.5 mm wall thickness.

TABLE 2

Exemplary Tube Scanner Physical Parameters

| Parameter | Symbol | Value |
|---|---|---|
| Physical Mass | $M_p$ | 1.55 g |
| Physical Damping | $C_{dp}$ | 1.12 N/m/s |
| Physical Stiffness | $K_p$ | 22,348,191 N/m |
| Force Constant | $K_f$ | 135.8 N/V |

For use in the observer model the estimated parameters, $M_{pe}$, $C_{dpe}$, $K_{pe}$, and $K_{fe}$ are set equal to the calculated values. It should be noted that the parameter calculation described is only exemplary, other methods of deriving these values which may be known may also be used. Moreover, the complex geometry of the tube positioner presents a much more extensive procedure for calculating the parameter values then will normally be encountered. The calculation of these parameters for other geometries, i.e., a linear piezoelectric activator/positioner (translator), will be known to those with skill in the piezoelectric arts.

EXAMPLE OF TUNING OBSERVER STATE GAINS

Once the physical parameters for the observer model have been derived, the values for the observer state gains, K1, K2 and K3, are chosen to efficiently tune the observer 84. By treating the observer as an ordinary physical system using state feedback any method known in the art for selecting the state gains of such a system may be used to tune the observer. As with a physical system, the objective of tuning the state gains is to cause the position and velocity, in the case of the observer the estimated position and estimated velocity, to settle at a new value in response to a commanded change in position as rapidly as possible. An exemplary calculation of the observer state feedback values is presented below for the tube positioner of an SPM as described above. It should be noted that a variation of this procedure could also be used to select the active state gain parameters, $K_{ia}$, $K_a$ and $C_{da}$, of the control signal generating portion of the positioner control system. It should also be noted that the actual observer state feedback gain values which can be used are subject to the same limitations as the active state feedback values, mainly the power limitations of the physical devices used to implement the observer.

The observer velocity state feedback, K2, is primarily selected based on the desired system dynamics of the observer. Specifically, for the tube positioner, it is based on the desired velocity estimate bandwidth. For example, to achieve a position bandwidth of 800 Hz, the velocity estimate bandwidth is usually selected as being at least 10 times greater (8 KHz). To achieve this bandwidth the estimated physical stiffness is supplemented by an observer velocity state feedback, K2, equal to five times the physical stiffness. This places the complex roots (eigenvalues) of the characteristic equation of the observer 84 at a location sufficiently far from the origin that the addition of observer velocity state feedback and integrated position state feedback will achieve the desired bandwidth.

Figure 15:
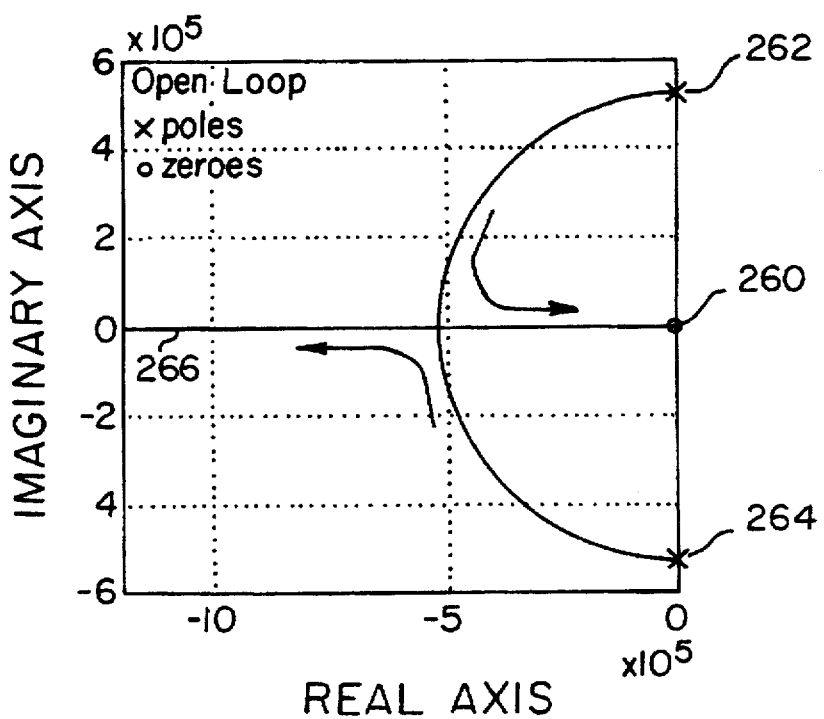
FIG. 15 is an exemplary plot of the roots of the characteristic equation of an observer in accordance with the present invention for various values of observer velocity state gain which may be used to select the gain value which will result in optimal damping of the observer.

The root locus of the observer's open loop poles for increasing values of K1 are plotted in FIG. 15. Velocity state feedback places an open loop zero at the origin 260. Consequently, as K1 is increased, the two complex poles 262 and 264 of the tube scanner are forced toward the real axis 266. Thus the transient response of the observer improves. When both poles 262 and 264 reach the real axis

266 the observer is critically damped. The fastest response with no overshoot is obtained at this point. Further increases in K1 would result in the observer's response becoming sluggish.

Figure 16:
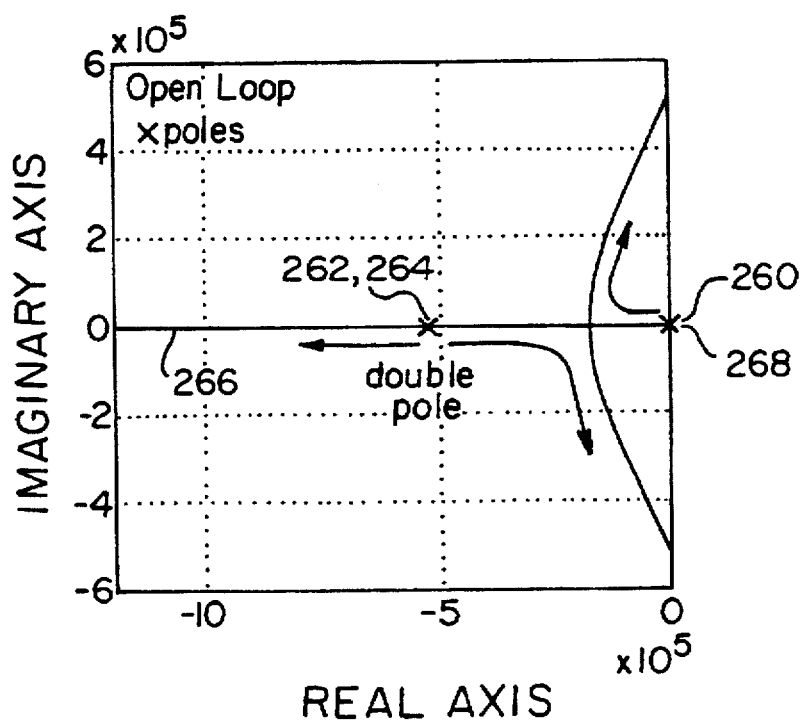
FIG. 16 is an exemplary plot of the roots of the characteristic equation of an observer for various values of observer integration gain, which may be used to select the gain value which will result in the fastest observer system response while maintaining adequate damping.

With the double pole 262 and 264 set by K1, the integrated position state feedback, K3, can be determined. The root locus of the observer's open loop poles with varying K3 is plotted in FIG. 16. As K3 is increased, the double pole set by K1 moves apart. One of the poles heads along the real axis 266 toward negative infinity and the other pole heads toward the origin 260. A third pole 268 placed at the origin 260 by the integrator also moves along the real axis 266 back toward the second pole 262. The third pole 268 is the dominant pole since it is at the lowest frequency. The fastest system response is thus obtained when the dominant pole 268 is moved to the highest possible frequency while still maintaining adequate damping. This point is reached when the two poles 262 and 268 meet. Further increasing K3 would result in the poles 262 and 268 moving off axis. With the double pole 262 and 268 the observer is again critically damped. It should be noted that the observer could be driven unstable if K3 were increased unbounded. Exemplary values for the observer feedback gains derived by this method for an exemplary set of estimated physical parameters are shown in Table 3.

TABLE 3

Tuned Observer Parameters

| Estimated Physical Parameter | Observer State Gains |
|---|---|
| Stiffness $K_{pe}$ = 68,323,202 N/m | Integrated Stiffness $K3 = 3.158099 \times 10^{13}$ N/ms |
| Damping $C_{dpe}$ = 13.2 N/m/s | Stiffness K2 = 341,616,010 N/m |
| Mass $m_{pe}$ = 1.516 g | Damping K1 = 1,031,309 N/m/s |

A peculiarity of the tube positioner is its high natural frequency and low damping. It is worth noting that the natural frequency may be sufficient to consider ignoring the addition of position state feedback. Indeed, if it is ignored, a lower amount of velocity state feedback can be utilized. Desired bandwidth is the deciding factor in the choice to employ active position state gain. As noise may limit the obtainable bandwidth anyway, eliminating K2 may also be appropriate.

Acceleration observer gains $K_4$, $K_5$, and $K_6$ may be tuned in the same fashion as the velocity observer gains. The root loci of FIGS. 15 and 16 equally apply to the acceleration observer 132. The proportional position state gain $K_5$ is selected based on the desired band width. The velocity state gain $K_4$ is increased until there is sufficient damping. This occurs when the roots become real. The integral position state gain $k_6$ sets the desired integral stiffness. The acceleration observer band width is selected based on the level of tolerable noise versus the amount of error correction, as is also the case with the velocity observer 84.

EXEMPLARY PROGRAM LISTINGS

Exemplary program listings for implementing a piezoelectric positioner controller in accordance with the present invention in a digital system, and for calculating the elastic compliance of a piezoelectric positioner, follow. The program PiezoController is a realistic illustrative example of a digital implementation of the control algorithm, including the observer, of the present invention. The program thus contains procedures for generating, loading, and storing command trajectories. The system input/output is typical of that used with the widely used Burr-Brown digital-to-analog/analog-to-digital converter card.

{          Piezo Position and Velocity Observer    Program          }
{                                                                   }
{     Digital Implementation Using a Personal Computer              }

{   PC (IBM) Bus With 4 Channel A/D and D/A Data Acquisition Card   }
{   installed in the computer's backplane                           }

{Position State Feedback Provided by a Linear Encoder (10K cnts/in, 100K}
{cnts total travel)                                                    }

{----------------------PiezoController------------------------}

PROGRAM PiezoController;

USES DOS, CRT, PCIUnit;

Compiler='TurboPascal ver 4.0';

```
        CONST Maxsamples=3000;

TYPE SampleArray=ARRAY[0..MaxSamples] OF INTERGER;
         FileName Type=STRING[65];

VAR  Int_Freq                       :Real;
         ExitSave                       :POINTER;
         Chan1,Chan2                    :^Double;
         Chan1Scale,Chan2Scale          :Double;
         VoltScale,PosScale             :Double;
         PosCmd                         :SampleArray;
         VelCmd                         :SampleArray;
         DataFile                       :TEXT;
         i,k,NumDataPoints              :INTEGER;
         increment                      :LONGINT;

PosErr                         :Double;
         Pos                            :Double;
         PiezoVolt                      :Double;
         PosEst                         :Double;
         PosEstErr                      :Double;
         IntPosEstErr                   :Double;

VelEst                         :Double;
         Vel                            :Double;
```

```
        Vout                            :Double;
        VelEstErr                       :Double;
        VelEstzero                      :Double;

StartPos                        :Double;
        StartVolt                       :Double;

AccEst                          :Double;
        mp                              :Double;

K1                              :Double;
        K2                              :Double;
        K3                              :Double;

Cdp                             :Double;
        Cda                             :Double;
        Kf                              :Double;
        InvKfCnt                        :Double;
        Kp                              :Double;
        Kia                             :Double;
        Ka                              :Double;

{Values of DACS can be adjusted to eliminate DC bias}

CONST DAC0zero=2044;
           DAC1zero=2044;
           DAC2zero=2044;
           DAC3zero=2044;

DACcountsPerVolt=204.8;

{--------------------------------InitPorts------------------------}
PROCEDURE InitPorts;

BEGIN
      ClrScr;
      WRITELN;
      WRITELN ('Initialing Hardware');

{Initialize Digital Ports}

PCIDigPorts[0].IOtype:=null;
      PCIDigPorts[1].IOtype:=null;
```

```
    PCIDigPorts[2].IOtype:=null;
    PCIDigPorts[3].IOtype:=null;

Init_PCI_Ports;

DELAY(500);

INIT_PCI20003_DAC(1);   {Initialize DAC1 (pos 1 on carrier board)}
    INIT_PCI20003_DAC2(1);  {Initialize DAC2 (pos 2 on carrier board)}
    INIT_PCI20003_ADC(3);   {Initialize ADC1 (pos 3 on carrier board)}

DELAY(500);

Port[$350]:=0;  {Initialize encoder Chn 1 (resets encoder output)}
    NumDataPoints:=0;

PCI20003_DAC(DAC0zero,0);  {zero DAC outputs}
    PCI20003_DAC(DAC1zero,0);
    PCI20003_DAC2(DAC2zero,0);
    PCI20003_DAC2(DAC3zero,1);

DELAY(500);

END;

{---------------------------------EncPos---------------------------}
Function EncPos:INTEGER;   {Procedure to return encoder position of piezo}

VAR
    lobyte,hibyte    :byte;

BEGIN
       hibyte:=port[$340];
       lobyte:=port[$341];
       EncPos:=-(hibyte Shl 8 + lobyte);
    END;

{--------------------SendDAC0counts--------------------------}
PROCEDURE SendDAC0counts (c:INTEGER);

BEGIN
        PCI20003_DAC (c+DAC0zero,0);
```

```
            END;

{---------------------SendDAC1counts---------------------------}
PROCEDURE SendDAC1counts (c:INTEGER);

BEGIN
        PCI20003_DAC (c+DAC1zero,1);
    END;

{---------------------SendDAC2counts---------------------------}
PROCEDURE SendDAC2counts (c:INTEGER);

BEGIN
        PCI20003_DAC2 (c+DAC2zero,0);
    END;

{---------------------SendDAC3counts---------------------------}
PROCEDURE SendDAC3counts (c:INTEGER);

BEGIN
        PCI20003_DAC2 (c+DAC3zero,1);
    END;

{----------------------SendDAC0volts---------------------------}
PROCEDURE SendDAC0volts (v:DOUBLE);

BEGIN
        PCI20003_DAC (trunc(V*DACcountsPerVolt)+DAC0zero,0);
    END;

{----------------------SendDAC1volts---------------------------}
PROCEDURE SendDAC1volts (v:DOUBLE);

BEGIN
        PCI20003_DAC (trunc(V*DACcountsPerVolt)+DAC1zero,1);
    END;

{----------------------SendDAC2volts---------------------------}
PROCEDURE SendDAC2volts (v:DOUBLE);

BEGIN
        PCI20003_DAC2 (trunc(V*DACcountsPerVolt)+DAC2zero,0);
    END;
```

−71−

```
{---------------------SendDAC3volts----------------------}
PROCEDURE SendDAC3volts (v:DOUBLE);

BEGIN
      PCI20003_DAC2 (trunc(V*DACcountsPerVolt)+DAC3zero,0);
   END;

{-------------------------------Int-----------------------------}
PROCEDURE Int (Flags, CS, IP, AX, BX, CX, DX, SI, DI, DS, ES, BP:word);

INTERRUPT;

BEGIN
      inc(k,increment);

PiezoVolt:=ReadADC2;
      PiezoVolt:=(PiezoVolt-StartVolt)*VoltScale;

Pos:=EncPos;
      Pos:=(Pos-StartPos)*PosScale;

PosEstErr:=Pos-PosEst;
      IntPosEstErr:=IntPosEstErr+PosEstErr*T;

AccEst:=((PiezoVolt*Kf)+(K2*PosEstErr)+(K3*IntPosEstErr)-
              (PosEst*Kp)-(VelEst*Cdp))/mp;

VelEstzero:=VelEst+(AccEst*T);

VelEst:=VelEstzero+(K1*PosEstErr);

PosEst:=PosEst+(VelEst*T);

PosErr:=(PosScale*PosCmd[k])-Pos;
      VelErr:=VelCmd[k]-VelEst;
      IntPosErr:=IntPosErr+(PosErr*T);

Vout:=[(Cda*VelErr)+(Ka*PosErr)+(Kia*IntPosErr)]*(InvKfCnt);

SendDAC3volts (Vout);

chan1:=PosCmd[k];
```

-72-

```
    chan2:=Pos;

SendDAC0volts(chan1^*Chan1Scale);
    SendDAC1volts(chan2^*Chan2Scale);

END;

{---------------------------Controller----------------------------}
PROCEDURE Controller;

VAR  T:REAL;

BEGIN
    T         :=1/Int_Freq;

ScrnHeader;

Cdp               :=.0112;           {N/m/s}
    mp                :=1.57e-3;         {Kg}
    Kp                :=22383494;        {N/m}
    Kf                :=135.9            {N/V}

InvKfCnt          :=(1/Kf)*.10;      {Set scaling of Volt/N output}

Cda               :=370.57;          {N/m/s}
    Ka                :=0;               {N/m}
    Kia               :=1.6e11;          {N/ms}

VelErr            :=0;
    PosErr            :=0;
    IntPosErr         :=0;
    Pos               :=0;
    Vel               :=0;
    PosCmd            :=0;
    VelCmd            :=0;
    StartPos          :=EncPos;
    StartVolt         :=ReadADC2;

k                 :=0;
    increment         :=1;

K1                :=Cda/mp;          {N/mKg/s}
    K2                :=0;               {N/m}
```

```
K3              :=1.6e11;      {N/ms}

PosEstErr       :=0;
VelEstErr       :=0;
IntPosEstErr    :=0;
PiezoVolt       :=0;
PosEst          :=0;
VelEst          :=0;
AccEst          :=0;

Chan1Scale      :=1;
Chan2Scale      :=1;

VoltScale       :=100;         {Set scaling of volts/cnt input}
PosScale        :=393700.78;   {Set scaling of cnts/meter}

PosCmd[2999]:=50;{establish commands to hold after stored}
PosCmd[3000]:=50;

VelCmd[2999]:=0;
VelCmd[3000]:=0;

SetIntFreq(Int_Freq);

Connect(@Int);
REPEAT
UNTIL (k>NumDataPoints-10);

increment:=0;
k:=2999;

SendDac2volts(5);    {Output trigger for end of trajectory}

GotoXY (1,10);
WRITE('Trajectory complete. Controller holding. Hit <ENTER> to
        continue');

READLN;

Disconnect;

SendDAC0counts(0);
SendDAC1counts(0);
```

```
    SendDAC2counts(0);
    SendDAC3counts(0);

END;

{--------------------------Sinusoid----------------------------}
PROCEDURE Sinusoid;

CONST   MaxAcc=2000;    {rad/s^2}

Q=2.54e-5;      {m/count}

VAR FileName            :FileNameType;
        Freq, Amp, T        :Double;
        MaxAmp              :INTEGER;
        W,R,B               :Double;
        Pos, AccumPos,Vel   :Double;
        k, DelPos           :INTEGER;

BEGIN

ScrnHeader;

GotoXY (6,12);
        WRITE ('Input file name to write to:');
        READLN(FileName);

ASSIGN (DataFile, Filename+'.dat');
        REWRITE (DataFile);

GotoXY(6,14);
        WRITE('Input Sample Frequency (Hz):');
        READLN(int_Freq);
        WRITELN(DataFile,Int_Freq);

GotoXY(6,16);
        WRITE('Input Sinusoid Frequency (Hz):');
        READLN(Freq);

{.5 in Max travel (5000 cnts/rev) for Sinusoidal trajectory}
        MaxAmp:=trunc(5000/(2*pi)*MaxAcc/(2*pi*Freq*2*pi*Freq));
```

```
REPEAT

GotoXY(6,18);
    WRITE('Input Sinusoid Amplitude (encoder counts)
            (Max=',MaxAmp,'):');
    READLN(Amp);

UNTIL Amp<=MaxAmp;

ScrnHeader;

Goto(15,15);
WRITELN('Generating & Storing Data File');

T:=1/Int_Freq;
W:=2*pi*Freq;
B:=(2*Amp*Q)/(2*pi);
AccumPos:=0;
k:=0;

REPEAT
    Inc(k);
    R:=W*k*T;
    Pos:=Amp*(1-COS(R));
    Vel:=B*SIN(R);
    DelPos:= trunc(Pos-AccumPos);
    AccumPos:=AccumPos+DelPos;
    VelCmd[k]:=Vel;            {m/s}
    PosCmd[k]:=AccumPos;       {counts}
    WRITELN(DataFile,AccumPos,' ',Vel);

UNTIL (k=3000);

NumDataPoints:=k;

CLOSE(DataFile);

END;

{---------------------------Point_To_Point----------------------}
PROCEDURE Point_TO_Point;
```

–76–

```
CONST  N=3000;

Q=393700.78;      {count/m}
MaxAcc=20;        {m/s^2}

VAR FileName              :FileNameType;
    T,A,B,C,P             :Double;
    time,Acc,MaxVel       :Double;
    Pos,Vel               :Double;
    MaxPos, DP,AccumPos,i :LONGINT;
    k, DelPos             :INTEGER;

BEGIN

ScrnHeader;

GotoXY (6,12);
  WRITE ('Input file name to write to:');
  READLN(FileName);

ASSIGN (DataFile, Filename+'.dat');
  REWRITE (DataFile);

GotoXY(6,14);
  WRITE('Input Sample Frequency (Hz):');
  READLN(Int_Freq);
  WRITELN(DataFile,Int_Freq);

REPEAT

GotoXY(6,16);
  WRITE('Input Acceleration (m/s^2) (Max=',MaxAcc,'):');
  READLN(Acc);

UNTIL Acc<=MaxAcc;

GotoXY(6,18);
  WRITE('Input Max. Velocity (m/s) :');
  READLN(MaxVel);

T:=1/Int_Freq;
```

```
If (N*T)/2<(MaxVel/Acc) THEN MaxPos:=trunc(Acc*sqr(N*T/2)*Q)
Else  MaxPos:=trunc(MaxVel*(N*T-MaxVel/Acc)*Q);

If MaxPos>100000 THEN MaxPos:= 100000;

Pos:=EncPos;

If 100000-Pos<MaxPos THEN MaxPos:=(100000-Pos);

REPEAT
GotoXY(6,20);
WRITE('Input Position Change (enc cnts) (Max=',MaxPos,'):');
READLN(DP);

UNTIL DP<=MaxPos;

ScrnHeader;

Goto(15,15);
WRITELN('Generating & Storing Data File');

T:=1/Int_Freq;
Acc:=Acc*Q;
MaxVel:=MaxVel*Q;
B:=Acc/2;
AccumPos:=0;
k:=0;

REPEAT
    Inc(k);
    time:=k*T;
    Pos:=B*sqr(time);
    Vel:=Acc*time;
    DelPos:= trunc(Pos-AccumPos);
    AccumPos:=AccumPos+DelPos;
    VelCmd[k]:=Vel/Q;
    PosCmd[k]:=AccumPos;
    WRITELN(DataFile,AccumPos,' ',VelCmd[k]);

UNTIL (Vel>=MaxVel) OR (AccumPos>=DP/2);

IF(AccumPos<DP/2) THEN
```

```
            BEGIN
                P:=MaxVel*T;
                i:=AccumPos;
                REPEAT
                    Inc(k);
                    Pos:=Pos+P;
                    Vel:=MaxVel;
                    DelPos:= trunc(Pos-AccumPos);
                    AccumPos:=AccumPos+DelPos;
                    VelCmd[k]:=Vel/Q;
                    PosCmd[k]:=AccumPos;
                    WRITELN(DataFile,AccumPos,' ',VelCmd[k]);

UNTIL (DP-AccumPos<=i);
            END;
    ELSE
        BEGIN
            MaxVel:=Vel;
        END;

C:=Acc*T;
B:=-B;
P:=Pos;
i:=k;

REPEAT
    Inc(k);
    time:=(k-i)*T;
    Pos:=B*sqr(time)+MaxVel*time+P;
    Vel:=-Acc*time+MaxVel;
    DelPos:= trunc(Pos-AccumPos);
    AccumPos:=AccumPos+DelPos;
    VelCmd[k]:=Vel/Q;
    PosCmd[k]:=AccumPos;
    WRITELN(DataFile,AccumPos,' ',VelCmd[k]);

UNTIL (DelPos<=0);

REPEAT
    Inc(k);
    PosCmd[k]:=AccumPos;
    WRITELN(DataFile,0);
```

```
    UNTIL (k>=N);

NumDataPoints:=k;

CLOSE(DataFile);

END;

{--------------------------LoadTrajectoryFile--------------------}
PROCEDURE LoadTrajectoryFile;

VAR  FileName              :FileNameType;

BEGIN

ScrnHeader;

GotoXY (12,12);
    WRITE ('Name of Trajectory Command File?:');
    READLN(FileName);

ASSIGN (DataFile, Filename+'.dat');
    RESET (DataFile);

READLN(DataFile,Int_Freq);
    k:=0;

WHILE NOT EOF(DataFile) DO

BEGIN
          Inc(k);
          READLN(DataFile,PosCmd[k]);
          READLN(DataFile,VelCmd[K]);
        END;

CLOSE (DataFile);

NumDataPoints:=k;

END;
```

-80-

```
{-----------------------------Menu-----------------------------}
PROCEDURE Menu;

VAR  Ch              :CHAR;
         Quit            :Boolean;

BEGIN
        REPEAT
           ScrnHeader;
           GotoXY (5,8);HighVideo;
                   WRITE ('L');
           GotoXY (8,8);LowVideo;
                   WRITE ('Load Trajectory File');
           GotoXY (5,10);HighVideo;
                   WRITE ('P');
           GotoXY (8,10);LowVideo;
                   WRITE ('Point-to-Point Trajectory File Generation');
           GotoXY (5,12);HighVideo;
                   WRITE ('S');
           GotoXY (8,12);LowVideo;
                   WRITE ('Sinusoidal Trajectory File Generation');
           GotoXY (5,14);HighVideo;
                   WRITE ('C');
           GotoXY (8,14);LowVideo;
                   WRITE ('Start Controller');
           GotoXY (5,16);HighVideo;
                   WRITE ('Q');
           GotoXY (8,16);LowVideo;
                   WRITE ('Quit');

Quit:=FALSE;

REPEAT UNTIL KeyPressed;
    Ch:=UPCASE(Readkey);

CASE Ch OF
           'L'  :LoadTrajectoryFile;
           'P'  :Point_To_Point;
           'C'  :Controller;
           'S'  :Sinusoidal;
           'Q'  :Quit:=TRUE;
```

-81-

```
        END;   {case}

UNTIL Quit;

END;

{--------------------------PiezoControllerExit-----------------}
PROCEDURE PiezoControllerExit;

BEGIN

ExitProc:=ExitSave;

PCI20003_DAC(DAC0zero,0);   {zero DAC output}
        PCI20003_DAC(DAC1zero,1);
        PCI20003_DAC2(DAC2zero,0);
        PCI20003_DAC2(DAC3zero,1);

WRITELN;
        WRITE('----------------------------------------------');
        WRITE('Termination Of Piezo Position Controller');
        WRITELN;

END;

{-------------------------Main_Program-------------------------}

BEGIN
        ExitSave:=ExitProc;
        ExitProc:=@PiezoControllerExit;
        InitPorts;

Menu;

END;
```

MATLAB® Script File For The Identification Of The Elastic Compliance

```
%Definition of the variables

%  s11      elastic compliance
%  error    difference between calculated value and zero
%  pres11   previous guess of elastic compliance
%  dels11   incremental change in the guess of the elastic compliance %Determine the effective modulus of the tube %make intial guess
      s11=11.5e-12;

%calculate an initial error error=((A*sqrt(p))/(wo*m*sqrt(s11)))-tan((sqrt(s11))*wo*l*sqrt(p));

%set the initial values to enable linearization prevs11=s11;
   s11=12.0e-12;

%If spec. s11 gives a poor error update value s11 while (abs(error))>1e-9          %change to set precision of calculated s11
      preverror=error;              %repeat loop until guess gets a small error %calculate the value produced by the guess error=((A*sqrt(p))/(wo*m*sqrt(s11)))-tan((sqrt(s11))*wo*l*sqrt(p));

%use linear regression to get new guess of s11 dels11=error*(s11-prevs11)/(preverror-error);
      prevs11=s11;
      s11=s11+dels11;
   end
```

It is understood that the invention is not confined to the particular embodiments set forth herein as illustrative, but embraces such modified forms thereof as come within the scope of the following claims. Particularly, the invention is not limited to STM applications or applications using tube shaped piezoelectric positioners, but may include any application of a piezoelectric positioner or actuator wherein state control feedback of the positioner is employed.

What is claimed is:

1. An apparatus for control of a piezoelectric positioner, comprising:

(a) position sensor means for measuring the position state of the piezoelectric positioner and for providing a measured position state signal related to the position state of the piezoelectric positioner;

(b) control means for generating a control signal to drive the piezoelectric positioner to a commanded position, wherein the control signal includes a velocity state component, and wherein the control means includes means for comparing an estimated velocity state signal with a commanded velocity state signal to form a velocity state error signal and means for multiplying the velocity state error signal by a velocity state gain to form the velocity state component of the control signal; and (c) a velocity observer means for modeling a velocity state of the piezoelectric positioner and for providing the estimated velocity state signal as an output to the control means, wherein the estimated velocity state signal is related to the modeled velocity state of the piezoelectric positioner, and wherein the velocity observer means includes means for receiving the measured position state signal as an input and means for correcting the modeled velocity state of the piezoelectric position in response to the measured position state signal.

2. The apparatus for control of a piezoelectric positioner of claim 1 wherein the velocity observer means includes means for receiving the control signal as an input and wherein the means for modeling the velocity state of the piezoelectric positioner includes means for modeling the velocity state of the positioner in response to the control signal.

3. The apparatus for control of a piezoelectric positioner of claim 1 wherein the velocity observer means includes means for modeling a position state of the piezoelectric positioner and for providing an estimated position state signal related to the modeled position state of the piezoelectric positioner, means for comparing the measured position state signal and the estimated position state signal to form an observer position state error signal, and means for using the observer position state error signal in an observer feedback loop to drive the estimated position state signal to equal the measured position state signal.

4. The apparatus for control of a piezoelectric positioner of claim 3 wherein the velocity observer means includes means for integrating the estimated velocity state signal to form the estimated position state signal.

5. The apparatus for control of a piezoelectric positioner of claim 3 wherein the means for using the observer position state error signal to drive the estimated position state signal to equal the measured position state signal includes means for integrating the observer position state error signal and means for multiplying the integrated observer position state error by an observer integral position state gain.

6. The apparatus for control of a piezoelectric positioner of claim 5 wherein the means for using the observer position state error signal to drive the estimated position state signal to equal the measured position state signal additionally includes means for multiplying the observer position state error signal by an observer proportional position state gain.

7. The apparatus for control of a piezoelectric positioner of claim 3 wherein the means for using the observer position state error signal to drive the estimated position state signal to equal the measured position state signal includes means for multiplying the observer position state error signal by an observer velocity state gain to form an effective observer velocity state feedback signal.

8. The apparatus for control of a piezoelectric positioner of claim 7 wherein the velocity observer means includes means for modeling an acceleration state of the piezoelectric positioner and for providing an estimated acceleration state signal related to the modeled acceleration state of the piezoelectric positioner, means for integrating the estimated acceleration state signal, and means for combining the integrated estimated acceleration state signal and the observer position state error signal multiplied by the observer velocity state gain to form the estimated velocity state signal.

9. The apparatus for control of a piezoelectric positioner of claim 1 wherein the velocity observer means includes model gains having gain values relative to estimates of a physical mass, a physical damping, and a physical stiffness of the piezoelectric positioner.

10. The apparatus for control of a piezoelectric positioner of claim 1 wherein the control signal includes a position state component and wherein the control means additionally comprises means for comparing a commanded position state signal and the measured position state signal to form a position state error signal and means for deriving the position state component of the control signal from the position state error signal.

11. The apparatus for control of a piezoelectric positioner of claim 10 wherein the means for deriving the position state component of the control signal includes means for multiplying the position state error signal by a proportional gain and means for integrating the position state error signal and for multiplying the integrated position state error signal by an integral gain.

12. The apparatus for control of a piezoelectric positioner of claim 1 wherein the control means and the velocity observer means are analog electrical circuits.

13. The apparatus for control of a piezoelectric positioner of claim 1 wherein the control means and the velocity observer means include a digital processing unit.

14. The apparatus for control of a piezoelectric positioner of claim 1 wherein the control signal includes an acceleration state component and wherein the control means includes additionally means for comparing an estimated acceleration state signal with a commanded acceleration state signal to form an acceleration state error signal, and means for multiplying the acceleration state error signal and an active mass gain to form the acceleration state component of the control signal;

and including additionally an acceleration observer means for modeling an acceleration state of the piezoelectric positioner and for providing the estimated acceleration state signal as an output to the control means, wherein the estimated acceleration state signal is related to the modeled acceleration state of the piezoelectric positioner, and wherein the acceleration state observer includes means for receiving the estimated velocity state signal as an input, and means for correcting the modeled acceleration state of the piezoelectric positioner in response to the estimated velocity state signal.

15. The apparatus for control of a piezoelectric positioner of claim 14 wherein the acceleration observer means includes means for receiving the control signal as an input and wherein the acceleration observer means includes means for modeling the acceleration state of the positioner in response to the control signal.

16. An apparatus for control of a piezoelectric positioner, comprising:

(a) position sensor means for measuring the position state of the piezoelectric positioner and for providing a measured position state signal related to the position state of the piezoelectric positioner;

(b) control means for generating a control signal to drive the piezoelectric positioner to a commanded position, wherein the control signal includes position and velocity state components, and wherein the control means includes means for comparing a commanded position state signal and the measured position state signal to form a position state error signal and means for deriving the position state component of the control signal from the position state error signal, and means for comparing an estimated velocity state signal with a commanded velocity state signal to form a velocity state error signal, and means for multiplying the velocity state error signal and a velocity state gain to form the velocity state component of the control signal; and (c) a velocity observer means for modeling a velocity state of the piezoelectric positioner and for providing the estimated velocity state signal as an output to the control means, wherein the estimated velocity state signal is related to the modeled velocity state of the piezoelectric positioner, including means for receiving the measured position state signal as an input and means for correcting the modeled velocity state in response to the measured position state signal, wherein the velocity observer modeling means includes model gains having gain values relative to estimates of a physical mass, a physical damping, and a physical stiffness of the piezoelectric positioner, and means for modeling a position state of the piezoelectric positioner and for providing an estimated position state signal related to the modeled position state of the piezoelectric positioner and means for comparing the measured position state signal and the estimated position state signal to form an observer position state error signal and means for using the observer position state error signal in a feedback loop to drive the estimated position state signal to equal the measured position state signal.

17. The apparatus for control of a piezoelectric positioner of claim 16 wherein the means for using the observer position state error signal to drive the estimated position state signal to equal the measured position state signal includes means for multiplying the observer position state error signal by an observer velocity state gain to form an effective observer velocity state feedback signal, wherein the velocity observer includes means for modeling an acceleration state of the piezoelectric positioner and for providing an estimated acceleration state signal related to the modeled acceleration state of the piezoelectric positioner, means for integrating the estimated acceleration state signal, and means for combining the integrated estimated acceleration state signal and the observer position state error signal multiplied by the observer velocity state gain to form the estimated velocity state signal.

18. The apparatus for control of a piezoelectric positioner of claim 16 wherein at least one of the control means or the velocity observer means is an analog electrical circuit.

19. A piezoelectric positioning system, comprising:

(a) a piezoelectric positioner;

(b) drive means responsive to a control signal for driving the piezoelectric positioner to a commanded position defined by the control signal, wherein the control signal includes a velocity state component;

(c) position sensor means for measuring the position state of the piezoelectric positioner and for providing a measured position state signal related to the position state of the piezoelectric positioner;

(d) control means for generating the control signal, including means for comparing an estimated velocity state signal with a commanded velocity state signal to form a velocity state error signal and means for multiplying the velocity state error signal and a velocity state gain to form the velocity state component of the control signal; and (e) a velocity observer means for modeling a velocity state of the piezoelectric positioner and for providing the estimated velocity state signal as an output to the control means, wherein the estimated velocity state signal is related to the modeled velocity state of the piezoelectric positioner, and wherein the velocity observer means includes means for receiving the measured position state signal as an input and means for correcting the modeled velocity state of the piezoelectric positioner in response to the measured position state signal.

20. The piezoelectric positioning system of claim 19 wherein the velocity observer means includes means for modeling a position state of the piezoelectric positioner and means for providing an estimated position state signal related to the modeled position state of the piezoelectric positioner, means for comparing the measured position state signal and the estimated position state signal to form an observer position state error signal, and means for using the observer position state error signal in an observer feedback loop to drive the estimated position state signal to equal the measured position state signal.

21. The piezoelectric positioning system of claim 20 wherein the means for using the observer position state error signal to drive the estimated position state signal to equal the measured position state signal includes means for multiplying the observer position state error signal by an observer velocity state gain to form an effective observer velocity state feedback signal, wherein the velocity observer includes means for modeling an acceleration state of the piezoelectric positioner and for providing an estimated acceleration state signal related to the modeled acceleration state of the piezoelectric positioner means for integrating the estimated acceleration state signal and means for combining the integrated estimated acceleration state signal and the observer position state error signal multiplied by the observer velocity state gain to form the estimated velocity state signal.

22. The piezoelectric positioning system of claim 19 wherein the velocity observer means includes model gains having gain values relative to estimates of a physical mass, a physical damping, and a physical stiffness of the piezoelectric positioner.

23. The piezoelectric positioning system of claim 19 wherein the control means and the velocity observer means are analog electrical circuits.

24. The piezoelectric positioning system of claim 19 wherein at least one of the control means or the velocity observer means includes a digital processor.

25. The piezoelectric positioning system of claim 19 wherein the piezoelectric positioner is the piezoelectric positioner of a scanned probe microscope.

26. A piezoelectric positioner velocity observer, comprising:
(a) means for receiving a measured position state signal corresponding to a physical position of a piezoelectric positioner;
(b) means for modeling a velocity state of the piezoelectric positioner and means for correcting the modeled velocity state of the piezoelectric positioner in response to the measured position state signal, and wherein the means for modeling the velocity state of the piezoelectric positioner includes model gains having gain values relative to estimates of a physical mass, a physical damping, and a physical stiffness of the piezoelectric positioner; and
(c) means for providing an estimated velocity state signal corresponding to the modeled velocity state of the piezoelectric positioner as an output from the means for modeling.

27. The piezoelectric positioner velocity observer of claim 26 including additionally means for receiving a control signal provided to the piezoelectric positioner to drive the positioner to a commanded position and wherein the modeling means includes means for modeling the velocity state of the piezoelectric positioner in response to the control signal.

28. The piezoelectric positioner velocity observer of claim 26 additionally comprising means for modeling a position state of the piezoelectric positioner and for providing an estimated position state signal related to the modeled position state of the piezoelectric positioner, means for comparing the measured position state signal and the estimated position state signal to form an observer position state error signal, and means for using the observer position state error signal in an observer feedback loop to drive the estimated position state signal to equal the measured position state signal.

29. The piezoelectric positioner velocity observer of claim 28 wherein the means for using the observer position state error signal to drive the estimated position state signal to equal the measured position state signal includes means for multiplying the observer position state error signal by an observer velocity state gain to form an effective observer velocity state feedback signal, wherein the velocity observer means includes means for modeling an acceleration state of the piezoelectric positioner and for providing an estimated acceleration state signal related to the modeled acceleration state of the piezoelectric positioner, means for integrating the estimated acceleration state signal and means for combining the integrated estimated acceleration state signal and the observer position state error signal multiplied by the observer velocity state gain to form the estimated velocity state signal.

30. An improved scanned probe microscope of the type comprising a piezoelectric positioner having a probe attached to a first end of the positioner and a means for coarse positioning of the probe adjacent to a sample attached at a second end of the positioner, means for applying a voltage differential between the probe and the sample whereby a tunneling current from the sample is generated which is exponentially proportional to a position of the probe from the sample, and means for applying a scanning signal to the positioner to scan the probe laterally across the sample, wherein the improvement comprises:
(a) drive means responsive to a control signal for driving the piezoelectric positioner to a commanded position defined by the control signal to position the probe at a commanded distance from the sample, wherein the control signal includes a velocity state component;
(b) means for deriving the position state of the piezoelectric positioner from the tunneling current and for providing a measured position state signal related to the position state of the piezoelectric positioner;
(c) control means for generating the control signal, including means for comparing an estimated velocity state signal with a commanded velocity state signal to form a velocity state error signal and means for multiplying the velocity state error signal and a velocity state gain to form the velocity state component of the control signal; and
(d) a velocity observer means for modeling a velocity state of the piezoelectric positioner and for providing the estimated velocity state signal as an output to the control means, wherein the estimated velocity state signal is related to the modeled velocity state of the piezoelectric positioner, and wherein the velocity observer means includes and means for receiving the measured position state signal as an input and means for correcting the modeled velocity state of the piezoelectric positioner in response to the measured position state signal.

31. The improved scanned probe microscope of claim 30 wherein the velocity observer means includes means for modeling a position state of the piezoelectric positioner and means for providing an estimated position state signal related to the modeled position state of the piezoelectric positioner, means for comparing the measured position state signal and the estimated position state signal to form an observer position state error signal, and means for using the observer position state error signal in an observer feedback loop to drive the estimated position state signal to equal the measured position state signal.

32. The improved scanned probe microscope of claim 31 wherein the means for using the observer position state error signal to drive the estimated position state signal to equal the measured position state signal includes means for multiplying the observer position state error signal by an observer velocity state gain to form an effective observer velocity state feedback signal, wherein the velocity observer includes means for modeling an acceleration state of the piezoelectric positioner and for providing an estimated acceleration state signal related to the modeled acceleration state of the piezoelectric positioner, means for integrating the estimated acceleration state signal, and means for combining the integrated estimated acceleration state signal and the observer position state error signal multiplied by the observer velocity state gain to form the estimated velocity state signal.

33. The improved scanned probe microscope of claim 30 wherein the velocity observer means includes model gains having gain values relative to estimates of a physical mass, a physical damping, and a physical stiffness of the piezoelectric positioner.

34. The improved scanned probe microscope of claim 30 wherein at least one of the control means or the velocity observer means are analog electrical circuits.

35. The improved scanned probe microscope of claim 30 wherein the piezoelectric positioner is a tube positioner.

36. A method for the control of a piezoelectric positioner, comprising the steps of:

(a) applying a control signal to the piezoelectric positioner to control a physical position of the positioner;

(b) modeling the position and the velocity response of the piezoelectric positioner to the control signal;

(c) measuring the physical position of the positioner;

(d) comparing the measured position of the positioner to the modeled position response of the positioner to obtain a model position state error signal;

(e) integrating the model position state error signal;

(f) multiplying the integrated model position state error signal by a model integration gain;

(g) applying the integrated model position state error signal multiplied by the model integration gain to the model of the position response to drive the modeled position response to equal the measured position;

(h) comparing the modeled velocity response of the positioner to a commanded velocity signal to obtain a physical velocity state error; and (i) multiplying the physical velocity state error by a physical velocity state gain to form a velocity component of the control signal.

37. The method of claim 36 including additionally the step of applying the control signal to a model of the position and velocity response of the piezoelectric positioner.

38. The method of claim 36 wherein the step of measuring the physical position of the positioner includes the steps of measuring a tunneling current in a sample adjacent to the positioner, and converting the tunneling current into a measured position signal.

39. A method for the control of a piezoelectric positioner, comprising the steps of:

(a) applying a control signal to the piezoelectric positioner to control a physical position of the positioner;

(b) modeling the position and the velocity response of the piezoelectric positioner to the control signal;

(c) measuring the physical position of the positioner;

(d) comparing the measured position of the positioner to the modeled position response of the positioner to obtain a model position state error signal;

(e) multiplying the model position state error signal by a model velocity gain to form a model velocity state feedback signal;

(f) applying the model velocity state feedback signal to the model of the velocity response of the positioner;

(g) integrating the model position state error signal;

(h) multiplying the integrated model position state error signal by a model integration gain;

(i) applying the integrated model position state error signal multiplied by the model integration gain to the model of the position response to drive the modeled position response to equal the measured position;

(j) comparing the modeled velocity response of the positioner to a commanded velocity signal to obtain a physical velocity state error; and (k) multiplying the physical velocity state error by a physical velocity state gain to form a velocity component of the control signal.

40. A method for the control of a piezoelectric positioner, comprising the steps of:

(a) applying a control signal to the piezoelectric positioner to control a physical position of the positioner;

(b) determining an estimated physical mass of the piezoelectric positioner;

(c) determining an estimated physical damping of the piezoelectric positioner;

(d) determining an estimated physical stiffness of the piezoelectric positioner;

(e) modeling the position and the velocity response of the piezoelectric positioner to the control signal based on the estimated physical mass, the estimated physical damping, and the estimated physical stiffness;

(f) measuring the physical position of the positioner;

(g) comparing the measured position of the positioner to the modeled position response of the positioner to obtain a model position state error signal;

(h) integrating the model position state error signal;

(i) multiplying the integrated model position state error signal by a model integration gain;

(j) applying the integrated model position state error signal multiplied by the model integration gain to the model of the position response to drive the modeled position response to equal the measured position;

(k) comparing the modeled velocity response of the positioner to a commanded velocity signal to obtain a physical velocity state error; and (l) multiplying the physical velocity state error by a physical velocity state gain to form a velocity component of the control signal.

41. An apparatus for control of a piezoelectric positioner, comprising:

(a) velocity determination means for obtaining the velocity state of the piezoelectric positioner and for providing a velocity state signal related to the velocity state of the piezoelectric positioner;

(b) control means for generating a control signal to drive the piezoelectric positioner to a commanded position, wherein the control signal includes an acceleration state component and wherein the control means includes means for comparing an estimated acceleration state signal with a commanded acceleration state signal to form an acceleration state error signal and means for multiplying the acceleration state error signal by an active mass gain to form the acceleration state component of the control signal and (c) an acceleration observer means for modeling an acceleration state of the piezoelectric positioner and for providing the estimated acceleration state signal as an output to the control means, wherein the estimated acceleration state signal is related to the modeled acceleration state, and wherein the acceleration observer means includes means for receiving the velocity state signal as an input and means for correcting the modeled acceleration state of the piezoelectric positioner in response to the velocity state signal.

42. The apparatus for control of a piezoelectric positioner of claim 41 wherein the velocity determination means for obtaining the velocity state and providing the velocity state signal includes a velocity observer including means for modeling a velocity state of the piezoelectric positioner.

43. The apparatus for control of a piezoelectric positioner of claim 41 wherein the acceleration observer means includes model gains having gain values relative to estimates of a physical mass, a physical damping, and a physical stiffness of the piezoelectric positioner.

* * * * *